(12) United States Patent
Mark

(10) Patent No.: US 11,913,724 B2
(45) Date of Patent: Feb. 27, 2024

(54) SINTERING FURNACE

(71) Applicant: MARKFORGED, INC., Watertown, MA (US)

(72) Inventor: Gregory Thomas Mark, Brookline, MA (US)

(73) Assignee: MARKFORGED, INC., Waltham, MA (US)

( * ) Notice: Subject to any disclaimer, the term of this patent is extended or adjusted under 35 U.S.C. 154(b) by 903 days.

(21) Appl. No.: 16/277,100

(22) Filed: Feb. 15, 2019

(65) Prior Publication Data

US 2019/0255612 A1 Aug. 22, 2019

Related U.S. Application Data

(60) Provisional application No. 62/647,262, filed on Mar. 23, 2018, provisional application No. 62/631,911, filed on Feb. 18, 2018.

(51) Int. Cl.
*F27B 17/00* (2006.01)
*B22F 3/10* (2006.01)
(Continued)

(52) U.S. Cl.
CPC ............ *F27B 17/0016* (2013.01); *B22F 3/10* (2013.01); *B22F 3/1021* (2013.01);
(Continued)

(58) Field of Classification Search
CPC .......... B22F 3/10; B22F 3/1021; B22F 10/10; B22F 2203/11; B22F 2998/10;
(Continued)

(56) References Cited

U.S. PATENT DOCUMENTS

| 4,430,978 A | * | 2/1984 | Lewis | F02M 21/0287 |
| | | | | 123/478 |
| 2002/0090313 A1 | * | 7/2002 | Wang | B22F 12/00 |
| | | | | 419/10 |

(Continued)

FOREIGN PATENT DOCUMENTS

| CN | 101050919 A | * | 10/2007 |
| CN | 101050919 A | | 10/2007 |
| JP | 2011145058 A | | 7/2011 |

OTHER PUBLICATIONS

Extended European Search Report from corresponding European Application No. 19754936.3 dated Oct. 19, 2021.
(Continued)

*Primary Examiner* — Steven B McAllister
*Assistant Examiner* — Benjamin W Johnson
(74) *Attorney, Agent, or Firm* — Lando & Anastasi, LLP

(57) ABSTRACT

According to one aspect, embodiments herein provide a furnace for debinding and sintering additively manufactured parts comprising a unitarily formed retort having at least one open side, a heater for heating a sintering volume within the retort to a debinding temperature and to a sintering temperature, an end cap sealing the at least one open side, a forming gas line penetrating the end cap for supplying forming gas at a flowrate, and a heat exchanger within the retort, outside the sintering volume, and adjacent a heated wall of the retort, the heat exchanger having an inlet connected to the forming gas line and an outlet to the sintering volume, wherein the heat exchanger includes a heat exchange tube length sufficient to heat the forming gas to within 20 degrees Celsius of the sintering temperature before the forming gas exits the outlet.

8 Claims, 27 Drawing Sheets

(51) Int. Cl.
  *B29C 64/295* (2017.01)
  *B33Y 30/00* (2015.01)
  *B33Y 40/00* (2020.01)
  *C04B 35/64* (2006.01)
  *B22F 10/12* (2021.01)
  *B22F 10/14* (2021.01)
  *B22F 10/18* (2021.01)
  *B22F 10/43* (2021.01)
  *B22F 10/73* (2021.01)
  *B22F 10/80* (2021.01)
  *B22F 12/55* (2021.01)
  *B29C 64/165* (2017.01)

(52) U.S. Cl.
  CPC ............ *B29C 64/295* (2017.08); *B33Y 30/00* (2014.12); *B33Y 40/00* (2014.12); *C04B 35/64* (2013.01); *B22F 10/12* (2021.01); *B22F 10/14* (2021.01); *B22F 10/18* (2021.01); *B22F 10/43* (2021.01); *B22F 10/73* (2021.01); *B22F 10/80* (2021.01); *B22F 12/55* (2021.01); *B22F 2203/11* (2013.01); *B22F 2998/10* (2013.01); *B29C 64/165* (2017.08)

(58) Field of Classification Search
  CPC ..... B29C 64/165; B29C 64/295; B33Y 10/00; B33Y 30/00; B33Y 40/00; C04B 35/638; C04B 35/64; F27B 5/16; F27B 5/18; F27D 19/00; F27D 21/00; Y02P 10/25
  USPC .......................................................... 432/13
  See application file for complete search history.

(56) References Cited

U.S. PATENT DOCUMENTS

| | | |
|---|---|---|
| 2007/0148606 A1 | 6/2007 | Nakajima et al. |
| 2011/0171589 A1 | 7/2011 | Ha et al. |
| 2012/0164022 A1* | 6/2012 | Muginstein ............... A61L 2/12 |
| | | 422/22 |
| 2013/0008516 A1 | 1/2013 | O'Hare |
| 2013/0156627 A1* | 6/2013 | Glennon .................... B22F 3/24 |
| | | 419/28 |
| 2013/0177038 A1 | 7/2013 | Verch, Jr. et al. |
| 2017/0269047 A1* | 9/2017 | Murata .............. G01N 33/0016 |
| 2017/0297102 A1 | 10/2017 | Chin et al. |
| 2017/0304945 A1 | 10/2017 | Sutcliffe |

OTHER PUBLICATIONS

Notification of Transmittal of the International Search Report and the Written Opinion of the International Searching Authority from corresponding PCT/US2019/018233 dated May 27, 2019.

* cited by examiner

SINTERING FURNACE

CROSS-REFERENCE TO RELATED APPLICATIONS

This application claims priority under 35 U.S.C. § 119(e) to U.S. Provisional Application Ser. Nos. 62/631,911 titled "SINTERING OVEN" filed on Feb. 18, 2018 and U.S. Provisional Application Ser. No. 62/647,262, titled "SINTERING FURNACE" filed on Mar. 23, 2018, each of which is herein incorporated by reference in its entirety.

FIELD

Aspects relate to three dimensional printing of composite metal or ceramic materials.

BACKGROUND

"Three dimensional printing" as an art includes various methods for producing metal parts.

In 3D printing having a bulk sintering operation, Metal Injection Molding, and other powder metallurgy processes, the sintering environment strongly affects end part quality.

SUMMARY

An aspect of the present invention, is directed to a furnace for debinding and sintering additively manufactured parts comprises a unitarily formed retort having at least one open side, a heater for heating a sintering volume within the retort to a debinding temperature and to a sintering temperature, an end cap sealing the at least one open side, a forming gas line penetrating the end cap for supplying forming gas at a flowrate, and heat exchanger within the retort, outside the sintering volume, and adjacent a heated wall of the retort, the heat exchanger having an inlet connected to the forming gas line and an outlet to the sintering volume, wherein the heat exchanger includes a heat exchange tube length sufficient to heat the forming gas to within 20 degrees Celsius of the sintering temperature before the forming gas exits the outlet.

According to one embodiment, the furnace further comprises a pressure control mechanism, including a vacuum pump, coupled to the retort and configured to control pressure in the retort. In another embodiment, the furnace further comprising a control system configured to operate a flow control module to control the flowrate of the forming gas, operate the pressure control mechanism to control the pressure in the retort, and operate a heat control module to control a level of heat provided by the heater to the sintering volume. In another embodiment, the furnace further comprises a moisture sensor configured to sense an amount of moisture in the sintering volume and to be in communication with the control system, and a Liquid Petroleum Gas (LPG) sensor configured to sense an amount of hydrocarbon gas in the sintering volume and to be in communication with the control system.

According to another embodiment, the furnace further comprises a series of baffle shields adjacent the end cap and configured to reduce a temperature between the sintering volume and the end cap. In one embodiment, the furnace further comprises a dip tube penetrating the series of baffle shields to the sintering volume and configured to remove debinding decomposition gas from the sintering volume. In another embodiment, the furnace further comprises an inert purge gas supply penetrating the end cap and having an outlet at the end cap, the inert purge gas supply configured to introduce a purge gas between the series of baffle shields and the end cap that keeps the debinding decomposition gas away from walls of the retort adjacent the end cap.

According to one embodiment, the heat exchanger is formed as a stainless-steel tube having an exchange tube length greater than the length of the sintering volume.

Another aspect in accordance with the present invention is directed to a method for controlling heating and gas supply in a furnace for debinding and sintering additively manufactured parts, comprising heating a brown part in a sintering volume using a sintering temperature ramp to sinter metal powder in the brown part, sensing an amount of moisture in the sintering volume, and increasing a supply of forming gas to the furnace in response to a detection of the amount of moisture in the sintering volume being greater than a predetermined threshold amount.

According to one embodiment, the method further comprises initiating the supply of forming gas at an initiation level substantially at the beginning of the temperature ramp, and limiting the increase in the supply of forming gas to a maximum level of ten times the supply of the initiation level.

At least one aspect in accordance with the present invention is directed to a method for controlling heating and gas supply in a furnace for debinding and sintering additively manufactured parts, comprising heating a brown part in a sintering volume using a debinding temperature ramp to debind a polymer binder in the brown part, sensing an amount of hydrocarbon gas in the sintering volume, and terminating the debinding temperature ramp in response to a detection of the amount of hydrocarbon gas in the sintering volume being lower than a predetermined threshold amount.

Another aspect in accordance with the present invention is directed to a method for controlling heating and gas supply in a furnace for debinding and sintering additively manufactured parts, comprising heating a brown part in a sintering volume using a debinding temperature ramp to debind a polymer binder in the brown part, sensing an amount of hydrocarbon gas in the sintering volume, terminating the debinding temperature ramp in response to a detection of the amount of hydrocarbon gas in the sintering volume being lower than a predetermined threshold amount, initiating sintering of the brown part in the sintering volume using a sintering temperature ramp to sinter a metal powder in the brown part, sensing an amount of moisture in the sintering volume, and increasing a supply of forming gas in response to a detection of the amount of moisture in the sintering volume being greater than a predetermined threshold amount.

At least one aspect in accordance with the present invention is directed to a supply panel for a sintering furnace comprising at least one input configured to be coupled to a gas supply, a first moisture sensor in fluid communication with the at least one input and configured to receive gas via the at least one input, a supply gas filter in fluid communication with the first moisture sensor and configured to receive gas from the first moisture sensor, a second moisture sensor in fluid communication with the supply gas filter and configured to receive gas from the supply gas filter, and an output configured to be coupled to the sintering furnace and to provide gas from the second moisture sensor to the sintering furnace.

According to one embodiment, the supply panel further comprises a control system configured to be in communication with the first moisture sensor and the second moisture sensor, and configured to analyze information provided by the first moisture sensor and the second moisture sensor. In another embodiment, the first moisture sensor is configured to directly measure moisture contamination in the gas from the at least one input, and provide a measurement of the moisture contamination in the gas from the at least one input to the control system. In another embodiment, the second moisture sensor is configured to directly measure moisture contamination in the gas from the supply gas filter, and provide a measurement of the moisture contamination in the gas from the supply gas filter to the control system. In one embodiment, the control system is further configured to compare the measurement of the moisture contamination in the gas from the at least one input provided by the first moisture sensor to the measurement of the moisture contamination in the gas from the supply gas filter provided by the second moisture sensor, and determine whether the measurement of the moisture contamination in the gas from the at least one input provided by the first moisture sensor is larger than or equal to the measurement of the moisture contamination in the gas from the supply gas filter provided by the second moisture sensor. In another embodiment, the control system is further configured to identify, in response to determining that the measurement of the moisture contamination in the gas from the at least one input provided by the first moisture sensor is larger than the measurement of the moisture contamination in the gas from the supply gas filter provided by the second moisture sensor, that there is a leak between the supply gas filter and the second moisture sensor. In one embodiment, the control system is configured to identify, in response to determining that the measurement of the moisture contamination in the gas from the at least one input provided by the first moisture sensor is equal to the measurement of the moisture contamination in the gas from the supply gas filter provided by the second moisture sensor, that the supply gas filter is not functioning properly.

According to another embodiment, the supply gas filter is configured to scrub moisture and oxygen from the gas passing through it. In one embodiment, the supply gas filter is comprised of a moisture filter and an oxygen filter, wherein the moisture filter is configured to have a limited absorption capacity. In another embodiment, the first moisture sensor is configured to provide the measurement of the moisture contamination in the gas from the at least one input to the control system each time a measurement is taken by the first moisture sensor. In one embodiment, the control system is configured to record the measurement of the moisture contamination in the gas provided by the first moisture sensor, integrate the measurement of the moisture contamination in the gas with measurements of moisture contamination in the gas recorded from previous gas supply runs to determine a net moisture exposure experienced by the moisture filter, and estimate a usable lifetime of the moisture filter based on the limited absorption capacity of the moisture filter and the net moisture exposure experienced by the moisture filter. In another embodiment, the control system is configured to determine, based on a level of the measured moisture contamination in the gas, if a gas supply run should be aborted.

At least one aspect in accordance with the present invention is directed to a sintering system that comprises a supply panel, the supply panel comprising at least one input configured to be coupled to a gas supply, a first moisture sensor in fluid communication with the at least one input and configured to receive gas via the at least one input, a supply gas filter in fluid communication with the first moisture sensor and configured to receive gas from the first moisture sensor, and a second moisture sensor in fluid communication with the supply gas filter and configured to receive gas from the supply gas filter, and a sintering furnace configured to debind and sinter an additively manufactured part, wherein the sintering furnace comprises a third moisture sensor located inside the sintering furnace, wherein the supply panel further comprises an output coupled to the sintering furnace to provide gas from the second moisture sensor to the sintering furnace.

According to one embodiment, the sintering system further comprises a control system, wherein the control system is configured to be in communication with the first moisture sensor, the second moisture sensor, and the third moisture sensor, and wherein the control system is configured to analyze information provided by the first moisture sensor, the second moisture sensor, and the third moisture sensor. In another embodiment, the first moisture sensor is configured to directly measure moisture contamination in the gas from the at least one input, and provide a measurement of the moisture contamination in the gas from the at least one input to the control system. In one embodiment, the second moisture sensor is configured to directly measure moisture contamination in the gas from the supply gas filter, and provide a measurement of the moisture contamination in the gas from the supply gas filter to the control system. In another embodiment, the third moisture sensor is configured to directly measure moisture in the sintering furnace, and provide a measurement of the moisture in the sintering furnace to the control system. In one embodiment, the control system is configured to identify, based on the measurement of the moisture in the sintering furnace, the presence of unexpected moisture introduced into the sintering furnace, and identify, based on the measurement of the moisture in the sintering furnace a current state of a debinding process of the additively manufactured part in the sintering furnace. In another embodiment, the control system is configured to calculate a level of oxygen in the sintering furnace based on the measurement of the moisture in the sintering furnace provided by the third moisture sensor. In one embodiment, the control system is configured to determine, based on the level of oxygen in the sintering furnace, whether the gas from the gas supply is providing proper atmosphere in the sintering furnace to reduce oxygen in the sintering furnace, and adjust, in response to determining that the gas from the gas supply is not providing the proper atmosphere in the sintering furnace, a flowrate of the gas from the gas supply into the sintering furnace.

According to another embodiment, the supply gas filter is configured to scrub moisture and oxygen from the gas passing through it, wherein the supply gas filter is comprised of a moisture filter and an oxygen filter, and wherein the moisture filter is configured to have a limited absorption capacity. In one embodiment, the control system is configured to calculate a level of oxygen in the sintering furnace based on the measurement of the moisture in the sintering furnace provided by the third moisture sensor; and determine, based on the level of oxygen in the sintering furnace, if the oxygen filter in the supply gas filter is functioning properly.

Another aspect in accordance with the present invention is directed to a method of supplying gas from a gas supply to a sintering furnace, the method comprising flowing gas from at least one input coupled to the gas supply to a first moisture sensor in fluid communication with the at least one input, sensing an amount of moisture contamination in the gas received from the at least one input using the first moisture sensor and transmitting the measured amount of the moisture contamination in the gas from the at least one input to a control system, flowing the gas from the first moisture sensor to a supply gas filter in fluid communication with the first moisture sensor, scrubbing moisture and oxygen from the gas by passing the gas through the supply gas filter, flowing the gas from the supply gas filter to a second moisture sensor in fluid communication with the supply gas filter, sensing an amount of moisture contamination in the gas received from the gas supply filter using the second moisture sensor and transmitting the measured amount of the moisture contamination in the gas from the supply gas filter to the control system, and flowing the gas from the second moisture sensor to an output coupled to the sintering furnace to provide gas from the second moisture sensor to the sintering furnace.

According to one embodiment, the method further comprises sensing an amount of moisture in the sintering furnace using a third moisture sensor and transmitting the measured amount of the moisture in the sintering furnace to the control system.

DETAILED DESCRIPTION

In 3D printing, in general, overhanging or jutting portions of a part may require removable and/or soluble and/or dispersing supports underneath to provide a facing surface for deposition. In metal printing, in part because metal is particularly dense (e.g., heavy), removable and/or soluble and/or dispersing supports may also be helpful to prevent deformation, sagging, during mid- or post-processing—for example, to preserve shape vs. drooping or sagging in potentially deforming environments like high heat.

Printing a sinterable part using a 3D printing material including a binder and a ceramic or metal sintering material is aided by support structures that are able to resist the downward pressure of, e.g., extrusion, and locate the deposited bead or other deposition in space. A release layer intervening between the support structures and the part includes a higher melting temperature material—ceramic or high temperature metal, for example, optionally deposited with a similar (primary) matrix or binder component to the model material. The release layer does not sinter, and permits the part to "release" from the supports. Beneath the release layer, the same model material as the part is used for the support structures, promoting the same compaction/densification during sintering. This tends to mean the part and the supports will shrink uniformly, maintaining dimensional accuracy of the part. At the bottom of the support, a release layer may also be printed. In addition, the support structures may be printed in sections with release layers between the sections, such that the final sintered support structures will readily break into smaller subsections for easy removal, optionally in the presence of mechanical or other agitation. In this way, a large support structure can be removed from an internal cavity via a substantially smaller hole. In addition, or in the alternative, a further method of support is to print soluble support material that is removed in the debinding process. For catalytic debind, this may be Delrin (POM) material.

One method to promote uniform shrinking or densification is to print a ceramic release layer as the bottom most layer in the part. On top of the sliding release layer (analogous to microscopic ball bearings) a thin sheet of metal—e.g., a raft—may be printed that will uniformly shrink with the part, and provide a "shrinking platform" or "densification linking" platform to hold the part and the related support materials in relative position during the shrinking or densification process. Optionally staples or tacks, e.g., attachment points, connect and interconnect (or link as densification linking) the model material portions being printed.

Figure 1A:
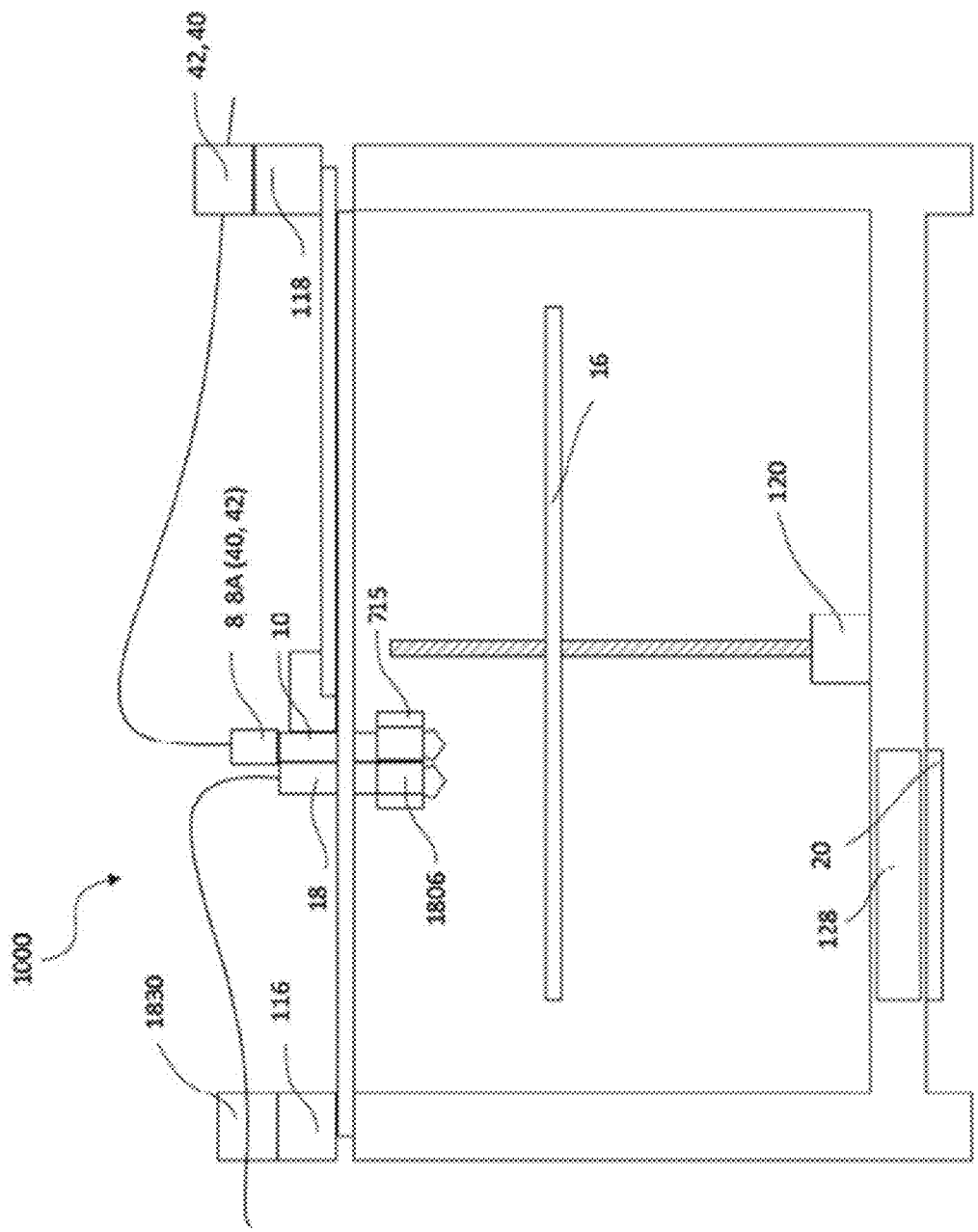
FIG. 1A is a schematic representation of three-dimensional metal printer.
Figure 1B:
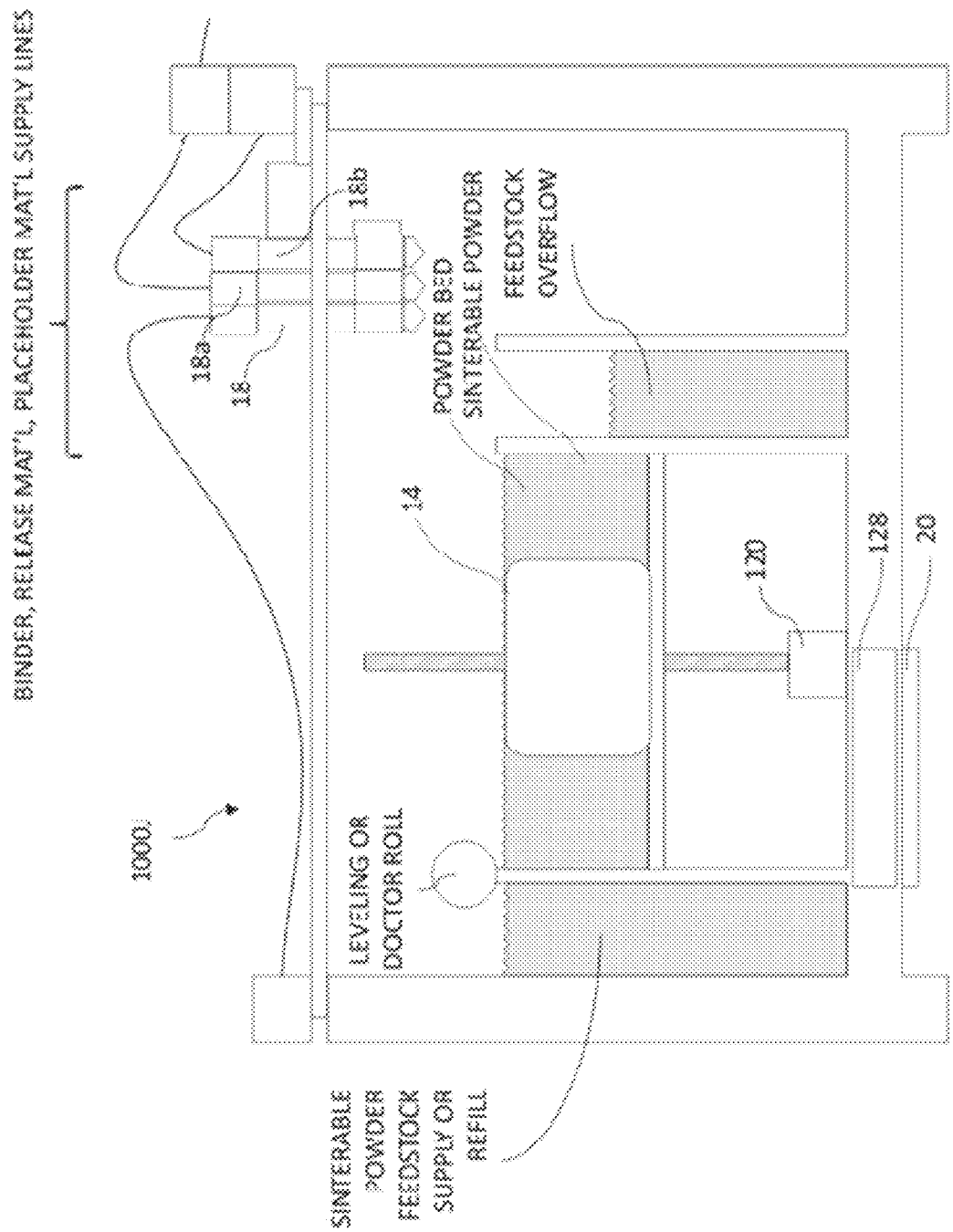
FIG. 1B is a schematic representation of a three-dimensional metal printer, representing a binder jetting/powder bed printing approach.

The printer(s) of FIGS. 1A, 1B, and otherwise shown in the remaining drawings, with at least two print heads 18, 10 and/or printing techniques, deposits with one head a composite material including a binder and dispersed spheres or powder 18 (e.g., within thermoplastic or curing binder), used for printing both a part and support structures, and with a second head 18a deposits the release or separation material. Optionally a third head and/or fourth head include a green body support head 18b and/or a continuous fiber deposition head 10. A fiber reinforced composite filament 2 (also referred to herein as continuous core reinforced filament) may be substantially void free and include a polymer or resin that coats, permeates or impregnates an internal continuous single core or multistrand core. It should be noted that although the print head 18, 18a, 18b are shown as extrusion print heads, a "fill material print head" 18, 18a, 18b as used herein may include optical or UV curing, heat fusion or sintering, or "polyjet", liquid, colloid, suspension or powder jetting devices—not shown—for depositing fill material, so long as the other functional requirements described herein are met. Functional requirements include one or more of employing green body material supports printing vs. gravity or printing forces; sintering or shrinking (densification linking) supports the part vs. gravity and promote uniform shrinking via atomic diffusion during sintering; and release or separation materials substantially retain shape through debinding stems but become readily removable, dispersed, powderized or the like after sintering.

Although FIGS. 1A, 1B in general show a Cartesian arrangement for relatively moving each print head in 3 orthogonal translation directions, other arrangements are considered within the scope of, and expressly described by, a drive system or drive or motorized drive that may relatively move a print head and a build plate supporting a 3D printed part in at least three degrees of freedom (i.e., in four or more degrees of freedom as well). The print bed or build plate, or any other bed for holding a part, may be moved by 1, 2, or 3 motors in 1, 2, or 3 degrees of freedom.

The relative position and/or orientation of the build platen 16 and print heads 18, 18a, 18b, and/or 10 are controlled by a controller 20 to deposit each material described herein in the desired location and direction.

With reference to FIG. 1A, 1B, each of the printheads 18, 18a, 18b, 10 may be mounted on the same linear guide or different linear guides or actuators such that the X, Y motorized mechanism of the printer moves them in unison.

FIG. 1B shows in schematic form a binder jetting powder bed printer, with some components generally similar to the extrusion printer of FIG. 1A. The printer 1000J includes two or more print heads 18 (jetting or applying a binder to bind powder 132 to form model material or bound composite), 18a (jetting or extruding release or separation material), and or 18b (jetting or extruding placeholder material) supplied by supply lines 142. The printer 1000J may deposit with print head 18 a binder 132 upon the powder bed 134 to form a composite material including a debinder and dispersed spheres or powder (metal or ceramic powder), used for printing a part, support structures, and a shrinking or densification linking platform. A sinterable powder feedstock reservoir, supply or refill 136 supplies the powder bed 134 with new layers of unbound powder, which is leveled by a leveling or doctor roll 138. Excess from leveling is captured in a feedstock overflow reservoir 140. With a second head 18a, the printer 1000J may deposit release or separation material. Optionally the third head and/or fourth head include the placeholder material head 18b and/or a continuous fiber deposition head 10 as described herein. The binder jetting printer 1000J described herein meets the functional requirements described herein (e.g., green body and/or placeholder material supports printing vs. gravity or printing forces, sintering supports support the part vs. gravity and promote uniform shrinking via atomic diffusion during sintering, and release or separation materials substantially retain shape through debinding steps but become readily removable, dispersed, powderized or the like after sintering).

Figure 2:
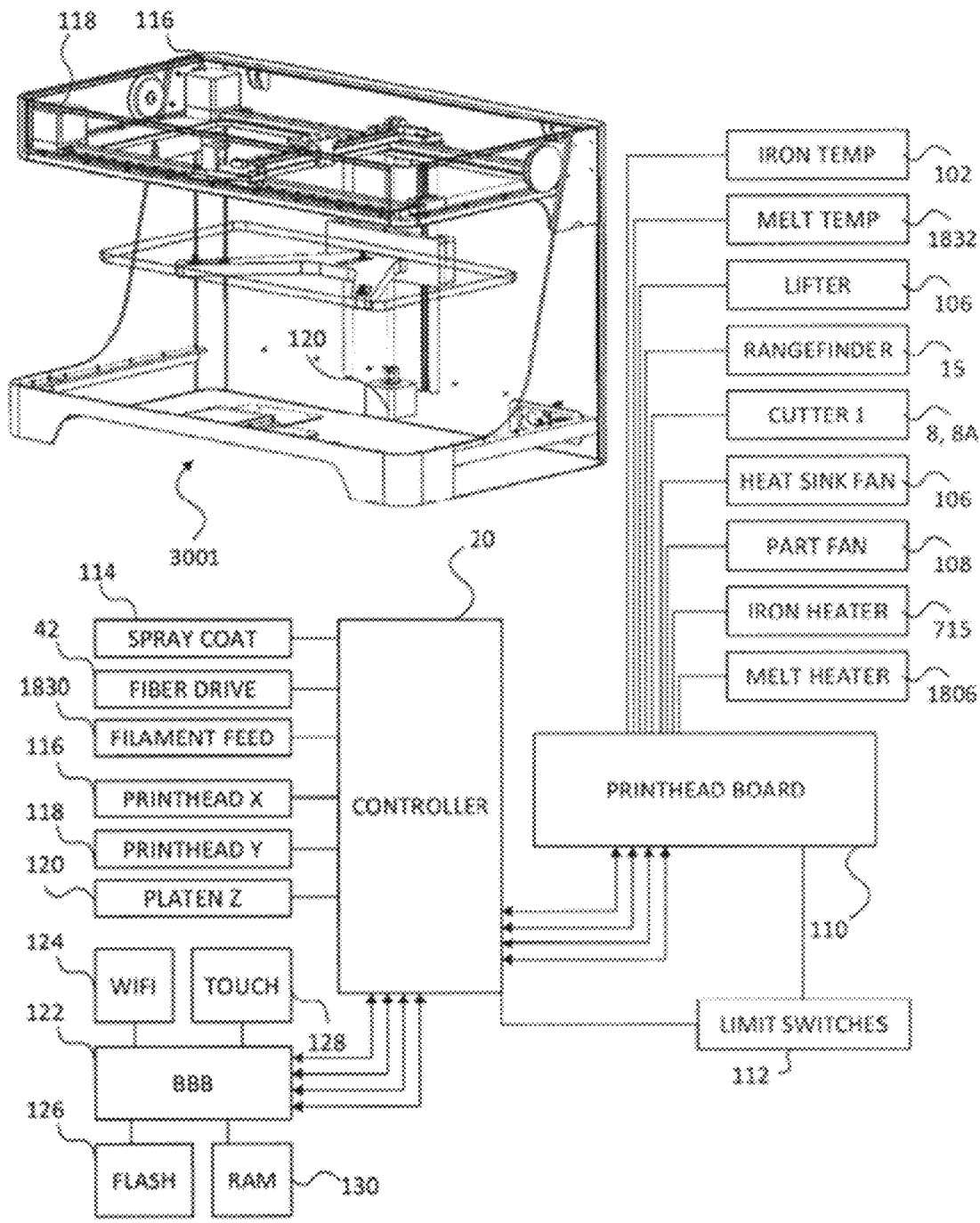
FIG. 2 is a block diagram and schematic representation of a three dimensional printer system.

FIG. 2 depicts a block diagram and control system of the three dimensional printers, e.g., in FIGS. 1A and 1B, which controls the mechanisms, sensors, and actuators therein, and executes instructions to perform the control profiles depicted in and processes described herein. A printer is depicted in schematic form to show possible configurations of e.g., three commanded motors 116, 118, and 120. It should be noted that this printer may include a compound assembly of printheads 18, 18a, 18b, and/or 10.

As depicted in FIG. 2, the three-dimensional printer 3001 (also representative of printer 1000 and 1000J) includes a controller 20 which is operatively connected to any fiber head heater 715 or similar tip heater, the fiber filament drive 42 and the plurality of actuators 116, 118, 120, wherein the controller 20 executes instructions which cause the filament drive 42 to deposit and/or compress fiber into the part. The instructions are held in flash memory and executed in RAM (not shown; may be embedded in the controller 20). An actuator 114 for applying a spray coat (including a spray release powder), as discussed herein, may also be connected to the controller 20. In addition to the fiber drive 42, respective filament feeds 1830 (e.g., up to one each for heads 18, 18a, and/or 18b) may be controlled by the controller 20 to supply one or more extrusion printheads 18, 18a, 18b, 1800. A printhead board 110, optionally mounted on the compound printhead and moving therewith and connected to the main controller 20 via ribbon cable, breaks out certain inputs and outputs.

As depicted in FIG. 2, an additional breakout board 122, which may include a separate microcontroller, provides user interface and connectivity to the controller 20. An 802.11 Wi-Fi transceiver connects the controller to a local wireless network and to the Internet at large and sends and receives remote inputs, commands, and control parameters. A touch screen display panel 128 provides user feedback and accepts inputs, commands, and control parameters from the user. Flash memory 126 and RAM 130 store programs and active instructions for the user interface microcontroller and the controller 20.

Figure 3:
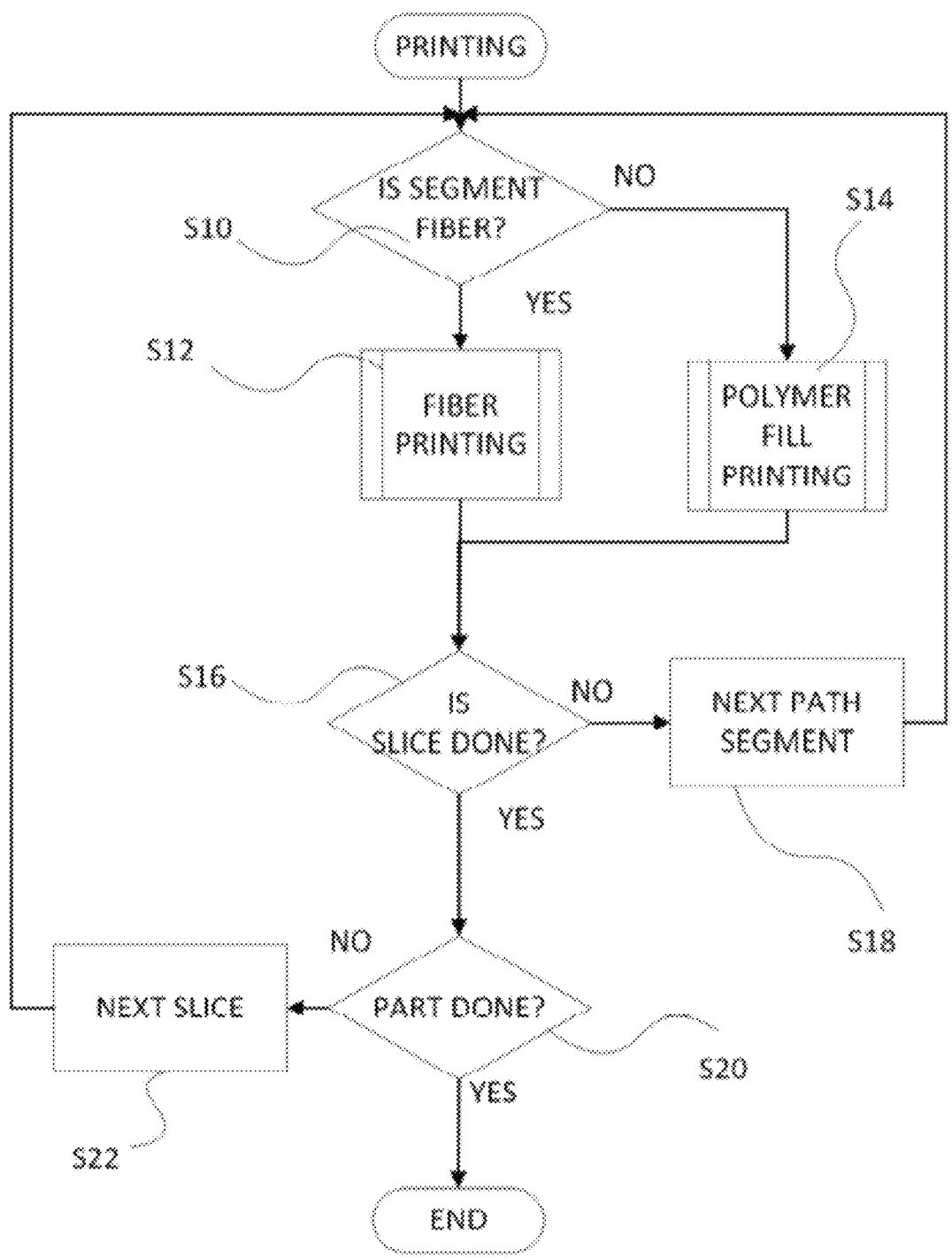
FIG. 3 is a flowchart describing the overall operation of the 3D printer of FIG. 2.

FIG. 3 depicts a flowchart showing a printing operation of the printers 1000. FIG. 3 describes, as a coupled functionality, control routines that may be carried out to alternately and in combination use the co-mounted FFF extrusion head(s) 18, 18a, and/or 18b and/or a fiber reinforced filament printing head as in the CFF patent applications.

In FIG. 3, at the initiation of printing, the controller 20 determines in step S10 whether the next segment to be printed is a fiber segment or not, and routes the process to S12 in the case of a fiber filament segment to be printed and to step S14 in the case of other segments, including e.g., base (such as a raft or shrinking/densification linking platform), fill (such as extruded or jet-bound model material, release material, or placeholder material), or coatings (such as sprayed or jetted release material). After each or either of routines S12 and S14 have completed a segment, the routine of FIG. 3 checks for slice completion at step S16, and if segments remain within the slice, increments to the next planned segment and continues the determination and printing of fiber segments and/or non-fiber segments at step S18. Similarly, after slice completion at step S16, if slices remain at step S20, the routine increments at step S22 to the next planned slice and continues the determination and printing of fiber segments and/or non-fiber segments. "Segment" as used herein corresponds to "toolpath" and "trajectory", and means a linear row, road, or rank having a beginning and an end, which may be open or closed, a line, a loop, curved, straight, etc. A segment begins when a printhead begins a continuous deposit of material, and terminates when the printhead stops depositing. A "slice" is a single layer, shell or lamina to be printed in the 3D printer, and a slice may include one segment, many segments, lattice fill of cells, different materials, and/or a combination of fiber-embedded filament segments and pure polymer segments. A "part" includes a plurality of slices to build up the part. Support structures and platforms also include a plurality of slices. FIG. 3's control routine permits dual-mode printing with one, two, or more (e.g., four) different printheads, including the compound printheads 18, 18a, 18b, and/or 10. For example, the decision at S10 may be a "case" structure which proceeds to different material printing routines in addition to S12, S14.

All of the printed structures previously discussed may be embedded within a printed article during a printing process, as discussed herein, expressly including reinforced fiber structures of any kind, sparse, dense, concentric, quasi-isotropic or otherwise as well as fill material (e.g., including model material and release material) or plain resin structures. In addition, in all cases discussed with respect to embedding in a part, structures printed by fill material heads 18, 18a, 18b using thermoplastic extrusion deposition may be in each case replaced with soluble material (e.g., soluble thermoplastic or salt) to form a soluble preform which may form a printing substrate for part printing and then removed. All continuous fiber structures discussed herein, e.g., sandwich panels, shells, walls, reinforcement surrounding holes or features, etc., may be part of a continuous fiber reinforced part. The 3D printer herein discussed with reference to FIGS. 1-40 may thereby deposit either fill material (e.g., composite with a debindable matrix containing metal, ceramic, and/or fibers), soluble (e.g., "soluble" also including, in some cases, debindable by thermal, pyrolytic or catalytic process) material, or continuous fiber.

Commercially valuable metals suitable for printing include aluminum, titanium and/or stainless steel as well as other metals resistant to oxidation at both high and low temperatures (e.g., amorphous metal, glassy metal or metallic glass). One form of post-processing is sintering. By molding or 3D printing model material as described herein, a green body may be formed from an appropriate material, including a binder or binders and a powdered or spherized metal or ceramic (of uniform or preferably distributed particle or sphere sizes). A brown body may be formed from the green body by removing one or more binders (e.g., using a solvent, catalysis, pyrolysis). The brown body may retain its shape and resist impact better than the green body due to remelting of a remaining binder. In other cases, the brown body may retain its shape but be comparatively fragile. When the brown body is sintered at high temperature and/or pressure, remaining or second stage binder may pyrolyse away, and the brown body substantially uniformly contracts as it sinters. The sintering may take place in an inert gas, a reducing gas, a reacting gas, or a vacuum. Application of heat (and optionally pressure) eliminates internal pores, voids and microporosity between and within the metal or ceramic beads through at least diffusion bonding and/or atomic diffusion. Supporting material, either the same or different from model material, supports the part being printed, post-processed, or sintered versus the deposition force of printing itself (e.g., green body supports) and/or versus gravity (e.g., green body supports or sintering supports), particularly for unsupported straight or low-angle spans or cantilevers.

Printing a part is aided by the support structures, able to resist the downward pressure of, e.g., extrusion, and locate the deposited bead or deposition in space. As discussed herein a release layer includes a higher melting temperature or sintering temperature powdered material—ceramic for example, optionally deposited in or via a similar (primary) matrix component to the model material. Beneath the release layer, the same (metal) material is used as the part, promoting the same compaction/densification. This tends to mean the part and the supports will shrink uniformly, maintaining overall dimensional accuracy of the part. At the bottom of the sintering support, a release layer may also be printed. In addition, the sintering support structures may be printed sections with release layers, such that the final sintered support structures will readily break into smaller subsections for easy removal, optionally in the presence of mechanical or other agitation. In this way, a large support structure can be removed from an internal cavity via a substantially smaller hole. In addition, or in the alternative, a further method of support is to print soluble support material that is removed in the debinding process. For catalytic debind, this may be Delrin (POM) material. One method to promote uniform shrinking is to print a ceramic release layer as the bottom most layer in the part. On top of the sliding release layer (analogous to microscopic ball bearings) a thin sheet of metal—e.g., a raft—may be printed that will uniformly shrink with the part, and provide a "shrinking platform" or "densification linking platform" to hold the part and the related support materials in relative position during the shrinking or densification process. Optionally staples or tacks, e.g., attachment points, connect and interconnect the model material portions being printed.

As noted, in one example, green body supports may be printed from a thermal, soluble, pyrolytic or catalytically responsive material (e.g., polymer or polymer blend) and leave behind only removable byproducts (gases or dissolved material) when the green body supports are removed. In another example, green body supports may optionally be printed from a matrix of thermal, soluble, or catalytic debindable composite material (e.g., catalytic including Polyoxymethylene—POM/acetal) and high melting point metal (e.g., molybdenum) or ceramic spheres, and leave behind a powder when debound. The green body supports may be formed to be mechanically or chemically or thermally removed before or after debinding, but preferably are also made from thermal, soluble, pyrolytic or catalytically responsive material, and may be fully removed during the debinding stage (or immediately thereafter, e.g., subsequent powder cleaning to remove remainder powder). In some cases, the green body supports are removed by a different chemical/thermal process from the debinding, before or after debinding.

An exemplary catalytically debindable composite material including POM or acetal is one example of a two-stage debinding material. In some cases, in a two-stage debinding material, in a first stage a first material is removed, leaving interconnected voids for gas passage during debinding. The first material may be melted out (e.g., wax), catalytically removed (e.g., converted directly into gas in a catalytic surface reaction), or dissolved (in a solvent). A second stage binder, e.g., polyethylene, that is not as responsive to the first material process, remains in a lattice-like and porous form, yet maintaining the shape of the 3D printed object awaiting sintering (e.g., before the metal or ceramic balls have been heated to sufficient temperature to begin the atomic diffusion of sintering). This results in a brown part, which includes, or is attached to, the sintering supports. As the part is sintered at high heat, the second stage binder may be pyrolysed and progressively removed in gaseous form.

Figure 4:
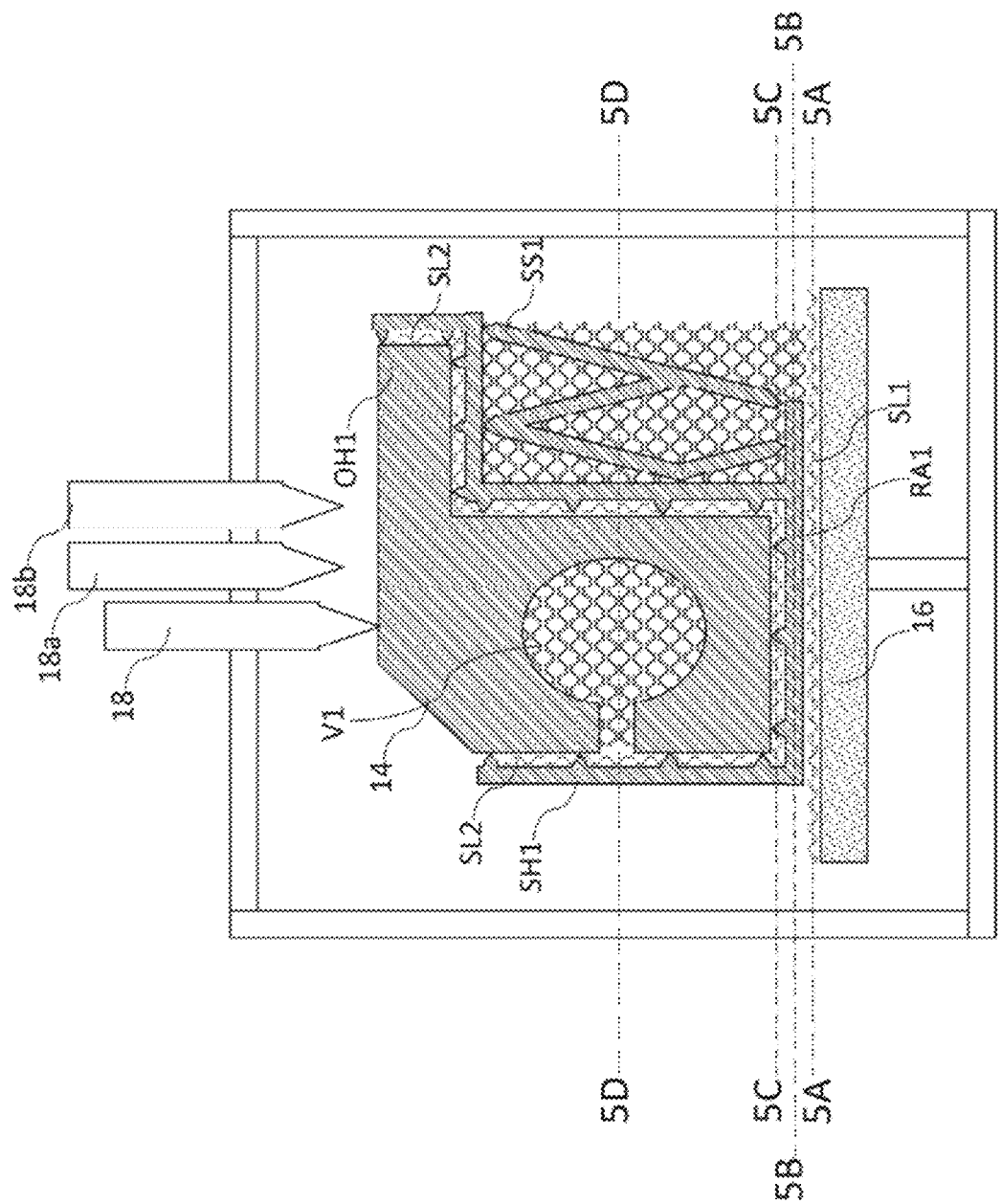
FIG. 4 is a schematic representation of a 3D printing system, part, and process in which sintering supports (e.g., shrinking or densification linking supports) are provided.
Figure 5:
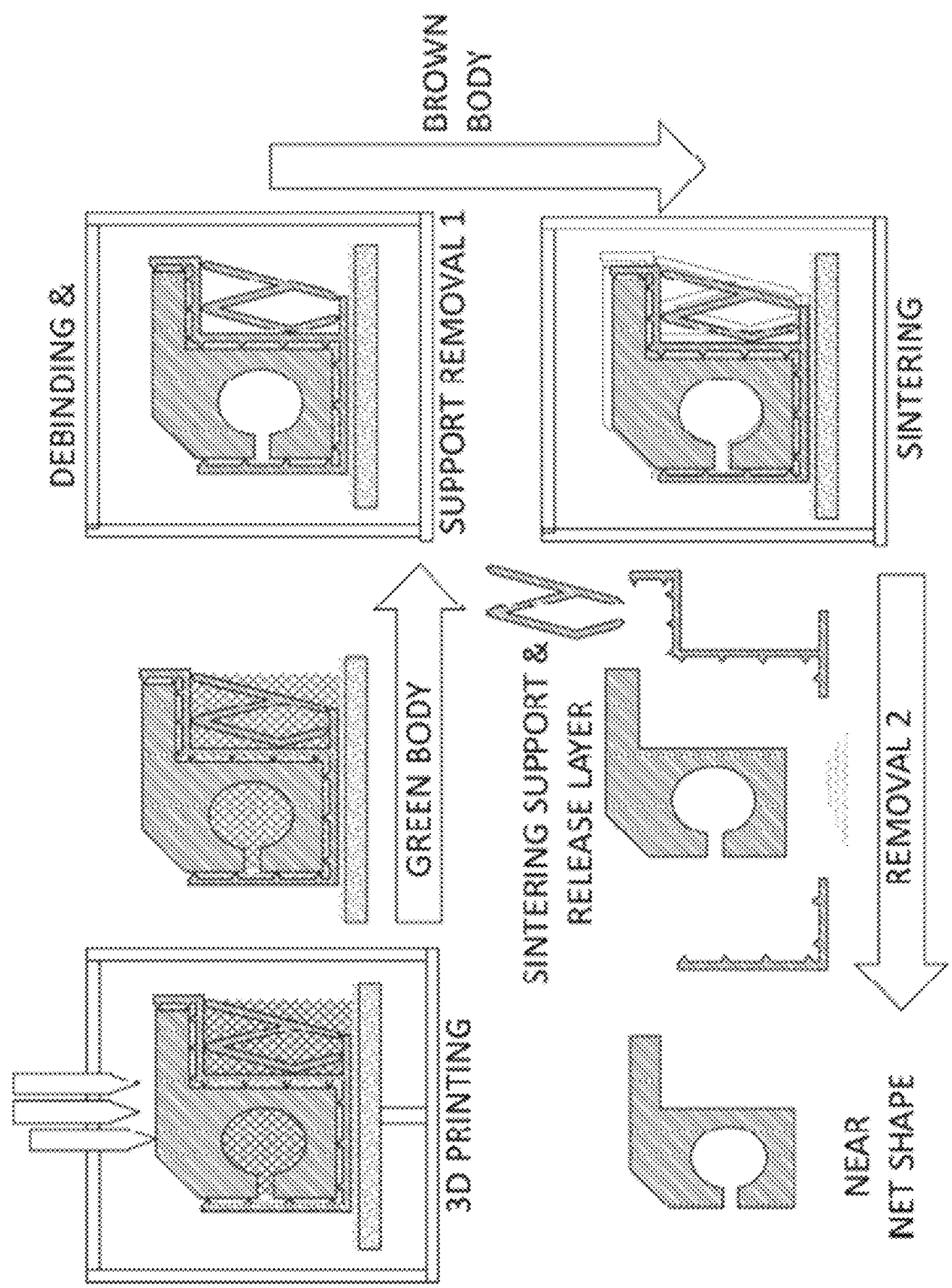
FIG. 5 is a schematic representation of one exemplary process of printing, debinding, sintering, and support removal with separation and/or release layers, green body supports and/or sintering or shrinking or densification linking supports.

FIGS. 4 and 5 show, in schematic form, additional explanation of relevant processes, structures, materials, and systems. As shown in FIGS. 4 and 5, a 3D printer 1000 suitable for the deposition phase of the process may include one, two, three, or more deposition heads 18, 18a, 18b for depositing model material and supports (as well as, e.g., a continuous composite deposition head 10, not shown in FIGS. 4 and 5). As shown in FIG. 4, a model material deposition head 18 deposits a composite material including metal or ceramic spherized powder as well as a meltable or matrix of binding polymers, waxes, and/or other utility components. In the model material deposition head 18, the process may use a low-diameter filament (e.g., 1-4 mm) as both material supply and to provide back pressure for extrusion. In this case, the model material extrusion filament supplied to head 18 may be stiff, yet reasonably pliable as supplied (e.g., 0.1-3.0 GPa flexural modulus) and reasonably viscous when fluidized (e.g., melt or dynamic viscosity of 100-10,000 Pa·s, preferably 300-1000 Pa·s) in order to support bridging while printing across gaps or spans, even absent green body supports or sintering (i.e., shrinking or densification linking) supports below.

In the 3D printer 1000 and exemplary part 14 shown in FIG. 4, a separation or release material deposition head 18-S (or 18a) and a green body support material deposition head 18-G (or 18b, the green body support material also or alternatively being a placeholder material) may additionally be supported to move in at least three relative degrees of freedom with respect to the part P1 being printed as discussed with reference to FIGS. 1-3 inclusive. As discussed herein, the separation material may in some cases serve as a green body support, so alternatively, only one head 18-SG may deposit both green body support material and separation material. As shown in FIG. 4, from bottom to top (in this case, 3D printing is performed from the bottom up), in these exemplary processes the first layer printed is a raft separation layer or sliding release layer SL1 printed from, e.g., the separation material deposition head 18-S (or 18-SG). The separation material may be, as noted herein, of similar debinding materials to the model material, but, e.g., with a ceramic or other spherical powder filler (e.g., particulate) that does not sinter, melt, or otherwise harden together at the sintering temperature of the model material. Consequently, the separation material may have its debinding material completely removed by solvent, catalysis, pyrolysis, leaving behind a dispersible and/or removable powder (e.g., after sintering, the powder of the separation material remaining unsintered even after the sintering process). "Separation" and "release" are generally used interchangeably herein.

As shown in FIG. 4, upon an optionally removable and transportable, optionally ceramic build plate 16, a raft separation layer SL1 is printed by separation material head 18-S to permit a raft or shrinking platform or densification linking platform RA1 printed above to be readily removed from the build plate 16, in some cases before debinding, or in some cases when the (e.g., portable) build plate 16 itself is still attached through the debinding process (in the example shown in FIG. 5).

As shown in FIG. 4, following the printing of the raft separation layer SL1, a raft or shrinking platform or densification linking platform RA1 of model material (e.g., metal-bearing composite) is printed. The raft or shrinking platform RA1 is printed, e.g., for a purpose of providing a continuous model material foundation or material interconnection among the part and its supports, so that the process of mass transport and shrinking/densification during sintering is uniformly carried out, e.g., about a common centroid or center of mass, e.g., "densification linking". The raft RA1 may serve other purposes—e.g., improving early adhesion, clearing environmentally compromised (e.g., wet, oxidized) material from an extrusion or supply path, or conditioning printing nozzles or other path elements (e.g., rollers) to a printing state, etc. As noted, two general classes of supports may be used: green body supports GS1, GS2 (which support the part being printed during the printing process, but are removed before or during sintering) and sintering (e.g., shrinking or densification linking) supports SS1, SH1, RA1 (which support the part being sintered during the sintering process). Green body support GS2 also may be used to "placehold" internal volumes, either holes or cavities in the part shape itself or internal honeycomb cavities. Some supports may serve both roles. As shown in FIG. 4, should an upper portion of the entire print benefit from green body supports, the lower layers of green body supports GS1 may be printed upon either the build plate 16, or as shown in FIG. 4, upon the separation layer SL1 and/or the raft or shrinking platform RA1.

As shown in FIG. 4, subsequently, the raft or shrinking platform RA1 may be continued up into or connected up to a surrounding or lateral shell support structure SH1 (either contiguously or via a parting line PL and/or physical separation structure, e.g., a pinched and/or wasp-waisted and/or perforated or otherwise weakened cross-section that may be flexed to break away). "Printing support" as used herein may mean support vs. printing back pressure or gravity during printing, while "sintering support" may mean support vs. gravity, support vs. other external/internal stress during sintering, as well as or alternatively meaning providing interconnections facilitating evenly distributed mass transport and/or atomic diffusion. Although an overhanging or cantilevered portion OH1 is show in FIG. 4, an unsupported span contiguous to the part P1 at two opposing sides, may also benefit from supports as described.

As shown in FIG. 4, the surrounding shell support structure SH1 is continued up printing in layers, and optionally interconnected vertically or diagonally to the part 14 via, e.g., protrusions P1 of model material connected to the shell support structure SH1, and/or separation layer material SL2 material.

As shown in FIG. 4, an overhang or cantilevered portion OH1 may be supported by sintering supports SS1 at an angle, so long as the sintering supports SS1 are self-supporting during the printing process e.g., either by the inherent stiffness, viscosity, or other property of the model material as it is printed in layers stacking up at a slight offset (creating the angle), or alternatively or in addition with the lateral and vertical support provided by, e.g., the green body supports GS1. The sintering supports SS1 must also be robust to remain integral with the part 14 or supporting the part 14 through the sintering process. Any of the sintering supports SS1 may alternatively be vertical columns or encased by a columnar sintering support encasing structure deposited from model material.

Finally, as shown in FIG. 4, the remainder of the part 14, support shell structure SH1, sintering (e.g., shrinking or densification linking) supports SS1, and green body supports GS1, GS2 are printed to completion. As printed, essentially all portions of the part 14 which require printing or sintering support are supported in a vertical direction either via green body supports GS1, GS2, sintering (e.g., shrinking or densification linking) supports SS1, the raft RA1, separation layer SL1 and/or SL2. Portions of the part 14, or structures within the part 14 that are self-supporting (because, e.g., of the material properties of the model material composite, or external bodies providing support, and/or those which are sufficiently stiff during support removal, debinding, and/or sintering) need not be supported vs. gravity. In addition, the support structures SS1, the raft RA1, and/or the shell structure SH1 are interconnected with model material to the part 14 in a manner that tends to shrink during sintering about a same centroid or center of mass or at least maintain relative local scale with respect to the neighboring portion of the part 14. Accordingly, during the approximately 12-24% (e.g., 20%) uniform shrinking or densification of the sintering process, these support structures shrink or densify together with the part 14 and continue to provide support vs. gravity.

FIG. 5 shows one overall schematic of the process. Components in FIG. 5 correspond to those of the same appearance labeled in FIG. 4, but are not labeled in FIG. 5 so that different steps may be shown. Initially, in the 3D printing phase, the part 14, together with its green body supports GS, sintering supports SS, and separation layers SL (as described and shown in FIG. 4), is printed in a 3D printer as described. The green body, including all of these support structures (e.g., a green body assembly GBA), and optionally still bound or connected to a ceramic or other material build plate 16, is transferred to a debinding chamber (optionally, the debinding chamber is integrated in the 3D printer 1000 or vice versa). As noted, if the green body supports are made of a different polymer, binder or substance than the first stage debinding material, a separate process may remove the green body supports before debinding. If the green body supports are made from either the same or similar substances as the first stage debinding material, or one that responds to the same debinding process by decomposing or dispersing, the green body supports may be removed during debinding. Accordingly, as shown in FIG. 5, debinding includes removing a first binder component from the model material using a thermal process, a solvent process, a catalysis process, or a combination of these, leaving a porous brown body structure ("DEBINDING"), and may optionally include dissolving, melting, and/or catalyzing away the green body supports ("SUPPORT REMOVAL 1").

Continuing with FIG. 5, as shown, a brown body (e.g., a brown body assembly BBA with the attached sintering support and/or surrounding shell) is transferred to a sintering chamber or oven (optionally combined with the printer and/or debinding chamber). The brown body, e.g., as a brown body assembly BBA, includes the part, optionally a surrounding shell structure, and optionally sintering supports. As noted, the surrounding shell structure and sintering (e.g., shrinking or densification linking) supports are different aspects of sintering support structure. Optionally, intervening between the shell structure and/or sintering supports are separation layers, formed from, e.g., the separation material. Optionally, intervening between the shell structure and/or sintering supports are protrusions or ridges of model material interconnecting these to the part. Optionally, the same or a similar separation material intervenes between the brown body (e.g., as brown body assembly) and the build plate. During sintering, the brown body (e.g., as a brown body assembly) uniformly shrinks by approximately 12-24%, such as 20%, closing internal porous structures in the brown body (e.g., as a brown body assembly) by atomic diffusion. The second stage debinding component of the model material may be pyrolysed during sintering (including, for example, with the assistance of catalyzing or other reactive agents in gas or otherwise flowable form).

As shown in FIG. 5, a sintered body (e.g., as a sintered body assembly) can be removed from the sintering oven. The supporting shell structure and the sintering supports can be separated or broken up along parting lines, and/or along separation layers, and or by snapping or flexing or applying an impact to protrusion connections, tacks or other specifically mechanically weak structures. The separation layers are powderized and are readily removed. Should the green body supports be formed from the separation material, the green body supports are similarly powderized and may be readily removed.

Figure 6:
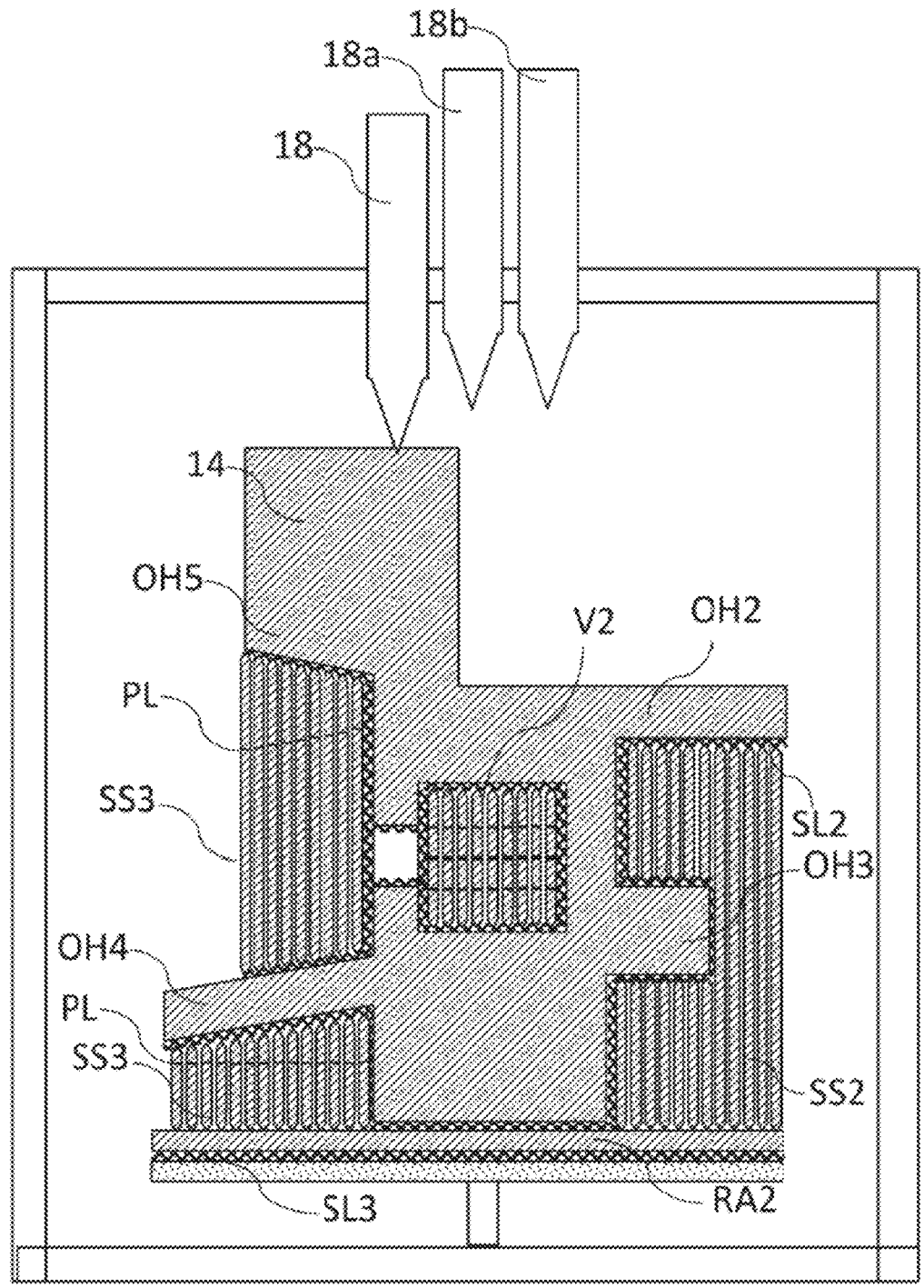
FIG. 6 is a schematic representation of an additional alternative 3D printing system, part, and process to that of FIG. 4.

FIG. 6 shows a variation of a part printed as in FIG. 4. The part shown in FIG. 6 includes four overhanging or cantilevered sections OH2-OH5. Overhang OH2 is a lower, thicker overhang under a cantilevered, thinner overhang OH3. While the lower overhang OH2 may in some cases be printed without sintering supports or even green-body supports as a self-supporting cantilever, it is below the long cantilever overhang OH3, which is sufficiently long, thin, and heavy that it may require both green body supports and sintering supports. Overhang OH4 is a downward-leaning overhang, which generally must be printed with at least green body supports (because its lowest portion is otherwise unsupported, i.e., in free space, during printing) and in a form difficult to remove sintering supports printed beneath without drafting or parting lines (because rigid sintering supports would become locked in). Overhang OH5 is a cantilever including a heavy block of model material, which may require both green body and sintering support. In addition, the part shown in FIG. 6 includes an internal, e.g., cylindrical volume V2, from which any necessary sintering supports must be removed via a small channel.

As shown in FIG. 6, in contrast to the sintering supports SS1 of FIG. 4, sintering (e.g., shrinking or densification linking) supports SS2, supporting overhangs OH2 and OH3, may be formed including thin walled, vertical members. These vertical members form vertical channels which, as described herein, may permit fluid flow for debinding. The vertical members of sintering supports SS2 may be independent (e.g., vertical rods or plates) or interlocked (e.g., accordion or mesh structures). As shown in FIG. 6, the sintering supports SS2 (or indeed the sintering supports SS1 of FIG. 4, or the sintering supports SS3, SS4, and SS5 of FIG. 6) may be directly tacked (e.g., "tacked" may be contiguously printed in model material, but with relatively small cross-sectional area) to a raft RA2, to the part 14a, and/or to each other. Conversely, the sintering supports SS2 may be printed above, below, or beside a separation layer, without tacking. As shown, the sintering supports SS2 are removable from the orthogonal, concave surfaces of the part 14a.

Further, as shown in FIG. 6, similar sintering (e.g., shrinking or densification linking) supports SS3 are printed beneath the downward-leaning overhang OH4, and beneath heavier overhang OH5. In order that these supports SS3, may be readily removed, some or all are printed with a parting line PL, e.g., formed from separation material, and/or formed from a mechanically weakened separation structure (e.g., printing with a nearly or barely abutting clearance as described herein, or printing with a wasp-waisted, pinched, or perforated cross-section, or the like), or a combination of these (or, optionally, a combination of one or both of these with green body support material having little or no ceramic or metal content, should this be separately printed). These material or mechanical separation structures, facilitating removal of the sintering supports, may be similarly printed into the various sintering supports shown in FIGS. 4 and 5, and throughout.

In addition, as shown in FIG. 6, sintering (e.g., shrinking or densification linking) supports SS5 are printed within the internal volume V2. The sintering supports SS5 are each provided with multiple parting lines, e.g., printed in a plurality of separable segments, so that the sintering supports in this case can be broken or fall apart into parts sufficiently small to be readily removed, via the channel connecting the internal volume V2. As shown, the channel CH2 itself is not printed with internal supports, as an example of a small-diameter hole of sufficient rigidity during both printing and sintering to hold its shape. Of course, supports may be printed of either or both types in channel CH2 to ensure shape retention.

Sintering supports SS1, SS2, SS3 may be formed in blocks or segments with at least some intervening release layer material, so as to come apart during removal. In any of these Figures and throughout, supports may be tacked or untacked. "Untacked" sintering supports may be formed from the model material, i.e., the same composite material as the part, but separated from the part to be printed by a release layer, e.g., a higher temperature composite having the same or similar binding materials. For example, for most metal printing, the release layer may be formed from a high temperature ceramic composite with the same binding waxes, polymers, or other materials. The release layer may be very thin, e.g., one 3D printing layer. When the metal is sintered, the release layer—having already had a first stage binder removed—is essentially powderized as the temperature is insufficient to sinter or diffusion bond the ceramic material. This enables the untacked sintering supports to be easily removed after sintering.

"Tacked" sintering supports, in contrast, may be similarly formed from the model material, i.e., the same composite material as the part, but may connect to the part either by penetrating the release layer or without a release layer. The tacked sintering supports are printed to be contiguous with the part, via thin connections, i.e., "tacked" at least to the part. The tacked sintering supports may in the alternative, or in addition, be printed to be contiguous with a raft below the part that interconnects the part and the supports with model material. The raft may be separated from a build plate of a 3D printer by a layer or layers of release layer material.

A role of tacked and untacked of sintering supports is to provide sufficient supporting points versus gravity to prevent, or in some cases remediate, sagging or bowing of bridging, spanning, or overhanging part material due to gravity. The untacked and tacked sintering supports are both useful. Brown bodies, in the sintering process, may shrink by atomic diffusion, e.g., uniformly about the center of mass or centroid of the part. In metal sintering and some ceramics, typically this is at least in part solid-state atomic diffusion. While there may be some cases where diffusion-based mass transport among the many interconnected metal/ceramic spheres does not transport sufficient material to, e.g., maintain a very thin bridge joining large masses, this is not necessarily the case with supports, which may be contiguously formed connected at only one end as a one-ended bridge (or connected at two ends as two-ended bridges; or interconnected over the length).

In those cases where tacked sintering supports are tacked to, or connected to, or linked to, a model material raft or shrinking platform or densification linking platform upon which the part is printed, the interconnection of model material among the tacked sintering supports and the raft can be arranged such that the centroid of the raft-supports contiguous body is at or near the same point in space as that of the part, such that the part and the raft-support contiguous to the part each shrink during sintering uniformly and without relative movement that would move the supports excessively with respect to the part. In other cases, the part itself may also be tacked to the model material raft, such that the entire contiguous body shrinks about a common centroid. In another variation, the part is interconnected to the raft via tacked sintering supports tacked at both ends (e.g., to the raft and to the part) or and/along their length (e.g., to the part and/or to each other).

In other cases, untacked sintering supports may be confined within a volume and contiguous with the raft and/or the part, the volume formed from model material, such that they may shrink about their own centroids (or interconnected centroid) but are continually moved through space and kept in a position supporting the part by the surrounding model material. For example, this may be effective in the case of the internal volume V2 of FIG. 6.

In the alternative, or in addition, support or support structures or shells may be formed from model material following the form of the part in a lateral direction with respect to gravity, e.g., as shown in certain cases. The model material shells may be printed tacked to the base raft (which may be tacked to the part). They may be printed integral with, but separable from the base raft. The base raft may be separable together with the model material shells. These support structures may be offset from or substantially follow the lateral outer contours of the part, or may be formed from primitive shapes (straight or curved walls) but close to the part. In one variation, the support structures may envelop the part on all sides (in many cases, including parting lines and/or separation structures to permit the shell to be removed). These offset support structures may be printed with a separation layer or layers of the separation material (optionally ceramic or another material that will transfer mechanical support but will not be difficult to separate).

Any of the support structures discussed herein—e.g., tacked or untacked sintering supports, and/or support shells, may be printed with, instead of or in addition to intervening separation material, a separation clearance or gap (e.g., 5-100 microns) between the part and support structure (both being formed from model material). In this manner, individual particles or spheres of the support structure may intermittently contact the part during sintering, but as the separation clearance or gap is preserved in most locations, the support structures are not printed with compacted, intimate support with the part. When and if bonding diffusion occurs at intermittently contacting particles, the separation force required to remove the separation clearance support structures after sintering may be "snap-away" or "tap-away", and in any case far lower than an integral or contiguous extension of the part. Larger separation clearances or gaps (e.g., 200-300 microns) may permit debinding fluid to penetrate and/or drain.

In an alternative, separation gaps or clearances between the part and support structures may be placed in partial segments following the contour, with some of the remainder of the support structures following the e.g., lateral contour of the part more closely or more distantly, or both. For example, support structures may be printed with a small separation gap (5-100 microns) for the majority of the support structure, but with other sections partially substantially following the contour printed yet closer to the part (e.g., 1-20 microns) providing increased rigidity and support during sintering, yet generally over a set of limited contact areas (e.g., less than 5% of contact area), permitting removal. This may also be carried out with large and medium gaps (e.g., 100-300 microns separation for the larger clearance support structures, optionally with separation material intervening, and 5-100 microns for the more closely following support structures). Further, this may be carried out in three or more levels (e.g., 100-300 micron gaps, 5-100 micron gaps, and 1-20 micron gaps in different portions of the support structures following the contour of the part).

Optionally, the sintering support structures may include a following shell with an inner surface generally offset from the e.g., lateral part contour by a larger (e.g., 5-300 microns) gap or clearance, but will have protrusions or raised ridges extending into the gap or clearance to and separated by the smaller gap (e.g., 1-20 microns), or extending across the gap or clearance, to enable small point contacts between the part and support structures formed from the same (or similar) model material. Point contacts may be easier to break off after sintering than compacted, intimate contact of, e.g., a following contour shell. Optionally, a neat matrix (e.g., green body supports formed from one or more of the binder components) support structure may be printed between model material (e.g., metal) parts and model material (e.g., metal) support structures to maintain the shape of the part and structural integrity during the green and brown states, reducing the chance of cracking or destruction in handling.

Figure 7:
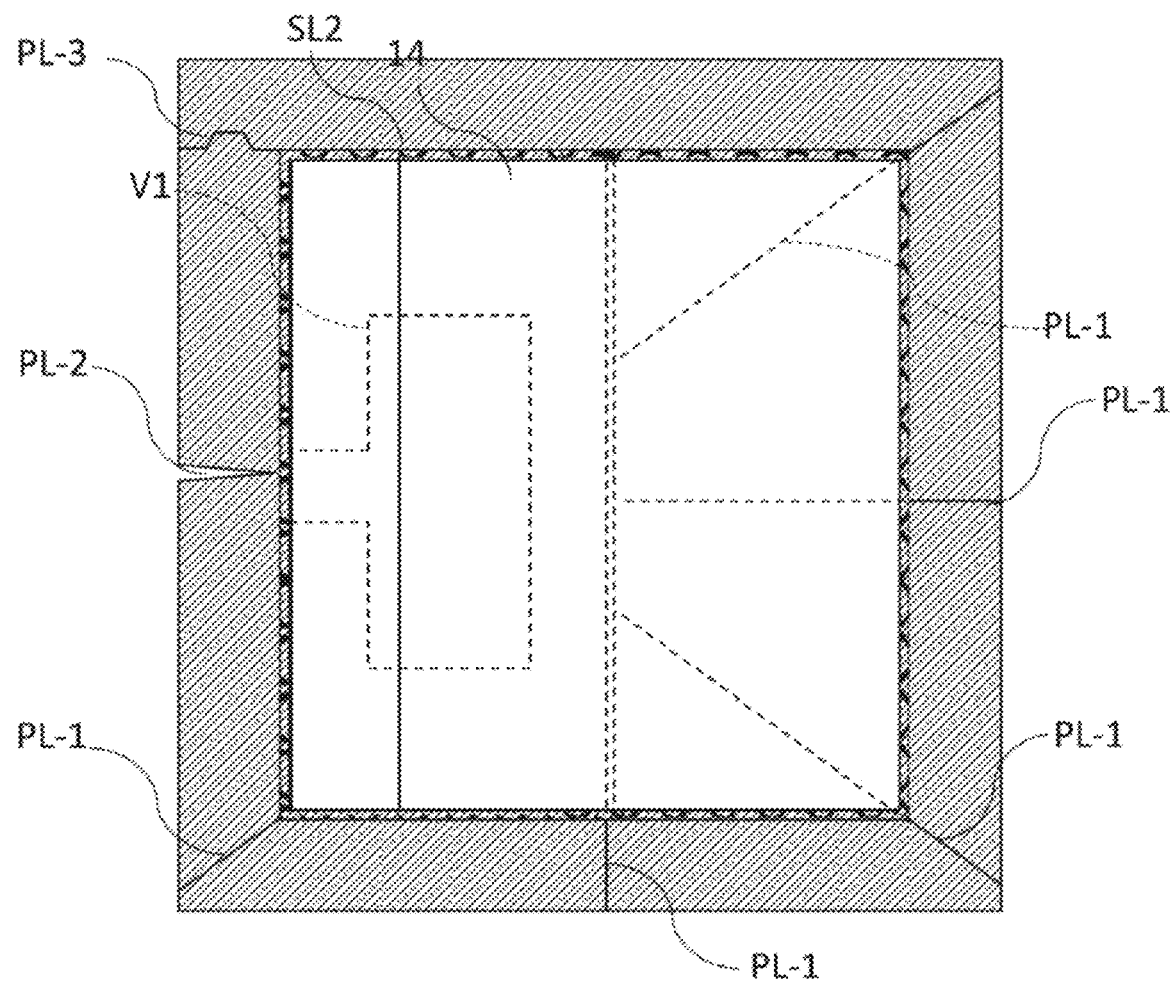
FIG. 7 is a top view of a sintered assembly of an alternative 3D printing system, part, and process to that of FIG. 4, showing parting lines for removing support shells or sintering or shrinking supports.

FIG. 7 shows a variation of the sintered body structure of FIG. 4 in a top view. In the case of complex geometries, as noted above, support structures may be printed with parting lines, sectioned into smaller subsections (e.g., as PL-1 in FIG. 7, like orange slices, or further sectioned in an orthogonal axis such that they can be easily removed), as shown in FIG. 7. For example, if support structures are printed filling in a dovetail of a part, support structures could be formed in three parts, e.g., could be designed in three parts, such that the center part either has draft or is rectangular and can be easily removed, thereby freeing up the two side parts to slide inward and then be removed. Conversely, parting lines may be printed to be interlocking (e.g., PL-3 in FIG. 7), crenellated or formed as a box joint (e.g., similar to PL-3 in FIG. 7), so as to resist separation, in some cases more than in a transverse direction. Parting lines may be printed nearly almost cut through the support shell (e.g., PL-2 in FIG. 7). Note that FIG. 7 is depicted without protrusions P1, i.e., with only separation layers SL2 in the vertical direction, and largely monolithic, surrounding support shell SH.

As discussed herein, a feedstock material for forming the part and/or the sintering supports may include approximately 50-70% (preferably approx. 60-65%) volume fraction secondary matrix material, e.g., (ceramic or metal) substantially spherical beads or powder in 10-50 micron diameter size, approximately 20-30% (preferably approx. 25% volume fraction of soluble or catalysable binder, (preferably solid at room temperature), approximately 5-10% (preferably approx. 7-9%) volume fraction of pyrolysable binder or primary matrix material, (preferably solid at room temperature), as well as approximately 0.1-15% (preferably approx. 5-10%) volume fraction of carbon fiber strands, each fiber strand coated with a metal that does not react with carbon at sintering temperatures or below (e.g., nickel, titanium boride). As discussed herein, the "primary matrix" is the polymer binder and is deposited by the 3D printer, holding the "secondary matrix" beads or spheres and the fiber filler; and following sintering, the (ceramic or metal) material of the beads or spheres becomes the matrix, holding the fiber filler.

Alternatively, a feedstock material for forming the part and/or the sintering supports may include approximately 50-70% (preferably approx. 60-65%) volume fraction secondary matrix material, e.g., (ceramic or metal) substantially spherical beads or powder in 10-50 micron diameter size, approximately 20-30% (preferably approx. 25% volume fraction of soluble or catalysable binder, (preferably solid at room temperature), approximately 5-10% (preferably approx. 7-9%) volume fraction of a pyrolysable binder or secondary matrix material approximately $\frac{1}{10}$-$\frac{1}{200}$ the elastic modulus of the (ceramic or metal) secondary matrix material, and approximately 0.1-15% (preferably approx. 5-10%) volume fraction of particle or fiber filler of a material approximately 2-10 times the elastic modulus of the secondary, (metal or ceramic) matrix material. As discussed herein, the "primary matrix" is the polymer binder and is deposited by the 3D printer, holding the "secondary matrix" beads or spheres and the fiber filler; and following sintering, the (ceramic or metal) material of the beads or spheres becomes the matrix, holding the particle of fiber filler.

A comparison of elastic modulus may be found in the following table, with polymer/binder primary matrices of 1-5 GPa elastic modulus.

| Secondary matrix | Elastic Modulus ($10^9$ N/m², GPa) | Fill | Elastic Modulus ($10^9$ N/m², GPa) |
|---|---|---|---|
| Steel | 180-200 | Carbon Fiber | 200-600 |
| Aluminum | 69 | Graphite Fiber | 200-600 |
| Copper | 117 | Boron Nitride | 100-400 |
| Titanium | 110 | Boron Carbide | 450 |
| Alumina | 215 | Silicon Carbide | 450 |
| Cobalt | 209 | Alumina | 215 |
| Bronze | 96-120 | Diamond | 1220 |
| | | Tungsten Carbide | 450-650 |
| | | Graphene | 1000 |
| | | Carbon Nanotube | 1000+ |

The spheres, beads or powder (e.g., particulate) may be a range of sizes. A binder may include dispersant, stabilizer, plasticizer, and/or inter-molecular lubricant additive(s). Some candidate secondary matrix-filler combinations that may be deposited by a 3D printer within a binder or polymer primary matrix include cobalt or bronze beads with tungsten carbide coated graphite (carbon) fibers; aluminum beads with graphite (carbon) fibers; steel beads with boron nitride fibers; aluminum beads with boron carbide fibers; aluminum beads with nickel coated carbon fibers; alumina beads with carbon fibers; titanium beads with silicon carbide fibers; copper beads with aluminum oxide particles (and carbon fibers); copper-silver alloy beads with diamond particles. Carbon forms for particles or fibers include carbon nanotubes, carbon blacks, short/medium/long carbon fibers, graphite flakes, platelets, graphene, carbon onions, astralenes, etc.

Some soluble-pyrolysable binder combinations include polyethylene glycol (PEG) and polymethyl methacrylate (PMMA) (stearic acid optional, PMMA in emulsion form optional); waxes (carnauba, bees wax, paraffin) mixed with steatite and/or polyethylene (PE); PEG, polyvinylbutyral (PVB) and stearic acid. Some pyrolysable second stage binders include: polyolefin resins polypropylene (PP), high-density polyethylene (HDPE); linear low-density polyethylene (LLDPE), and polyoxymethylene copolymer (POM). As noted, in thermal debinding, a part containing binder is heated at a given rate under controlled atmosphere. The binder decomposes by thermal cracking in small molecules that are sweep away by the gas leaving the oven. In solvent debinding, a part containing binder is subject to dissolving the binder in appropriate solvent, e.g., acetone or heptane. In catalytic debinding, the part is brought into contact with an atmosphere that contains a gaseous catalyst that accelerates cracking of the binder, which can be carried away.

A filament should be softened from any brittle state sufficiently to be pulled or drawn off the spool without breaking, yet hard enough to be fed by an extruder, and sufficiently pliable to be bent repeatedly within the Bowden tubes BT1 and, e.g., cable carrier EC1.

In a composite material including >50% metal or ceramic spheres, as well as a two stage binder, advantageous mechanical properties for 3D printing, debinding and sintering (including melt viscosity, catalytic behavior and the like) may result in a printing material that—while having properties suitable or advantageous for other parts of the process, may be claylike and/or brittle at room temperature, even though the material becomes suitably fluidized but also suitably viscous and self-supporting for 3D printing when at a printing temperature (above one or more glass transition temperatures or melting temperatures of the material).

In the present disclosure, a vacuum-assisted debinding process using a high vapor pressure first stage binder subject to sublimation (e.g., naphthalene) may be particularly effective in the case where interconnected channels are printed. The 3D printing model material may include a binder and a ceramic or metal sintering material, and a release layer intervenes between infill cells or honeycomb or open cells in the part interior that connect to support structures and the part exterior. As discussed herein, open cell holes may optionally form, be formed by, or be connected to access and/or distribution channels for debinding fluid penetration and draining. "Vacuum-assisted" may mean debinding in gaseous pressure below ambient, optionally below 0.1-5 mm Hg, where any remaining gas may be air or inert, with or without added heat by a debinding head, heated printbed, and/or heated printing/debinding chamber. All or some, each of the channels/holes may be sized to remain open during debinding under vacuum, yet close during the approximately 20% size (approximately 20% may be 12-24%) reduction or densification of sintering. In such a case, the first stage binder may include chemically compatible solid, liquid and/or paste-like higher hydrocarbon and ester binder components having a measurable vapor pressure at the low end of the debinding temperatures (support structures and thus readily removable), especially under reduced pressure and elevated temperature conditions, prior to or without the use of extracting solvents. Preferably, such total or partial wax replacement components in the binder fraction would be characterized by a low-lying triple point which would make the removal of the component feasibly by sublimation, i.e., directly from the solid into the vapor phase, and thus preserving the open structure of the polyolefin binder phase.

In the present disclosure, binder compositions suitable for room temperature filament winding, commercial range shipping, and room temperature storage and unspooling may be formed by combining low melting point waxes and other compatible materials into a first stage binder. A problem to be overcome is brittleness, which prevents bending or winding of relatively high-aspect ratio filament (e.g., 1-3 mm) without breaking.

Solvent-debinding MIM feedstocks often include three distinct components. One component is the solvent-extractable partially miscible lower molecular weight component, such as petroleum wax (PW), microcrystalline wax (MW), crystalline wax (CW), bee's wax, C15-C65 paraffins and the like. The first stage binder component may serve as a pore former that can be rapidly and conveniently removed from the green part without changing its dimensions and integrity but that also facilitates a controlled and uniform removal of gaseous thermal decomposition products from the brown part body without deforming it. A second component may be a non-extractable, later pyrolysed second stage binder, which may be a thermoplastic polymer selected from various grades of polyethylene (PE), such as LDPE, HDPE, LLMWPE, etc., polypropylene, poly(methyl pentene) or other nonpolar hydrocarbon polymer. A third component may be a minor fraction of a powder dispersing component, such as long-chain saturated fatty acids (for example, stearic (SA) or palmitic (PA) acid) that act as disaggregating surface active agents for the inorganic or metal powder, alternatively a polar and tacky copoly(ethylene-vinyl acetate) (PEVA) in place of a fatty acid as the powder dispersing component.

In these examples, binder compositions may contain a first stage binder of 50-70 vol.-% of hydrocarbon solvent-soluble wax or fatty acid components. In order to be more flexible or pliable in room temperature or shipping conditions, the first stage binder may include low-melting binder components, such as higher alkanes, petrolatum, paraffin waxes and fatty acid esters and other compatible liquid plasticizers to increase the flexibility of the polymeric binder system. These components may improve spool winding on small-diameter spools and to resist impact during handling and shipping (including in colder ambient temperatures, e.g., below freezing), and may also increase the rate of extraction during the solvent debinding step.

In one particular example, a measurably volatile plasticizing binder component may have relatively volatility under ambient storage, e.g., such as naphthalene, 2-methylnaphthalene or another hydrocarbon having a triple point temperature in the vicinity of room temperature as a component of a primarily polyolefin binder, or as the majority component or entire component of a first stage binder. Due to its aromaticity and low polarity, naphthalene is compatible with a polyethylene (polyolefin) melt and has naphthalene has a relatively very low temperature triple point and thus very high vapor pressure over the solid phase up to the melting point at 80 degrees C. In another example, a polyolefin binder is blended with a straight- or branched chain higher ($10<n<26$) alkane or a mixture of such alkanes, with or without a fraction of naphthalene, in which the alkanes or their mixture is selected from compounds having a measurable vapor pressure at temperatures below the melting point of the polyolefin or below the dissolution temperature of said polyolefin in the alkane or its mixture. "Measurable vapor pressure" means a saturated vapor pressure higher than 0.1 Pa (1 m Hg) at 20 degrees C.)

The alkane or its mixtures may be replaced in entirety or in part by mono-, di- or triesters of fatty acids and fatty alcohols, glycols or glycerol which also possess a measurable vapor pressure in the range from ambient temperature to the dissolution temperature of the polyolefin binder in the ester or its mixture. If the alkane, ester or its blend or a blend with a medium-size fatty acid has a measurable vapor pressure at ambient or higher temperature, but below the melting or dissolution point of the polymer binder, it can conveniently be removed from the blend by simply exposing the green part to low pressure environment, preferable at an elevated temperature, but at least initially at a temperature lower than the melting or dissolution temperature of the polyolefin binder. The sublimation or evaporation of the binder component will generate microporosity in the binder phase of the green part, thus facilitating subsequent thermal debinding of the green part and preventing its dimensional distortion due to the expansion of the trapped gaseous decomposition products.

The volatile binder component should have a vapor pressure at ambient temperature low enough so as not to vaporize to a significant degree during normal handling and use of the material in the open atmosphere. Volatile binder loss during long-term storage may be effectively prevented by storing the pellets, extruded filament or the like in sealed gas- and organic vapor-impermeable multilayer packaging. Polyolefin binders include polyethylene, polypropylene or their copolymers, as described with a wax component including a proportion of naphthalene, 2-methylnaphthalene. Sublimation of naphthalene during storage can be prevented by using an appropriate vapor impermeable packaging material such as an aluminum-polymer laminate, yet naphthalene can be relatively rapidly removed from the green part by moderate heating under low pressure, for example, in a vacuum oven at temperatures below the melting point of naphthalene and thus remove it without melting the binder phase.

As noted, green body supports are primarily for supporting the green body vs. printing forces and gravity during the printing process, and may be removed prior to debinding and/or sintering, while the sintering supports are primarily for supporting the brown body vs. gravity and for interconnecting supports to the brown body for uniform shrinking, and are retained through the debinding process and during the sintering process. The separation material may be debound, and may aid in removal of the sintering supports after sintering. The green body supports and separation material may be combined, and the separation material and green body supports removed during debinding (some of the powder in the separation material may remain), while the sintering supports are again retained for supporting the brown body vs. gravity. If it is unnecessary to support the brown body vs. gravity (e.g., because of buoyancy effects during fully submerged sintering in a fluidized bed, or because of resistance provided by powder underneath, as disclosed herein), then it the sintering supports may be smaller, not as strong, or even unnecessary.

Figure 8:
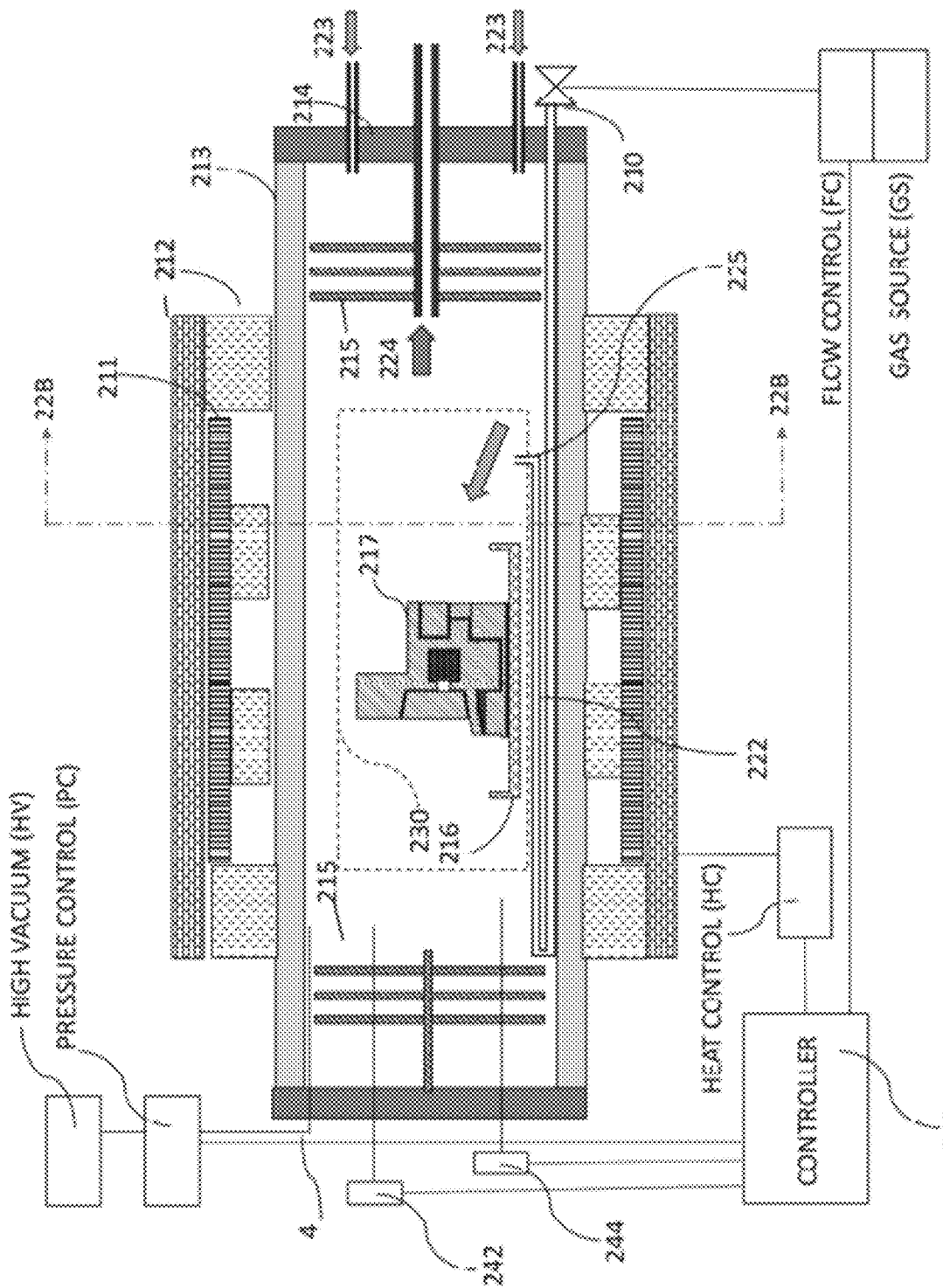
FIG. 8 is a schematic representation of a sintering furnace.
Figure 9:
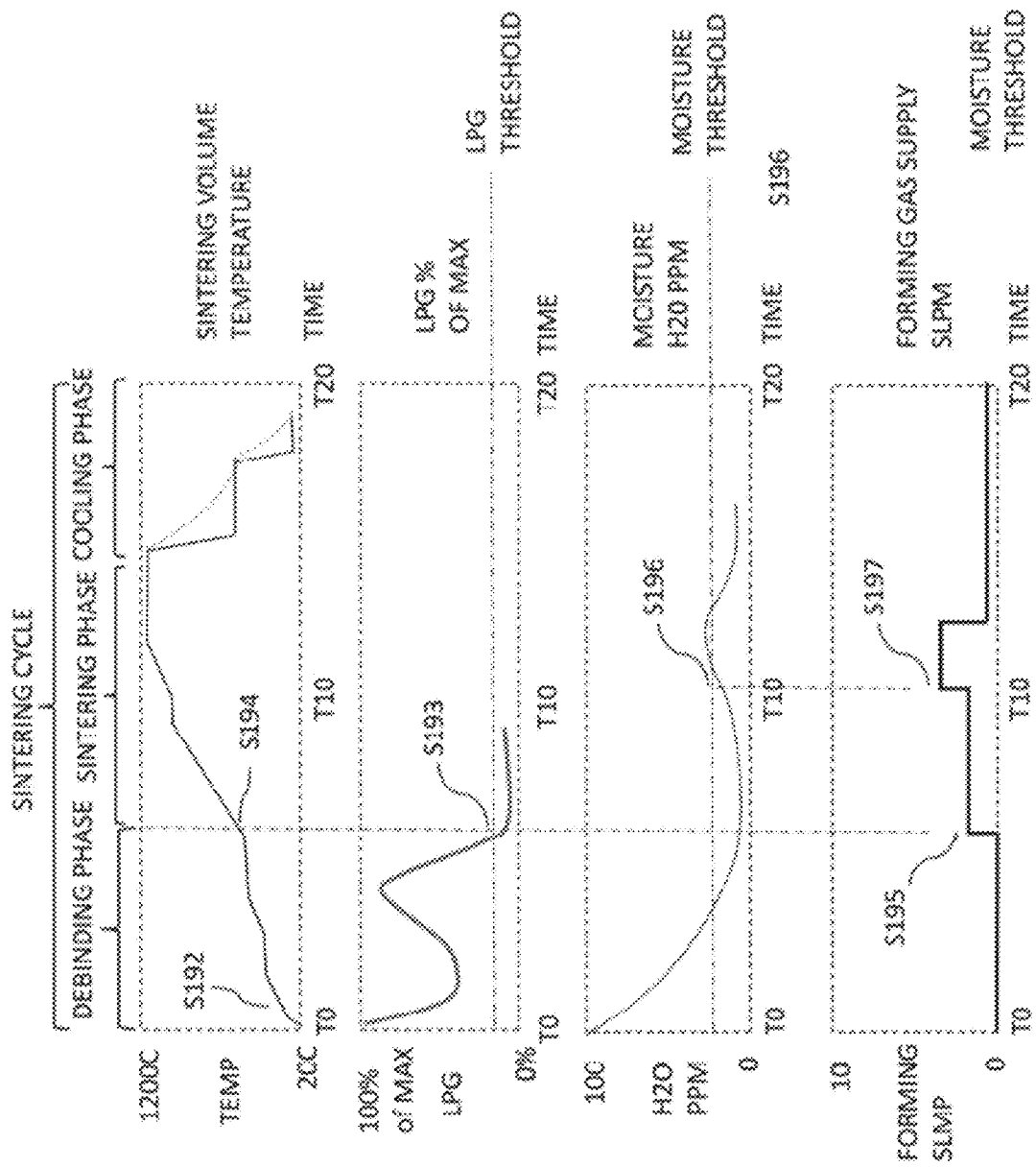
FIG. 9 includes graphs representing a sintering cycle.
Figure 10:
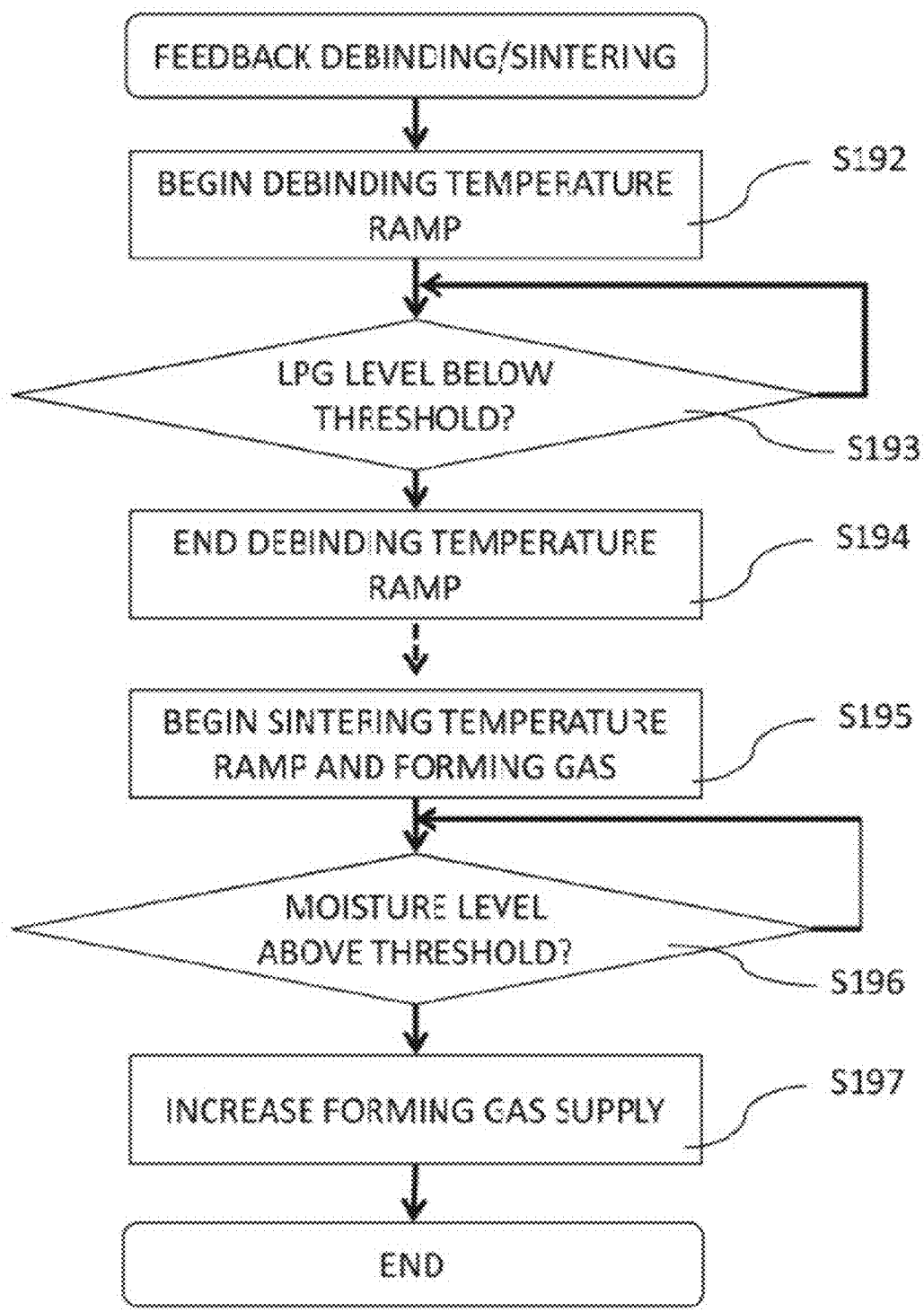
FIG. 10 is a flow chart representing a debinding/sintering process.

As shown in FIG. 8, the sintering furnace as disclosed (similar to the sintering furnaces in FIGS. 12-18) includes a controller 240 operatively connected to flow control for the process or forming gas 210, heat control controlling the heating elements or coils 211, vacuum control for managing a high vacuum source 4, a moisture sensor 242, and an LPG sensor 244.

With respect to the operation of sintering ovens as discussed herein, when using sufficient process or forming gas for a full batch or the largest parts, the cost per run is the same for any number of parts because the amount of electricity and process or forming gas used in a run is estimated to be sufficient for the largest number or size of parts. In addition, in order to account for the possibility of atmospheric air leaking into the retort, excess process or forming gas may be used. If oxygen or water vapor from atmospheric air leaks into the retort 213, more process or forming gas must be used.

However, with or without atmospheric air leaks, the microclimate in the retort 213 can be managed to an optimized reducing environment for sintering using a combination of feedback sensors. Using the equilibrium equation of chromium oxide the level of moisture (ppm of H2O) at which the sintering environment goes from favoring reduction or oxidation can be calculated as a function of temperature (with the direct sensing of moisture or dew point acting as a proxy for oxygen). At lower levels of oxygen (measured as ppm moisture or dewpoint), a lower, cheaper, and more convenient flow of process or forming gas may be used.

The threshold for lowering a flow rate of process or forming gas during sintering may be set at a moisture level (e.g., in ppm) at or lower than the reduction→oxidation equilibrium point (determined by the chromium oxide equilibrium equation). For example, at 1150 C, the controller 240 may initiate process or forming gas flow at, e.g. 0.5 SLPM S195 of FIGS. 9 and 10 and sensing with the moisture sensor 242, using an equilibrium level of 100 ppm, set a threshold at 25% (approximately 27 ppm). If the controller 240 determines via the sensor 242 that the amount of moisture rises above the threshold, in step S197 of FIGS. 9 and 10, the controller 240 causes the flow control to increase process or forming gas flow rate, e.g., capped at a predetermined amount (e.g., 3 SLPM). Typical pressures of process or forming gas supply to the retort 213 may be about 700 psi at 3 SLPM and about 200 psi at 0.5 SLPM.

To control the termination of the debinding phase, in which the remaining second stage debinder or polymer is decomposed and initial necking of smaller particles of metal powder takes place, an LPG sensor located in the exhaust gas system may be used to change the duration of the debinding phase. A liquid petroleum gas (LPG) sensor includes an $SnO_2$ thin film array sensitive to gases such as propane and/or butane.

For example, as shown in FIG. 8, the sintering furnace as disclosed (similar to the sintering furnaces in FIGS. 12-18) includes a controller 240 operatively connected to the LPG sensor 244. The threshold for terminating the lower-temperature debinding phase of the sintering cycle, and/or initiating the higher-temperature sintering phase sintering, may be set at an LPG level indicating that debinder decomposition products are substantially no longer being produced (e.g., a low percentage of maximum LPG reading, e.g. 10% of maximum). For example, the controller 240 may initiate the debinding temperature ramp up from room temperature at S192 as shown FIGS. 9 and 10, and sensing with the LPG sensor 244, set a threshold at, e.g., 1-15%, e.g. 10% of maximum (e.g., a predetermined maximum from typical runs or the maximum recorded during the cycle). If the controller 240 determines via the sensor 244 that the amount of decomposition gas component being generated has gone below the threshold, in step S193 of FIGS. 9 and 10, the controller 240 determines the end of the debinding cycle. In the case where the sintering phase is started immediately, the controller 240 causes the temperature to ramp again at S194 (as well as beginning process or forming gas flow at, e.g., S195).

Figure 11A:
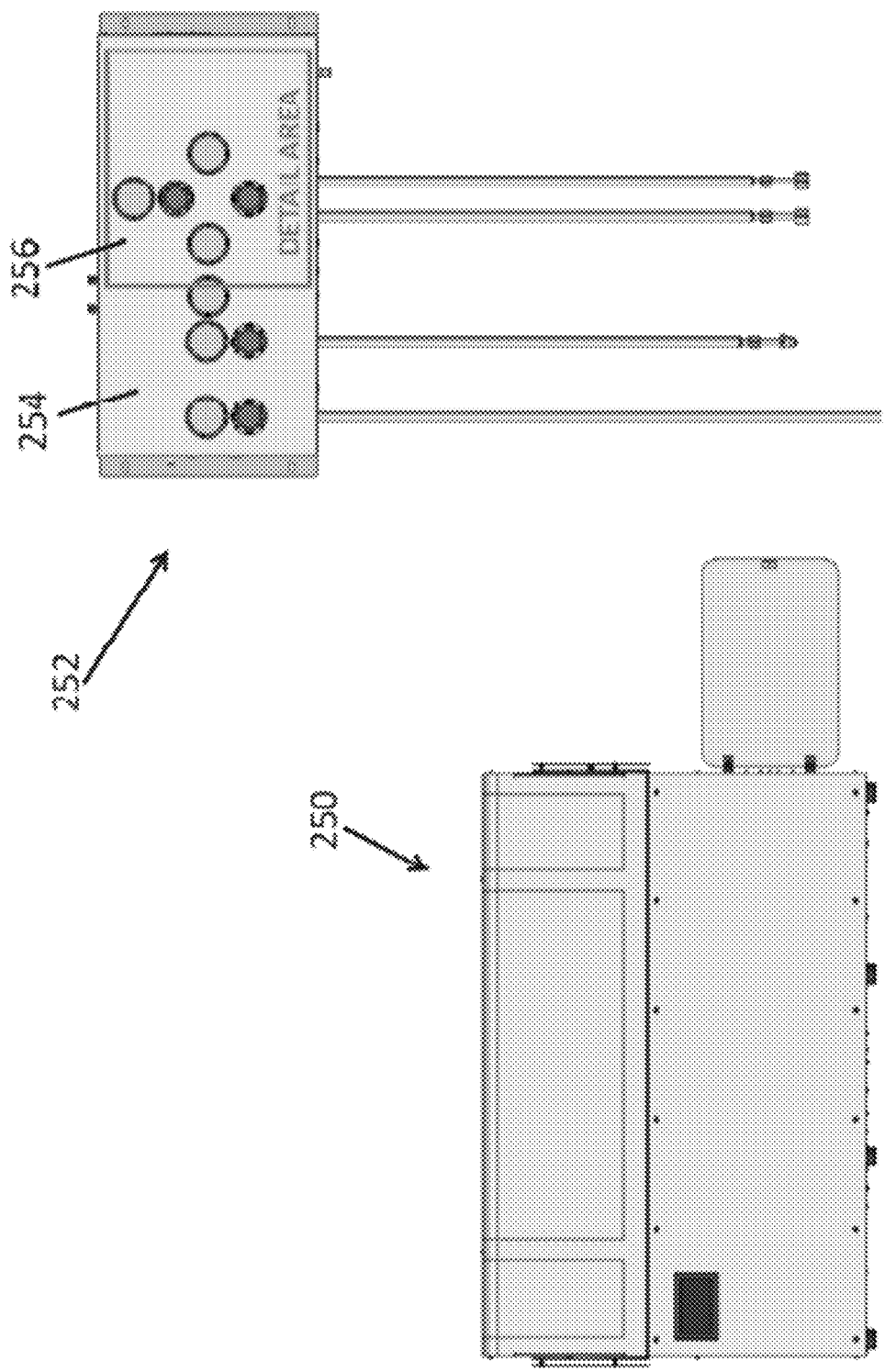
FIG. 11A is a diagram of a sintering furnace and a supply panel.
Figure 11B:
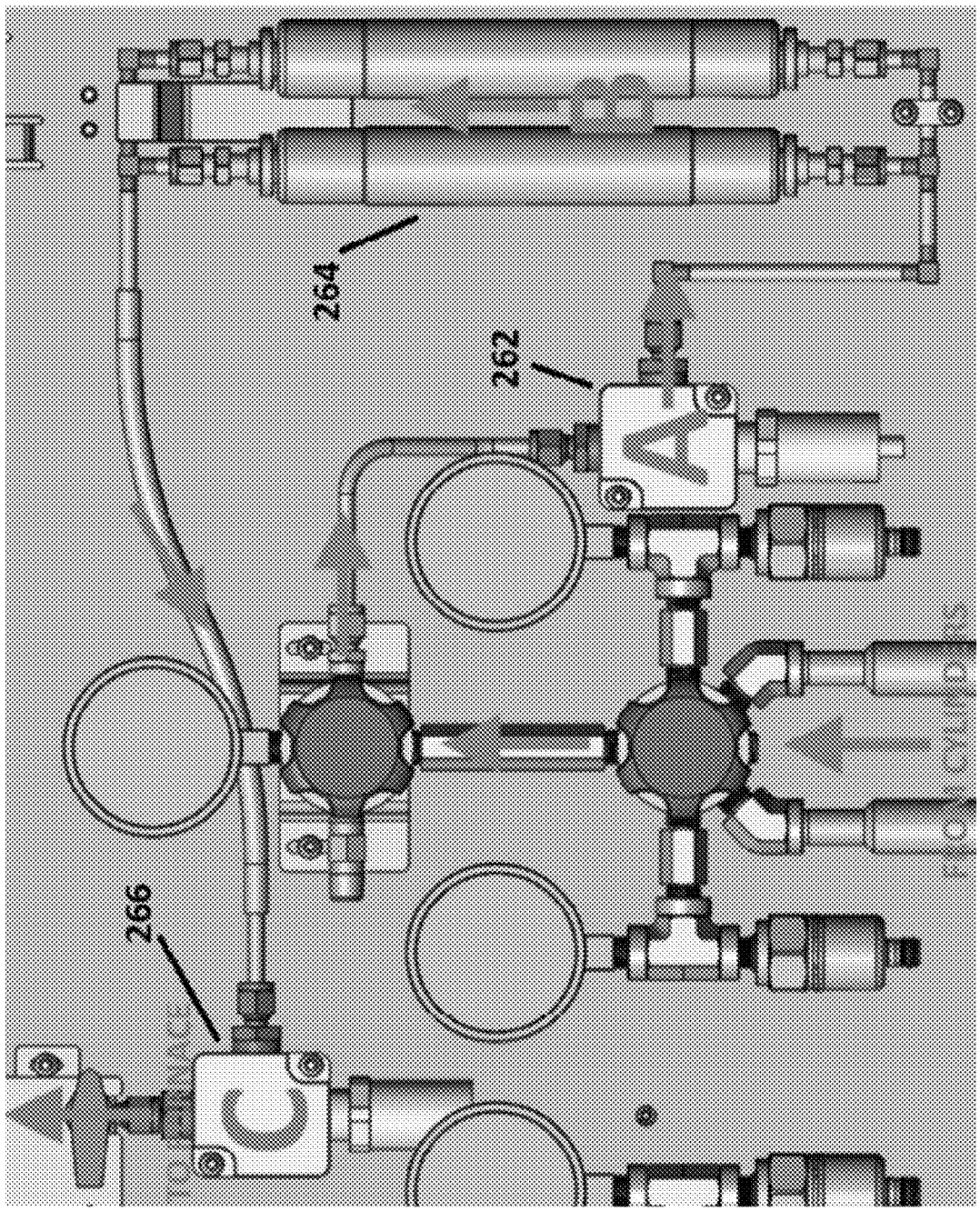
FIG. 11B is a diagram of a portion of a supply panel.

FIG. 11A is a diagram illustrating a sintering furnace 250 (e.g., a sintering furnace similar to the sintering furnaces disclosed in FIGS. 8 and 12-18) and a supply panel 252. The supply panel has an output coupled to the sintering furnace 250 and at least one input coupled to supply gas cylinders. The supply panel 252 includes a housing 254 that encloses a variety of components. A more detailed area 254 inside the housing 254 of the supply panel 252 is shown in FIG. 11B.

As shown in FIG. 20B, the area 254 of the supply panel 252 includes a variety of moisture sensors. According to at least one embodiment, the moisture sensors are located in two places in the supply panel 252—one immediately before the supply gas filtration cartridges 264 (i.e., the "pre-filter" sensor 262), and one immediately after the supply gas filtration cartridges 264 (i.e., the "post-filter" sensor 266). According to one embodiment, the "pre-filter" sensor 262 is located at position "A" and the "post-filter" sensor 266 is located at position "B", as shown in FIG. 11B. According to another embodiment, the "pre-filter" sensor 262 is located at position "A" and the "post-filter" sensor 266 is located at position "C", as shown in FIG. 11B. In other embodiments, the "pre-filter" sensor 262 and the "post-filter" sensor 266 may be located at different positions in the supply panel 252. According to at least one embodiment, a third moisture sensor (the "exhaust" sensor) is also located inside the furnace 250, before the exhaust exits the system. For example, in one embodiment, the "exhaust" sensor is the moisture sensor 242 shown in FIG. 8. According to at least one embodiment, each sensor is in communication with a controller/processor and the controller/processor is configured to analyze signals/information provided by its corresponding sensor(s). In one embodiment, a single controller/processor (e.g., the controller 240 shown in FIG. 8) is configured to receive/analyze information from each sensor; however, in other embodiments, any number of controllers/processors can be utilized to receive/analyze information provided by the plurality of sensors. For example, in at least one embodiment, a control system configured to receive/analyze information from a plurality of sensors can include multiple controllers (such as controller 240 and/or other controllers in communication with the sensors) located at multiple locations (for example, in the sintering furnace, in the supply panel, and/or external to both).

The "pre-filter" sensor 262 is configured to directly measure moisture contamination in the supplied process or forming gas. This results in a baseline reading for the "post-filter" sensor 266 to measure relative to. In addition, the measurement of the "pre-filter" sensor 262 can be used to integrate net moisture exposure and predict the usable lifetime of the moisture half of the supply filters 264, given their typically limited absorption capacity. In at least one embodiment, a run can also be aborted if bad supply gas is detected and the filter 264 lifetime can be preserved. The "post-filter" sensor 266 validates the function of the supply filters 264 and can indicate the presence of any leaks between the filter 264 and the "post-filter" sensor 266.

The "exhaust" sensor (for example, the moisture sensor 242 of FIG. 8) can serve two purposes—first to directly indicate moisture sources downstream of the "post-filter" sensor 266, and second to indirectly indicate if the hydrogen component of the process or forming gas is reducing any oxygen or oxides at temperature. The direct moisture detection—when observed with a low "post-filter" sensor measurement—can imply a leak or unexpected moisture introduced into the system. The direct "exhaust" sensor (for example, the moisture sensor 242 of FIG. 8) moisture signal might also indicate which phase of debind is underway or how heavily loaded the furnace is. The indirect oxygen detection can indicate proper function of the introduced hydrogen, failure of the oxygen half of the supply filters 264, or a leak in the system. The indirect oxygen detection signal could also be used to do closed-loop control of process or forming gas (and thus hydrogen) flowrate.

According to one embodiment, the moisture sensors ("pre-filter" sensor 262, "post-filter" sensor 266, and "exhaust" sensor (for example, the moisture sensor 242 of FIG. 8)) can detect parts-per-million level moisture in gas. In at least one embodiment, at least one of the sensors is a capacitive thin-film polymer moisture sensor such as a DMT143 dewpoint transmitter manufactured by Vaisala Corporation of Helsinki, Finland. In such a moisture sensor, the presence of moisture changes the capacitance of the polymer and it is continuously charged/discharged to measure the capacitance. The sensor can also occasionally be heated to re-baseline the then-dry sensor. According to other embodiments, different moisture sensors can be utilized.

The supply gas filter 264 (i.e., the supply gas filtration cartridges also shown at position "B") operates to scrub moisture and oxygen from the gas passing through it, potentially down to the single parts-per-million level. According to at least one embodiment, the supply filter 264 includes in-line purifiers such as the PUR-IL-OMT1 in-line purifier systems manufactured by Matheson Tri-Gas, Inc. of Montgomeryville, PA. Such in-line purifiers typically contain two species of granular media—for example a typical desiccant and a copper catalyst. The first compound traps moisture on an equilibrium basis. If the compound is drier than the gas flowing over it, it will extract moisture from the gas, and if it is somewhat wetter than the gas flowing over it, it will give off moisture. The "post-filter" 264 moisture sensor verifies the first condition and detects the latter condition.

The second compound binds oxygen to it in a non-equilibrium fashion. It will continue to bind oxygen to it until it hits capacity and then it will stop. The "exhaust" moisture sensor (for example, the moisture sensor 242 of FIG. 8) will imply a failure mode when it sees greater-than-typical moisture in the exhaust without seeing moisture during cooler parts of the furnace run. According to one embodiment, the second compound can be regenerated with heat in the presence of hydrogen. In one embodiment, the first desiccant compound can be regenerated with heat.

One of the benefits of the system shown in FIGS. 11A-11B lies in detecting leaks, conclusively ruling out (or in) contaminated supply gas, tolerating slightly lower-quality gas, and—in the case of the "exhaust" sensor (for example, the moisture sensor 242 of FIG. 8)—deducing leaks and/or reduction behavior in the heated part of the furnace 250.

According to other embodiments of the furnace 250 and supply panel 252, the supply panel 252 does not include moisture sensors and instead, the gas is continuously recirculated through a desiccant-plus-copper media bed which is sized and regenerated to always have the capacity to absorb the expected moisture. In other embodiments of the furnace 250 and supply panel 252, the supply panel 252 does not include moisture sensors as higher quality gas is utilized. In at least one embodiment, the gas includes higher concentrations of hydrogen to grant some robustness with respect to oxygen contamination—either from the supply or from leaks.

Figure 12:
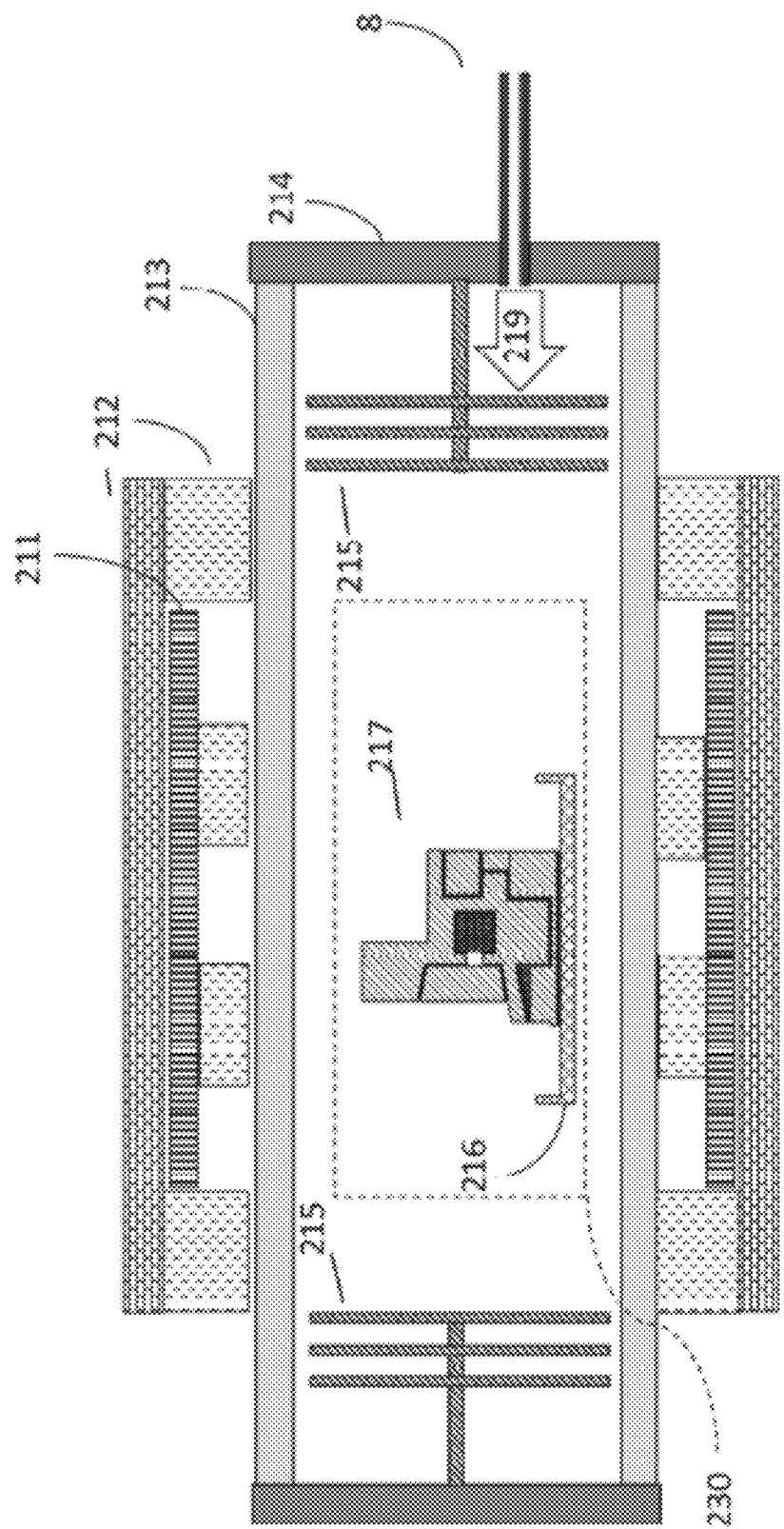
FIG. 12 is a schematic representation of a sintering furnace.

As shown in FIG. 12, in an embodiment of a furnace, walls 213 of a furnace are formed unitarily as a tube from a high temperature material (e.g., amorphous silica, ceramic, or high temperature metal or alloy such as molybdenum or kanthal). The length of the tube is surrounded by heating elements 211 and refractory material 212. Working access end caps 214 are formed from a machinable material (e.g., stainless steel) through which tubes for gas and vacuum may penetrate, and fixturing and sensors may be attached. A sintering volume is located at the innermost portion of the furnace, maintained at a steady and controlled temperature. Process or forming gas 219 (such as forming gas) is introduced into the sintering volume at substantially room temperature through an end cap 214. A series of 3-10 baffle discs 215 moderate the temperature transition from the hot sintering volume to the colder end cap 214, providing a plurality of successive baffle surfaces for heat transfer and damping turbulent mixing or convection of differing temperature gas within the furnace. In this embodiment, the process or forming gas is heated up to the temperature by the environment at the end cap 214.

However, these elements—the baffles 215, the end cap itself 214, and the tube walls 213 near the end cap 214—are not within the refractory 212 and heater 211 environment, and are not as hot as the sintering volume 230, which may provide insufficient residence time to heat up to process temperature (ex 650 C for aluminum, and 1150 C-1375 C for steels). Cold gas may cause a temperature gradient which doesn't allow for uniform heating of the part. This may lead to distortion, warping, cracking and incomplete sintering to a lower density.

Figure 13A:
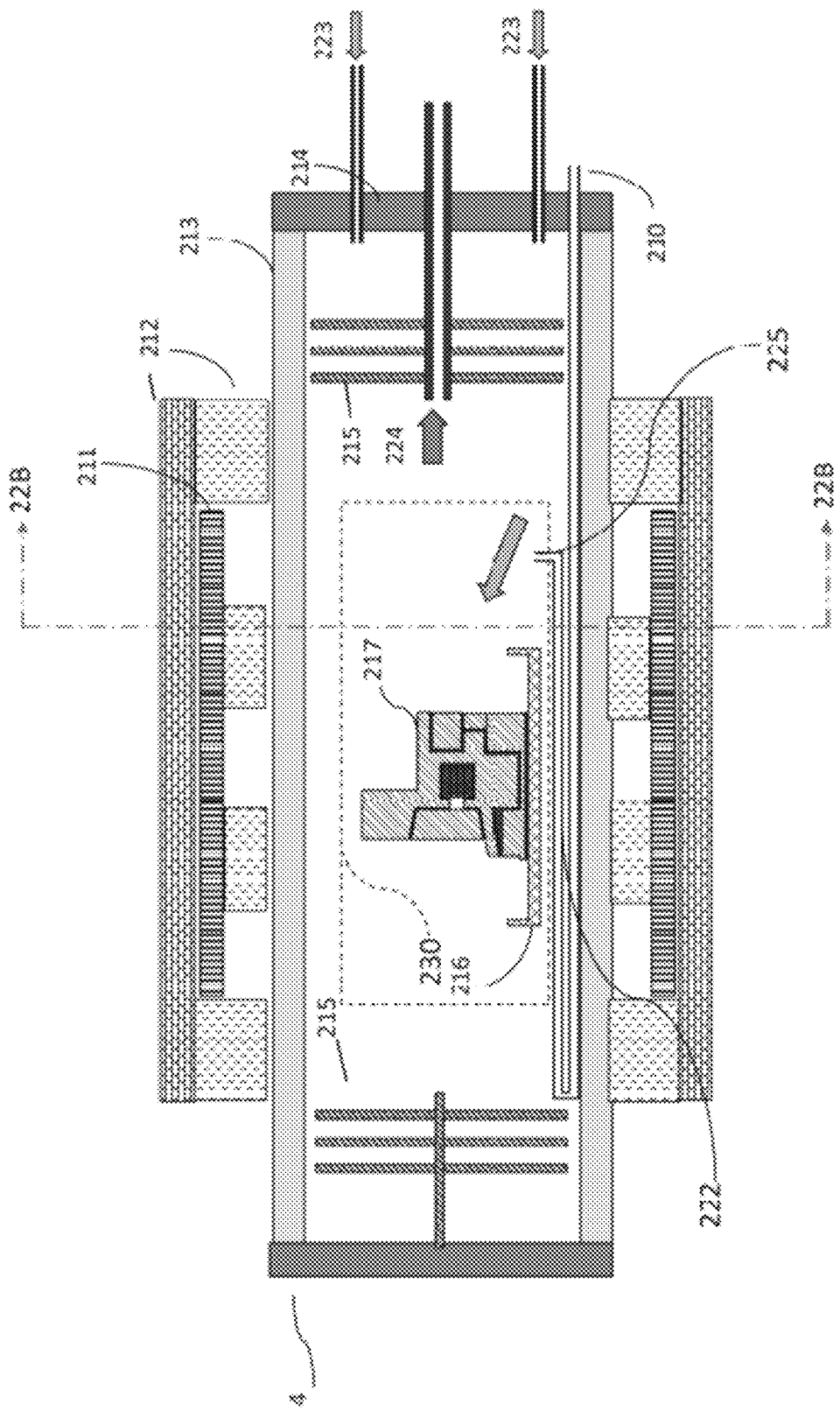
FIGS. 13A-13B are schematic representations of sintering furnaces.
Figure 13B:
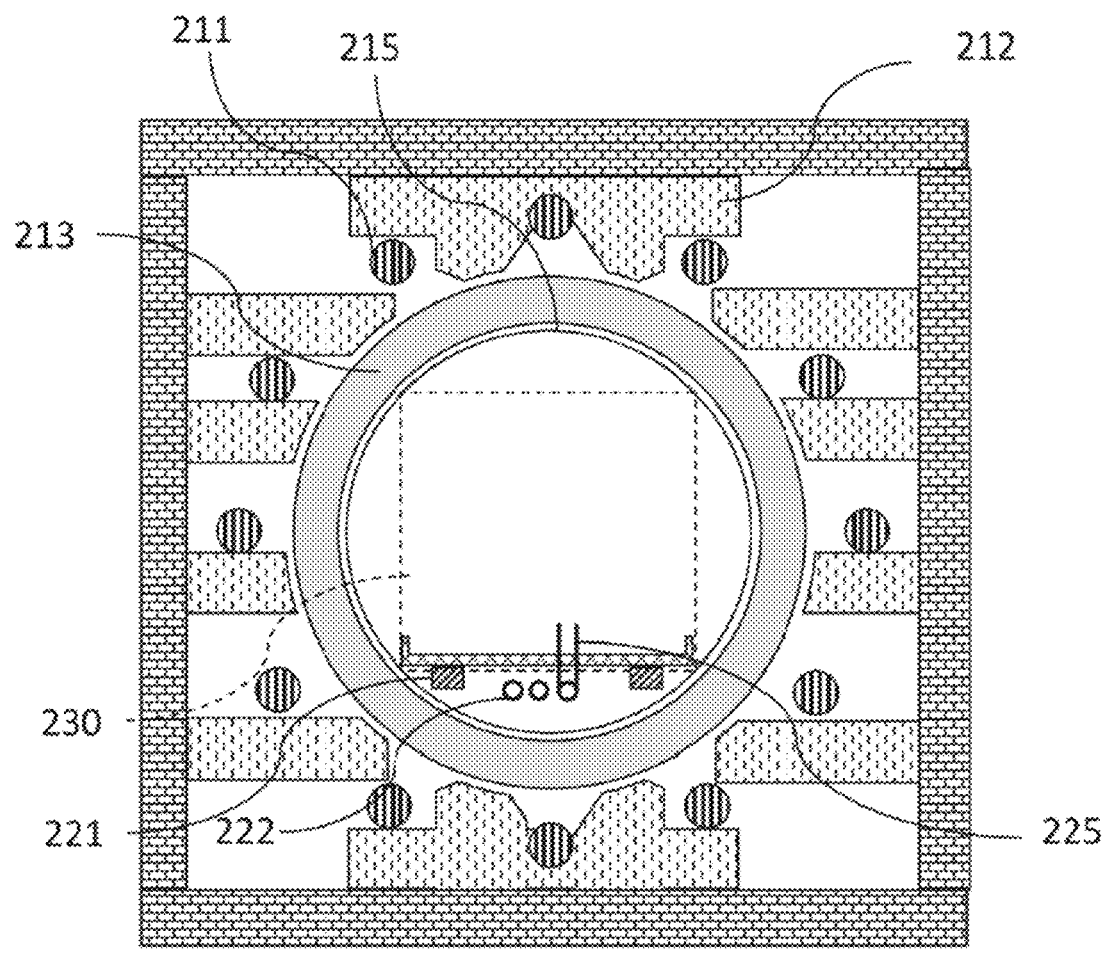
Figure 14:
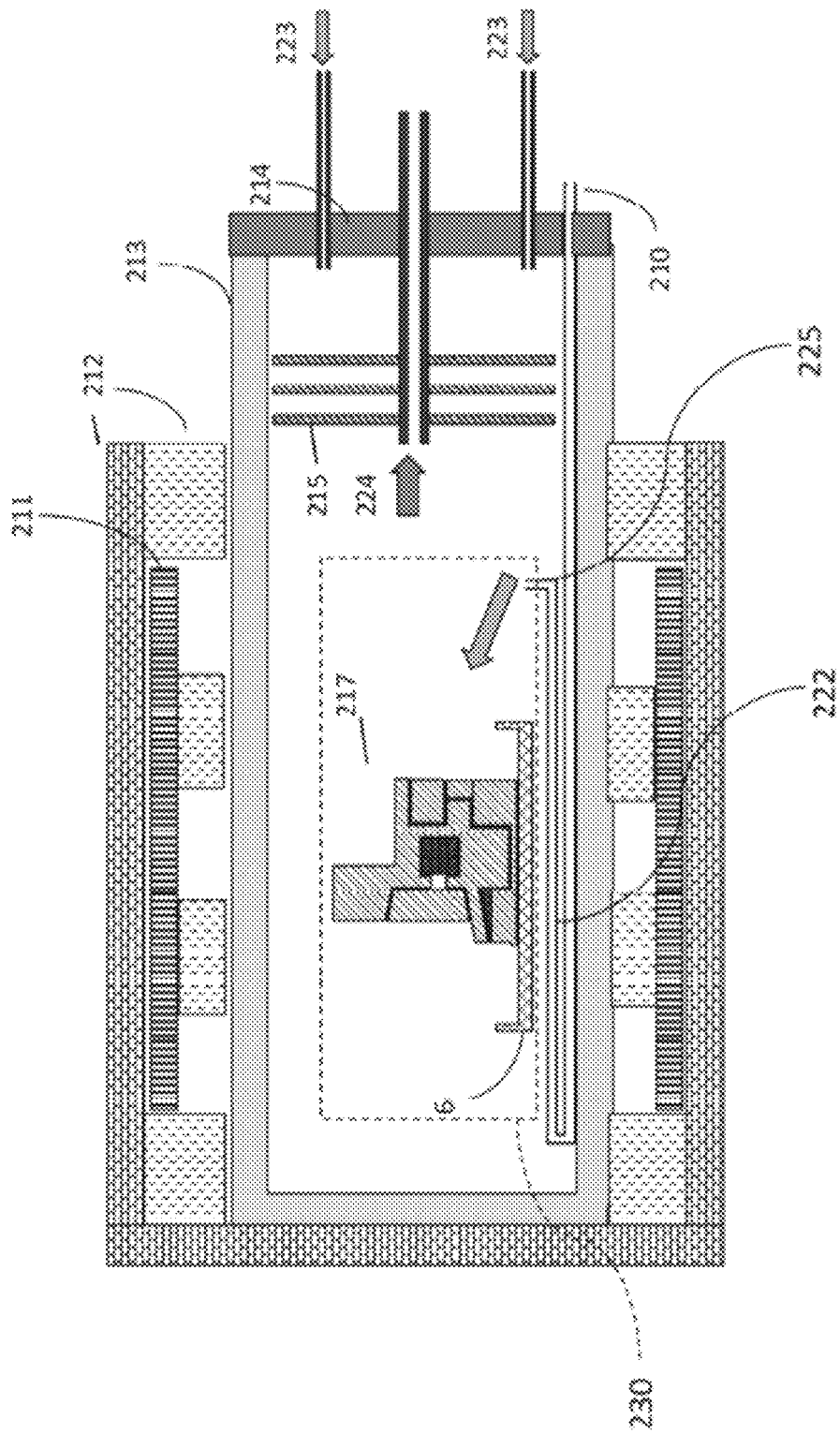
FIG. 14 is a schematic representation of a sintering furnace.

The thermal mismatch may be reduced by preheating up the incoming process or forming gas by running the gas through a heat exchanger 222. One example of a heat exchanger, as shown in FIGS. 13A and 13B, is a stainless steel tube 222 which traverses through the heated interior of the furnace retort below a rail used for loading the furnace, heating gas flowing through the tube 222 to within 0-100 degrees of the desired process temperature. The heat exchanger 222 should be adjacent to, or held within, a portion of the furnace that is ramped with and kept at the full process temperature for sintering but should not be within the sintering volume 230 (except, in some cases, for an outlet from the heat exchanger).

Figure 17:
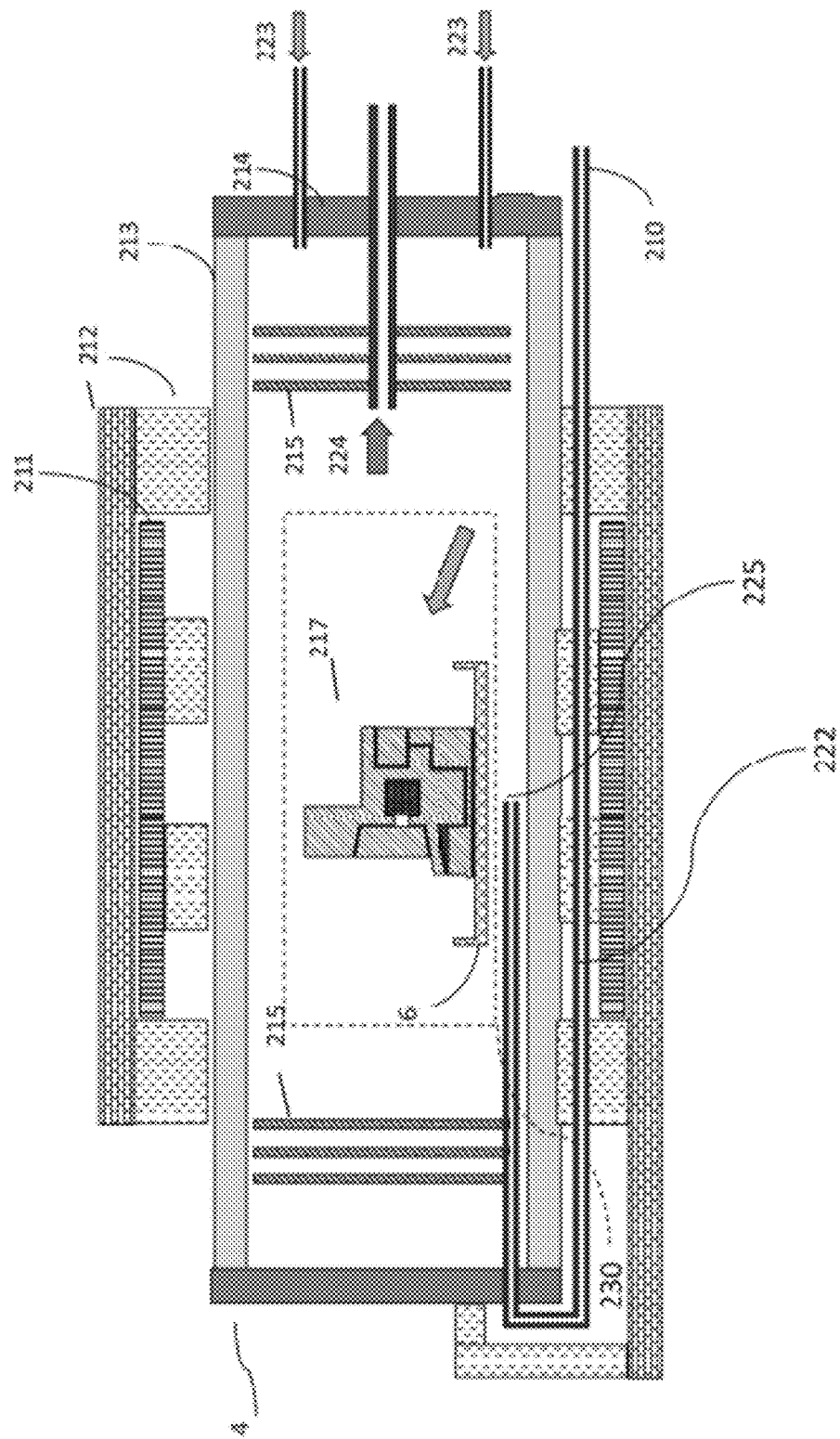
FIGS. 17 and 18 are schematic representations of sintering furnaces.

Locations suitable for preheating via the heat exchanger 222 include within the retort, adjacent but not within the sintering volume, to the top, bottom, or sides of the heating volume (FIG. 13A, 13B); within the retort and adjacent the innermost baffle plate (FIG. 18); and partially outside the retort and within the refractory/heating element assembly (FIG. 17).

Figure 18:
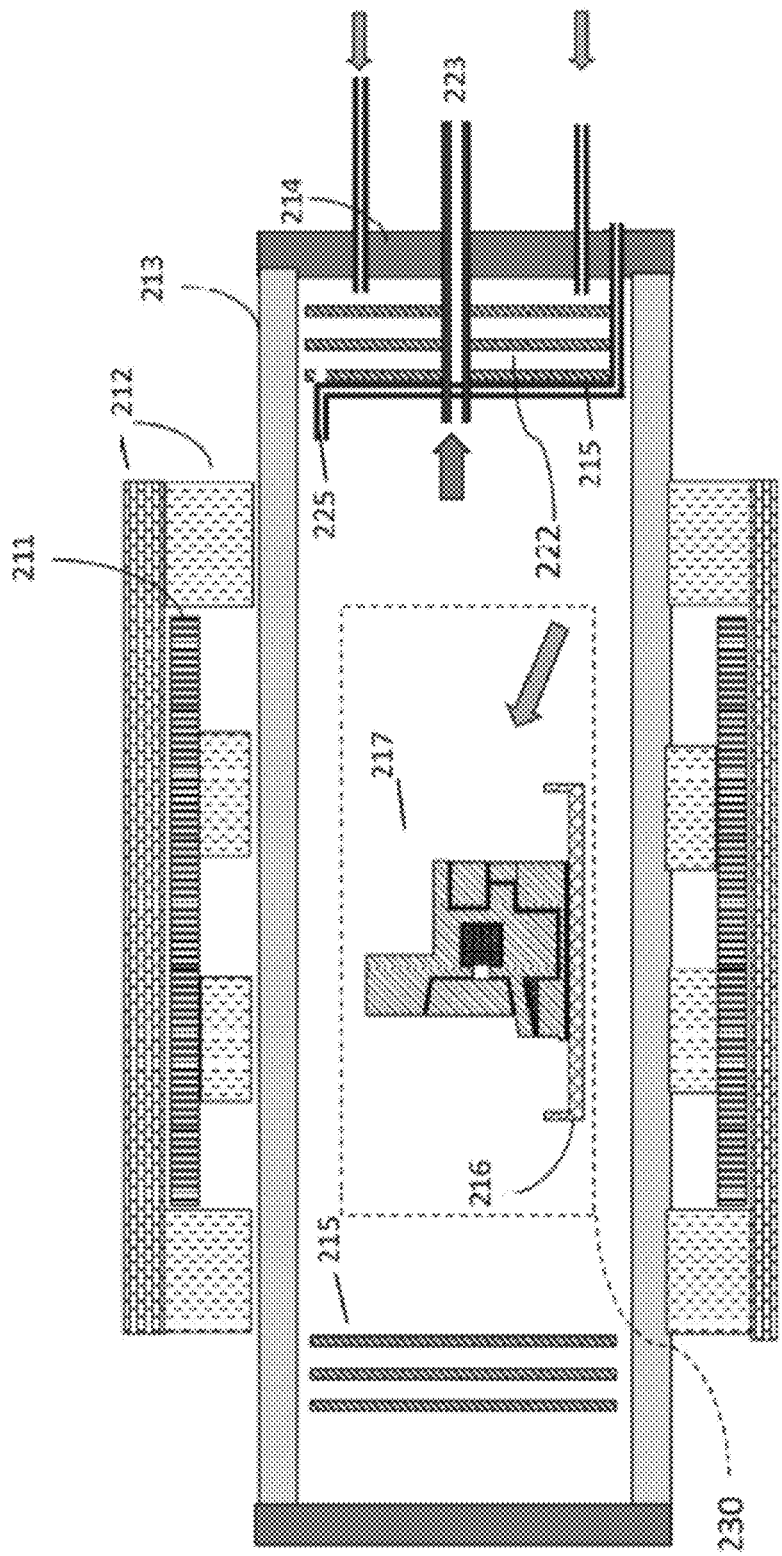

In the embodiment of FIG. 17, it is possible that the heat exchanger 222 may be placed outside the retort (e.g., outside the fused tube 213), for example placed within the refractory and heating elements and then introduced through an end cap, this arrangement may route heated gas through a cooler area after heating the gas and before introducing the gas to the sintering volume. In the embodiment of FIG. 18, the heat exchanger 222 adjacent the baffle 215 may be looped or formed into parallel rows to provide sufficient residence length and time.

In FIGS. 12, 13A, 14, 17, and 18, the sintering furnace and interior of the retort is shown in side cross section. FIG. 13B is a cross section through FIG. 13A along line 22B. In FIGS. 12, 13A, 17, and 18 the retort is a double ended tube 213 that extends past the insulation or refractory 212 and heating elements or coils 211 on both sides. Brown part(s) 217 are placed on a ceramic boat 216 and centered longitudinally inside the heated zone or sintering volume 230. Two sets of thermal shields or baffles 215 placed in the retort to prevent excess heating of the end caps 214.

In FIGS. 12, 13A, 14, 17, and 18, incoming process or forming gas enters through a stainless steel pipe 210 through the end cap 214 and exits at an outlet 225 after running through the heat exchanger 222 at the front of the brown part. An inert purge gas is flowed through openings 223 in the end-cap 214 and flows or circulates around a vestibule of the retort between the thermal shields 215 and the end-cap 214. Exhaust gas from sintering, including polymer and other breakdown products of the second stage binder that is thermally debound during a first stage of the debinding-sintering process is removed from the retort though a dip tube 224 that runs through the thermal shields 215 and the end-cap 214.

The length, and diameter of the heat exchanger portion 222 of the preheating tube provides sufficient residence time to bring incoming process or forming gas up to the process temperature (or sufficiently close to the process temperature to provide uniform heating). The process or forming gas is heated to within 0-100 degrees of the process temperature to provide sufficiently uniform heating based on the metal being sintered, and preferably within 5 degrees C. For example, 17-4 PH stainless steel has a large processing window (on the order of +/−20c deg), whereas aluminum has a more narrow process window of +/−5c.

Once the interior of the furnace is heated past the polymer binder material's break down temperature, the binder byproducts or decomposed elements are exhausted with the process or forming gas through the dip tube 224.

The walls of the tube 213 in the vestibule (between the baffles 215 and end cap 214) are relatively far from the heating elements 211 and on the cold side of the thermal shields 215. Accordingly, in some case, vaporized polymers (the decomposed elements of the binder) may condense on the tube 213 wall surface. It may become difficult to extract and load the thermal shields 215 and the ceramic boat 216 with the parts 217 and may add an extra cleaning step between runs. An inert purge gas (e.g., argon, nitrogen) may be relatively slowly flowed through openings 223 in the end cap 214, forcing the process or forming gas containing the vaporized polymers to remain in the warmer sections of the tube, to prevent unwanted polymer build up on the tube 213 wall surface.

A 6" diameter tube 213 furnace flowing 3+ SLPM (standard liters per minute) of process or forming gas may use 40-100", for example 55", of stainless steel piping to heat the process or forming gas to within 0-100 degrees C. of the process temperature (e.g., 500-1500 degrees C.). The wall thickness of the heat exchanger 222 may be decreased to increase thermal transfer through the tube, flow devices may be introduced into the retort to promote mixing, and the heat exchanger 222 may undergo surface treatments to promote turbulent mixing.

Figure 19:
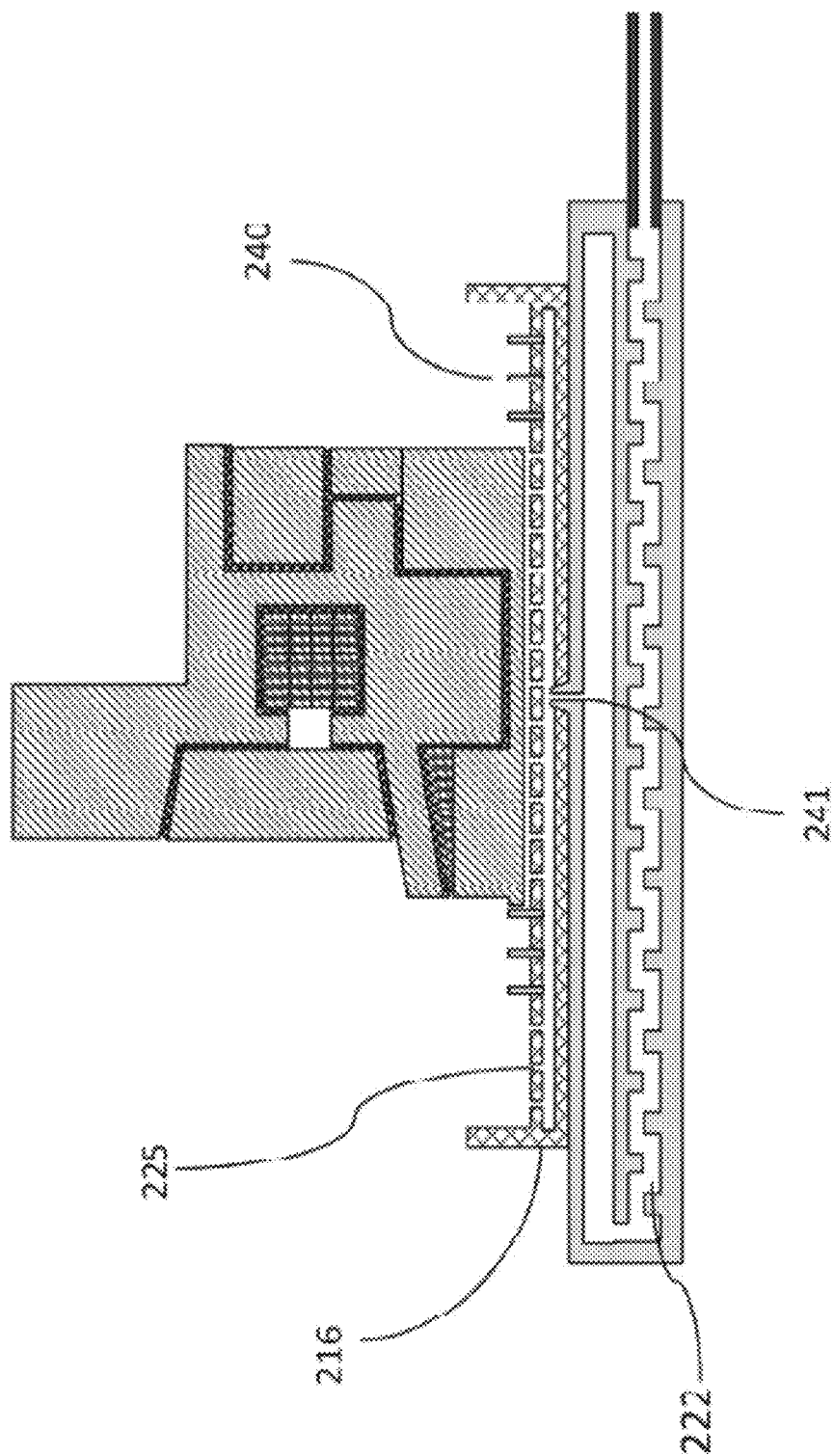
FIG. 19 show side sectional views, substantially similar in description to FIGS. 4 and 6, in which honeycomb cavities/infill are formed as vertical, columnar prism shapes.

FIG. 19 shows a variation in the structure of the heat exchanger 222 and ceramic boat 216. As shown in FIG. 19, the heat exchanger includes a circuitous path for the gas to be heated, and an interface port 241 through which the hot gas is ejected. The interface port 241 connects to a manifold formed within the ceramic boat, and the manifold exits to the sintering volume and releases process or forming gas through a plurality of small holes (e.g., 0.1-1 mm diameter). The small holes form an air bearing table that supports a flat or interfacing bottom of the shrinking platform, frictionlessly supporting the part assembly upon the boat. Alternatively, the gas is not new forming gas, but recirculated interior/hot gas. As shown, pegs may be inserted into the small holes to block them, and/or to restrict the lateral floating movement of the part. Other pegs (e.g., not inserted in the small holes, but otherwise affixed) may also or in the alternative restrict the movement of the part.

With respect to sintering ovens using heat sources other than radiant heaters, unlike solid metals (which may be opaque to or reflect microwaves at low temperatures), powdered metal may advantageously absorb microwaves. In addition, the resulting heating process may be volumetric or partially volumetric, and heat a body of powdered material evenly throughout, including to sintering temperatures (if a compatible chamber and atmosphere can be practically provided). Furthermore, as discussed herein, smaller powder sizes (e.g., lower than 10 micron, average or >90% count) may lower sintering temperatures to enable using lower temperature furnace and refractory materials. A soak in a forming or reducing gas (e.g., Hydrogen mixtures) may also be used.

A fused silica tube used for sintering (in combination with microwaves or otherwise) may be formed from very pure silica (e.g., 99.9% SiO2), and a crucible for holding the workpiece or part may be made from a similar material. In some cases, the optical transparency of fused silica may correlate to its microwave transparency and/or its coefficient of thermal expansion. A more optically transparent fused silica may have a lower degree of crystallization, and the crystal structures may scatter both light and RF.

Typical Thermal Expansion Coefficients and Microwave Penetration Depths.

| Material | Thermal Expansion Coefficient × $10^{-6}$/° C. | Microwave power penetration depth* (for 2.45 GHz) D, in cm | Microwave field penetration depth* (for 2.45 GHz) d, in cm |
| --- | --- | --- | --- |
| Fused Silica (amorphous, synthetic) | 0.55 | 3900 | 7800 |
| Cordierite | 0.1 | | |
| Silicon Carbide | 3.7 | 1 | 2 |
| Mullite (can be damaged by H2) | 5.0 | 500 | 1000 |
| Alumina | 7.2 | 625 | 1250 |
| Zirconia | 10.5 | | |
| Quartz Mineral (natural, crystalline) | 7-14 | | |
| Bulk, solid aluminum | | | ($1.67 \times 10^{-6}$ micrometers) |
| Kanthal (FeCrAl alloy) | 16 | | |

Penetration depth (d) is the distance from the surface of the material at which the field strength reduces to 1/e (approximately 0.368) of its value at the surface. The measurements in this table are taken at or around 20 degrees C. As temperature increases, the penetration depth tends to decrease (e.g., at 1200 degrees C., the penetration depth may be 50-75% of that at 20 degree C.).

Penetration depth (d) is the distance from the surface of the material at which the field strength reduces to 1/e (approximately 0.368) of its value at the surface. The measurements in this table are taken at or around 20 degrees C. As temperature increases, the penetration depth tends to decrease (e.g., at 1200 degrees C., the penetration depth may be 50-75% of that at 20 degree C.).

With respect to gas handling, different sintering atmospheres are appropriate for different metals (e.g., Hydrogen, Nitrogen, Argon, Carbon Monoxide, vacuum, reducing gases with small percentages of Hydrogen), and for different stages of a sintering process. The sintering atmosphere may help in different stages, e.g., in completing debinding, in cleaning away debinding remnant materials to avoid contamination in a sintering furnace, in reducing surface oxidation, in preventing internal oxidation, and/or to prevent decarburization. An atmosphere controlled furnace may be used before sintering as well, or different stages arranged in a muffle staged continuous furnace.

An atmosphere after initial debinding to clean away lubricants or remnant binder, but before sintering may be oxidizing (nitrogen saturated with water or with added air) through water to high temperature metal for example, optionally deposited with a similar (primary) matrix or binder component to the model material. After sintering, the release layer may become highly saturated, or by use of air additions. Temperatures may be 200-750 C with dew point of 0 to 25 C. An atmosphere in sintering, especially for stainless steels or some tool steels, may be highly reducing, e.g., pure Hydrogen, with dew point of −20 to −40 C. Nitrogen/hydrogen mixtures (3-40%) or Nitrogen/ammonia may be used, and hydrocarbons may add back surface carbon or prevent its loss. Atmospheres in post-sintering may be cooling (at very low Oxygen levels, e.g., 10-50 ppm) at a rate of, e.g., 1-2 degrees C. per second, and/or may be recarbonizing with a hydrocarbon-including atmosphere (forming some CO) at e.g., 700-1000° C. range for steels.

Figure 15:
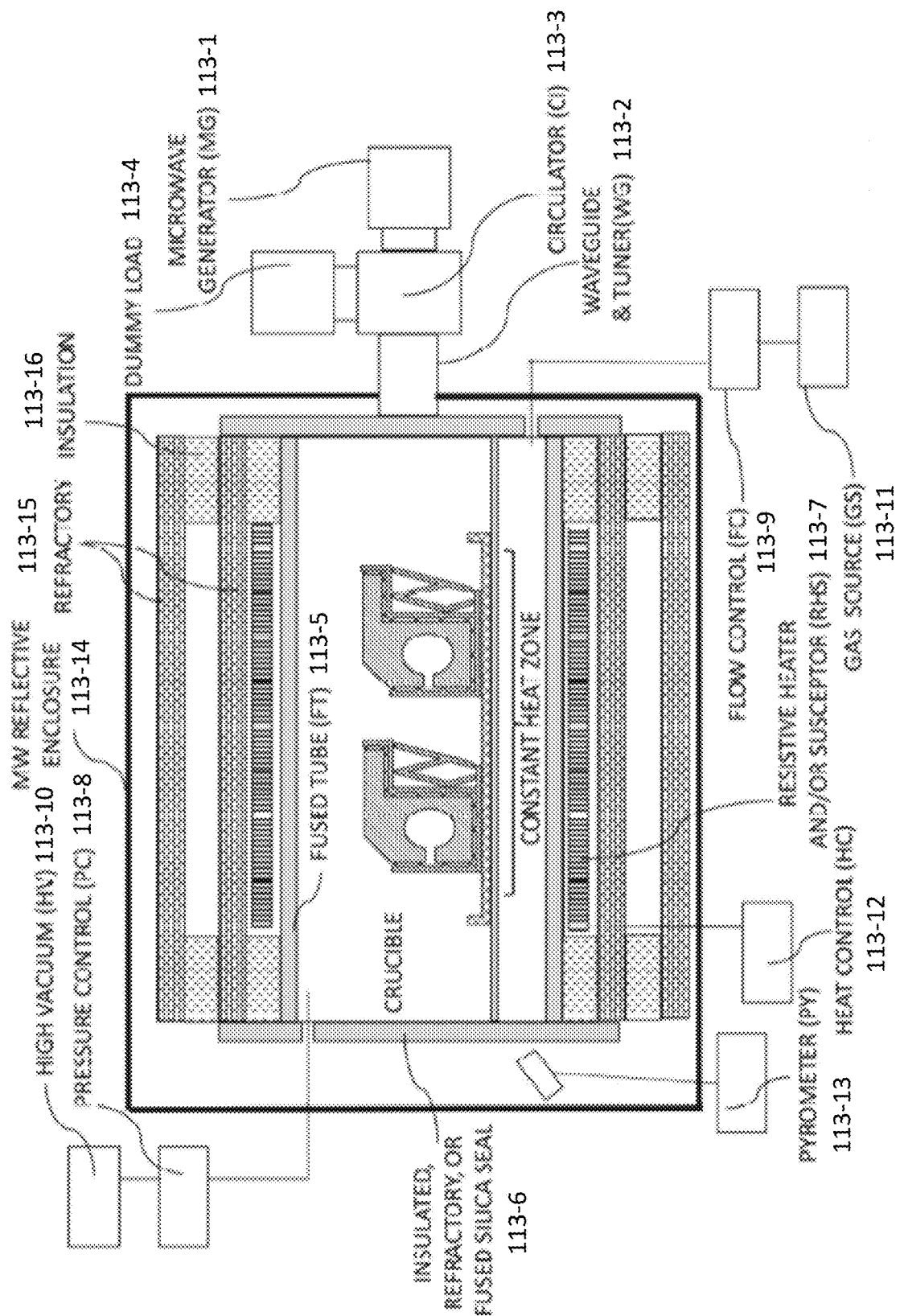
FIG. 15 is a schematic representation of one exemplary process of printing, debinding, sintering, and support removal optionally with separation and/or release layers, green body supports and/or fluidized bed sintering.
Figure 16:
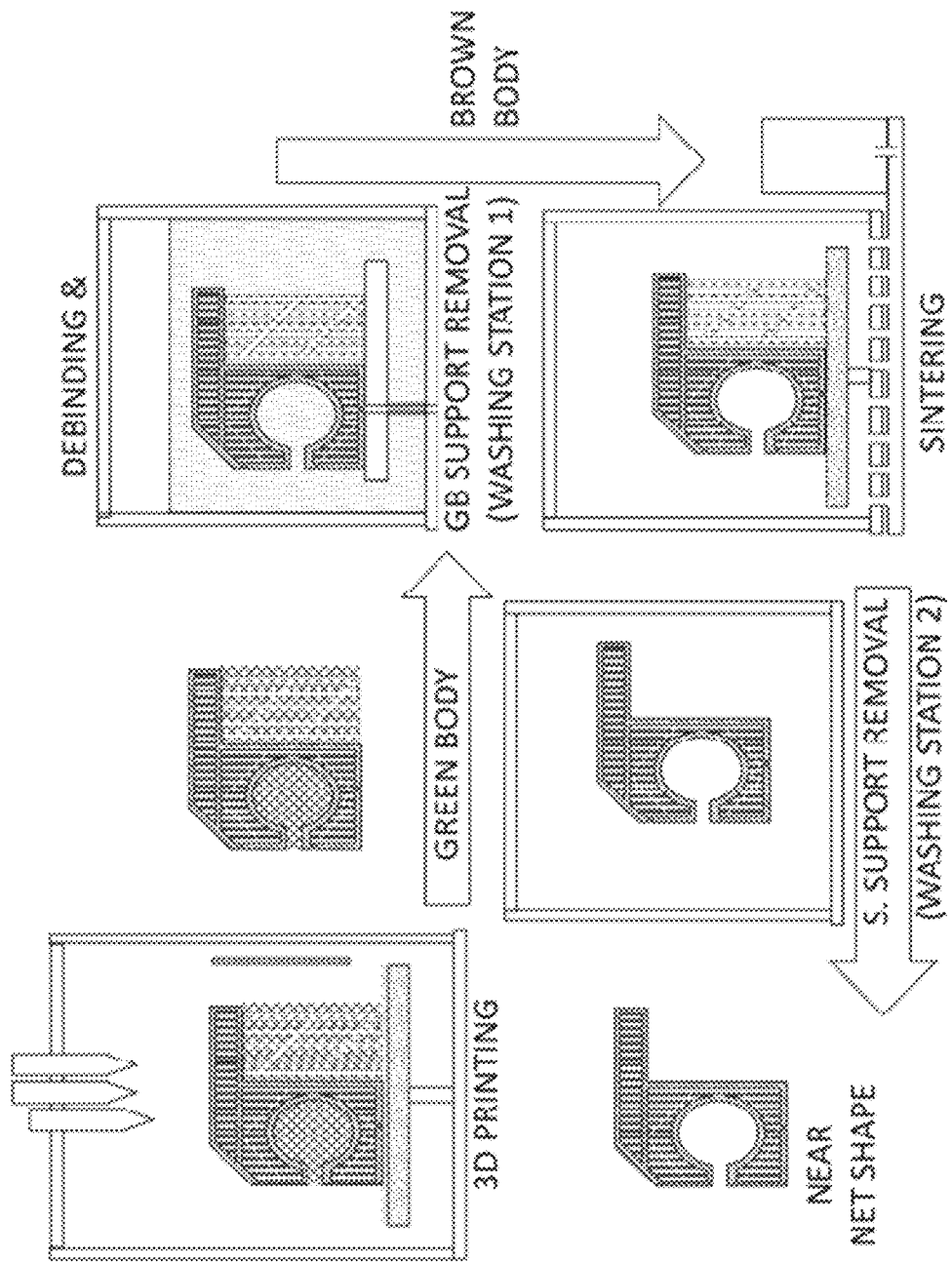
FIG. 16 is a schematic representation of an additional exemplary process of sintering optionally with certain configurations of material and sintering oven.

With respect to a microwave assisted sintering furnace 113, as shown in FIG. 15, one candidate microwave generator 113-1 for assisting or performing sintering may generate 2.45 GHz frequency microwaves at a power output of 1-10 kW. The generator, oscillator or magnetron 113-1 may be connected to a waveguide 113-2 with an open exit. A circulator 113-3 and dummy load 113-4 (e.g., water) may absorb reflected waves to avoid returning these to the magnetron 113-1 and redirect traveling waves to the furnace 113 (as monitored by appropriate sensors) and adjusted. A tuner device (in addition to or in alternative to the circulator) 113-3 may change the phase and magnitude of microwave reflection to, e.g., cancel or counter reflected waves.

As shown in FIG. 15, one technique and material variation method may involve supplying a material (pellet extruded, filament extruded, jetted or cured) containing a removable binder as discussed herein (two or one stage) and greater than 50% volume fraction of a powdered metal having a melting point greater than 1200 degrees C. (including various steels, such as stainless steels or tool steels). The powdered metal may have which more than 50 percent of powder particles of a diameter less than 10 microns, and advantageously more than 90 percent of powder particles of a diameter less than 8 microns (e.g., 90 percent of particles between 1-8 microns). The average particle size may be 3-6 microns diameter, and the substantial maximum (e.g., more than the span of +/−3 standard deviations or 99.7 percent) of 6-10 microns diameter. The particle size distribution may be bimodal, with one mode at approximately 8 micron diameter (e.g., 6-10) microns and a second mode at a sub-micron diameter (e.g., 0.5 microns). The smaller particles in the second mode assist in early or lower temperature necking to preserve structural integrity.

Smaller, e.g., 90 percent of less than 8 microns, particle sizes may lower the sintering temperature as a result of various effects including increased surface area and surface contact among particles. In some cases, especially for stainless and tool steel, this may result in the sintering temperature being within the operating range of a fused tube furnace using a tube of amorphous silica, e.g., below 1200 degrees C. Accordingly, in the process variation, as discussed herein, this smaller diameter powder material may be additively deposited in successive layers to form a green body as discussed herein, and the binder removed to form a brown body (in any example of deposition and/or debinding discussed herein).

As shown in FIG. 15, the brown part may be loaded into the fused tube furnace (furnace 113 is one example) having a fused tube 113-5 formed from a material having an operating temperature less than substantially 1200 degrees C., a thermal expansion coefficient lower than $1 \times 10^{-6}$/° C. and a microwave field penetration depth of 10 m or higher (e.g., amorphous fused silica having an operating temperature practically limited to about 1200 degrees C., a thermal expansion coefficient of about $0.55 \times 10^{-6}$/° C. and a microwave field penetration depth of more than 20 m). The low thermal expansion coefficient relates to the ability to resist thermal shock and therefore to ramp temperature quickly and handle high thermal gradients in operation and in furnace construction. For example, using a thermal shock resistant material may permit ramping a temperature inside the fused tube at greater than 10 degrees C. per minute but less than 40 degrees C. per minute. The microwave field penetration depth relates to microwave transparency-higher penetration depths are related to higher transparency.

As shown in FIG. 15, in this process the fused tube 113-5 may be sealed by a fused silica plug or plate 113-6 (and/or a refractory or insulating plug or plate). The internal air may be evacuated, and may be further replacing internal air with a sintering atmosphere (including vacuum, inert gas, reducing gas, mixtures of inert and reducing gas). Microwave energy may be applied from the microwave generator 113-1 outside the sealed fused tube to the brown part. In this case, because the small particles may lower the sintering temperature, the brown part of steel may be sintered in this furnace at a temperature lower than 1200 degrees C. In one advantageous example, more than 90 percent of the printing material's powder particles have a diameter less than 8 microns. Some of these particles, or particles in the remaining 10%, may have a diameter less than 1 micron (e.g., >90% of these having a diameter less than 0.5 microns).

As shown in FIG. 15, because microwaves may be difficult to direct for evenly distributed heating (e.g., even with the use of turntables and reflective stirring blades), the system may use susceptor members 113-7 (e.g., rods distributed about the perimeter). The susceptor members 113-7 may be made from a microwave absorbing material that resists high temperatures, e.g., silicon carbide. The susceptor members 113-7 may be passive (energized only by microwave radiation), active (resistively heated), or a mixture of the two. The susceptor members 113-7 discussed herein may even be used without microwave heating (in a microwave-free system, silicon carbide and $MoSi_2$, two common susceptor materials, are often also good resistive heaters for high temperatures). Further as shown in FIG. 15, the microwave energy is applied from outside the sealed fused tube 113-5 to susceptor material members 113-7 arranged outside the sealed fused tube (which does not contaminate the sintering atmosphere in the tube interior). As noted, the sintering atmosphere is appropriate for the powdered metal being sintered, e.g., inert, vacuum, or at least 3% Hydrogen (e.g., 1-5% hydrogen, but including up to pure hydrogen) for stainless steels.

In a variation approach for producing finely detailed parts, again the material having a removable binder and greater than 50% volume of a powdered steel (or other metal) is supplied with more than 50 percent of the powder particles have a diameter less than 10 microns, advantageously more than 90 percent having a diameter equal to or less than substantially 8 microns. The material may be additively deposited with a nozzle having an internal diameter smaller than 300 microns, which provides fine detail but is 10-20 times the diameter of the larger particles of the powder (preventing jamming). Again, the binder is removed to form a brown body and the brown part loaded into the fused tube, e.g., amorphous silica, having a thermal expansion coefficient lower than $1\times10^{-6}/°$ C., and the is sealed and the atmosphere therein replaced with a sintering atmosphere. Radiant energy (e.g., radiant heat from passive or active susceptor rods or other resistive elements, and/or microwave energy) is applied from outside the sealed fused tube 113-5 to the brown part, sintering the brown part at a temperature higher than 500 degrees C. but less than 1200 degrees C. (a range enabling small particle aluminum as well as small particle steel powders). In this case, the nozzle may be arranged to deposit material at a layer height substantially ⅔ or more of the nozzle width (e.g., more than substantially 200 microns for a 300 micron nozzle, or 100 microns for a 150 micron nozzle).

In another variation suitable for sintering both aluminum and stainless steels (in addition to possible other materials) in one sintering furnace 113, parts formed from either small particle powder may be placed in the same furnace and the atmosphere and temperature ramping controlled substantially according to the material. For example, a first brown part may be formed from a first debound material (e.g., aluminum powder printing material) including a first powdered metal (e.g., aluminum), in which more than 50 percent of powder particles of the first powdered metal have a diameter less than 10 microns, and a second brown part formed from a second debound material (e.g., stainless steel powder printing material) including a second powdered metal (e.g., stainless steel) in which more than 50 percent of powder particles of the second powdered metal have a diameter less than 10 microns. In a first mode for the furnace, the aluminum brown part may be loaded into the amorphous silica fused tube discussed herein, and the temperature ramped at greater than 10 degrees C. per minute but less than 40 C degrees C. per minute to a first sintering temperature higher than 500 degrees C. and less than 700 degrees C. In a second mode, the stainless steel brown part may be loaded into the same fused tube, and the temperature inside the fused tube ramped (e.g., by the heat control HC and or microwave generator MG) at greater than 10 degrees C. per minute but less than 40 degrees C. per minute to a second sintering tempering temperature higher than 1000 degrees C. but less than 1200 degrees C.

The atmosphere may be changed by the pressure control 113-8 and/or flow control 113-9, operating the vacuum pump 113-10 or gas source 113-11. In the first mode for aluminum, a first sintering atmosphere may be introduced into the fused tube 113-5, including inert Nitrogen being 99.999% or higher free of Oxygen. In the second mode for stainless steel, a second sintering atmosphere comprising at least 3% Hydrogen may be introduced.

As shown in FIG. 15, in the multipurpose sintering furnace suitable for rapidly sintering both aluminum and stainless steel at below 1200 C, using small diameter powders as discussed herein, the furnace may include a fused tube 113-5 formed from a fused silica having a thermal expansion coefficient lower than $1\times10^{-6}/°$ C. (a loose powder, permitting high ramp rates, the tube being resistant to thermal shock), and a seal that seals the fused tube versus ambient atmosphere. A tube-internal atmosphere regulator (e.g., including the high vacuum 113-10 pump or other device, the pressure control 113-8, the flow control 113-9, and/or the gas source(s) 113-11) maybe operatively connected to an interior of the fused tube 113-5 to apply vacuum to remove gases (including air and water vapor) within the fused tube 113-5 and to introduce a plurality of sintering atmospheres (including vacuum, inert, and reducing atmospheres in particular) into the fused tube. Heating elements (e.g., the resistive heater and/or susceptor 113-7 and/or the microwave generator 113-1) are placed outside the fused tube 113-5 and outside any sintering atmosphere within the fused tube 113-5 so as not to contaminate the sintering atmosphere. A controller (e.g., 113-12) may be operatively connected to the heating elements 113-7 and/or 113-1 and the internal atmosphere regulator. In a first mode, the controller 113-12 may sinter first material (aluminum) brown parts within a first sintering atmosphere (<0.001 percent oxygen in nitrogen) at first sintering temperature higher than 500 degrees C. and less than 700 degrees C. In a second mode, the controller may sinter second material (stainless steels) brown parts within a second sintering atmosphere (e.g., inert or reducing atmosphere) at a second sintering temperature higher than 1000 degrees C. but less than 1200 degrees C. An (optical) pyrometer 113-13 may be used to observe sintering behavior through the seal. The oven 113 is held in an appropriate microwave reflective enclosure 113-14 and is insulated with appropriate insulation 113-15 and refractory material 113-16.

As shown in FIG. 15, the internal atmosphere regulator may be operatively connected to an interior of the fused tube 113-5 to introduce the sintering atmospheres, and may ramp a temperature inside the fused tube 113-5 at greater than 10 degrees C. per minute but less than 40 degrees C. per minute. This is typically not recommended with higher thermal expansion ceramics like alumina or mullite. Also, the microwave field penetration depth of 20 m or higher of amorphous silica permits higher microwave penetration efficiency. The microwave generator MG applies energy to, and raises the temperature of, the first and/or second material brown parts within the fused tube 113-5, and/or the susceptors 113-7, which then re-radiate heat to heat the first and/or second material brown parts.

Accordingly, a small powder particle size (e.g., 90 percent of particles smaller than 8 microns, optionally including or assisted by particles of less than 1 micron) of metal powder embedded in additively deposited material lowers a sintering temperature of stainless steels to below the 1200 degree C. operating temperature ceiling of a fused silica tube furnace, permitting the same silica fused tube furnace to be used for sintering both aluminum and stainless steel (with appropriate atmospheres), as well as the use of microwave heating, resistant heating, or passive or active susceptor heating to sinter both materials.

As discussed herein, interconnected channels may be printed between infill cells or honeycomb or open cells in the part interior, that connect to the part exterior, and a shell (including but not limited to a support shell) may have small open cell holes, large cells, or a honeycomb interior throughout to lower weight, save material, and improve penetration or diffusion of gases or liquids (e.g., fluids) for debinding. These access channels, open cells, and other debinding acceleration structures may be printed in the part or supports (including shrinking/densification supports or shrinking/densification platform). All or some of the channels/holes may be sized to remain open during debinding (including but not limited to under vacuum), yet close during the approximately 20% size reduction of sintering. Internal volumes may be printed with a channel to the outside of the part to permit support material to be removed, cleaned away, or more readily accessed by heat transfer or fluids or gasses used as solvents or catalysis.

Debinding times for debinding techniques involving solvent or catalyst fluids (liquid, gas, or other) may be considered in some cases to depend on the part "thickness". For example, a 4 cm thick or 2 cm thick part may debind more slowly than a 1 cm thick part, and in some cases this relationship is heuristically defined by a debinding time of, e.g., some number of minutes per millimeter of thickness. The time for removing debinding fluid (e.g., drying or cleaning) may also increase substantially proportionately with thickness. According to the present embodiment, the effective thickness of a part for the purposes of debinding time may be reduced by providing the aforementioned fluid access to an interior of the part, using channels from the exterior which may either remain open through sintering or be (effectively) closed following sintering.

Such channels may include at least one access channel to an exterior of the part, e.g., penetrating from the exterior of the part through wall structures of the 3D printed shape to one, several, or many infill cavities of the part; or may alternatively be surrounded by wall structures of the part. In some cases, an interconnected channel may include at least two access channels to an exterior of the part that similarly penetrate a wall, in order to provide an inlet and an outlet for fluid flow or simply to permit fluid to enter versus surface tension and/or internal gas. These inlet-honeycomb-outlet structures may be multiplied or interconnected. In some cases, the inlets may be connected to pressurized fluid flow (e.g., via either 3D printed or mechanically inserted flow channel structures). In some cases, the inlets may be connected to vacuum or a flushing gas. In some cases, "inlet" and "outlet" are interchangeable, depending on the stage of the process.

For example, the 3D printer may be employed to feed the composite material including the binder matrix and a sinterable powder. "Walls" in a layer or shell follow positive contours or negative contours of a 3D model and are positioned according to the mesh or model outline or surface, and may be one or more roads or layers or shells thick (adjacent walls formed by offsetting from the model outline or surface). Internal walls (including horizontal walls as "roofs" or "floors") may also be formed, typically connecting to or extending from walls that follow the outer or inner contour of the 3D model shape. "Infill" or honeycomb extends between and among walls, floors, and roofs. The 3D printer may deposit a wall or successive layers of a wall, the wall having an access channel extending from an exterior of the part to an interior of the part. The access channel permits fluid to enter the interior (e.g., between positive and negative contours of a cross-section of the part). It is not necessary that the entirety of the interior of a part be interconnected to reduce the debinding time. For example, a wall-penetrating access channel and interconnected honeycomb (e.g., via a distribution channel) may be connected to route fluid to a location within a specified distance of the deepest interior region of a part; or to set a specified distance of a wall or walls of the part to a nearest fluid-filled chamber.

The 3D printer may deposit successive layers of honeycomb infill within the interior (e.g., between walls tracing positive and negative contours of the part), and the honeycomb infill may have a distribution channel (or several, or many distribution channels) connecting an interior volume of the honeycomb infill to the access channel. The 3D printer or subsequent debinding station or part washer may debind the binder matrix by flowing a debinding fluid through the access channel and/or distribution channel(s) and within the interior volume of the honeycomb infill.

Figure 20:
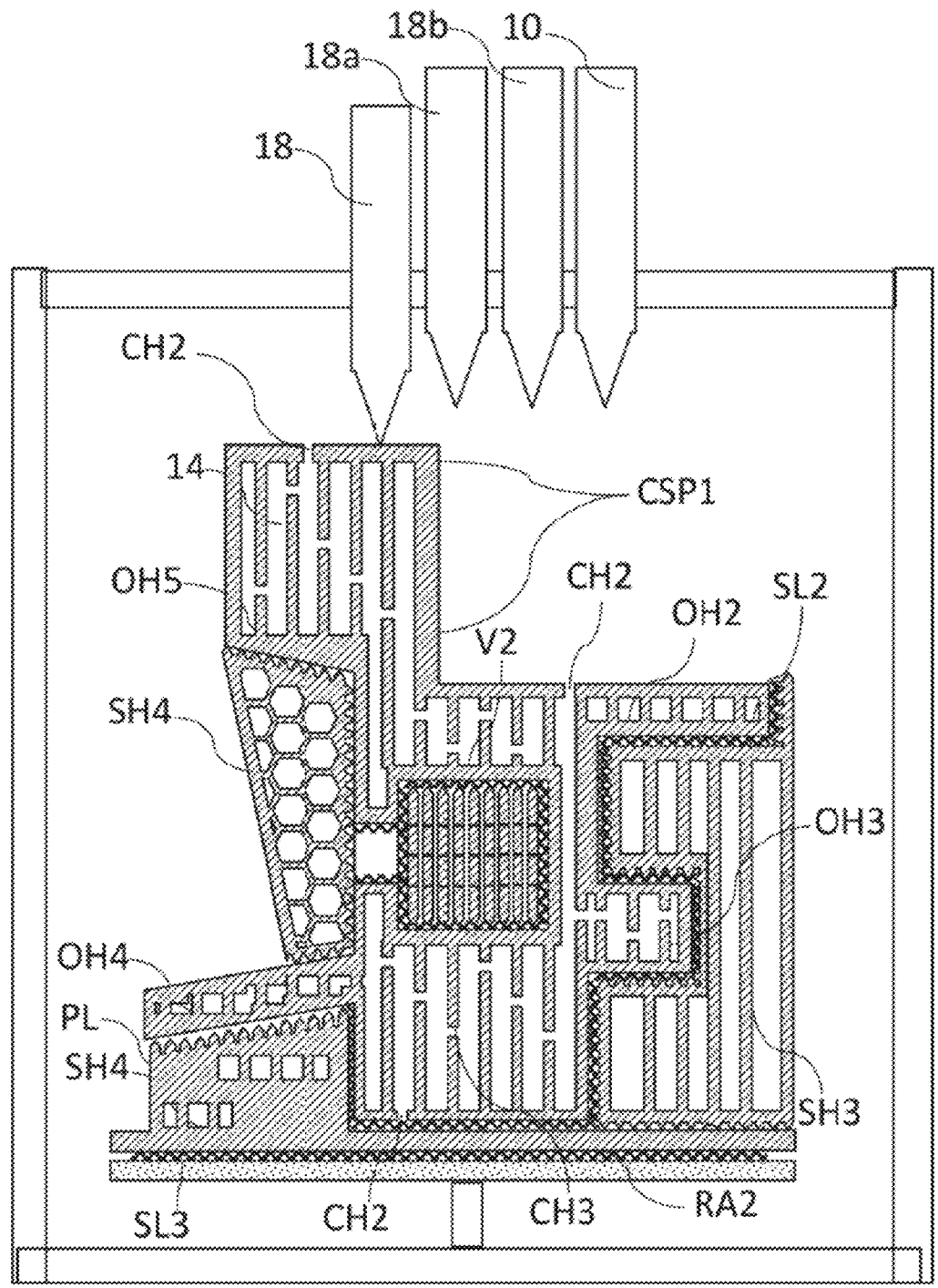
FIG. 20 shows a side sectional view in which the honeycomb cavities/infill are formed as vertical, columnar prism shapes.

FIG. 20 shows a side sectional view in which the honeycomb cavities/infill are formed as vertical, columnar prism shapes. Distribution channels CH3 (e.g., approximately 20 shown) are shown among the many layers of the deposited part. The distribution channels CH3 are shown distributed about many layers to interconnect some, many, or all infill or honeycomb cells. No channels are shown extending into overhangs OH2 or OH4, which may not be thick enough to need additional debinder fluid flow. As shown, sintering support or form-fitting shell SH3 may also be filled with infill cells, and may or may not additionally include channels access or distribution channels CH2 or CH3. FIG. 20 shows access channels CH2 which provide ingress and egress for fluid flow into the distribution channel CH3 interconnected honeycomb cells. As should be noted throughout, dimensions for channels may be exaggerated, and breaks in walls as shown merely through holes—the distribution channels CH3 may be small circular holes, and take up less than 1% (e.g., less than 1-3%) of the surface area of the infill, and similarly, the access channels CH2 may be small circular through holes which take up less than 1% (e.g., less than 1-3%) of the surface area of the part walls.

Figure 21:
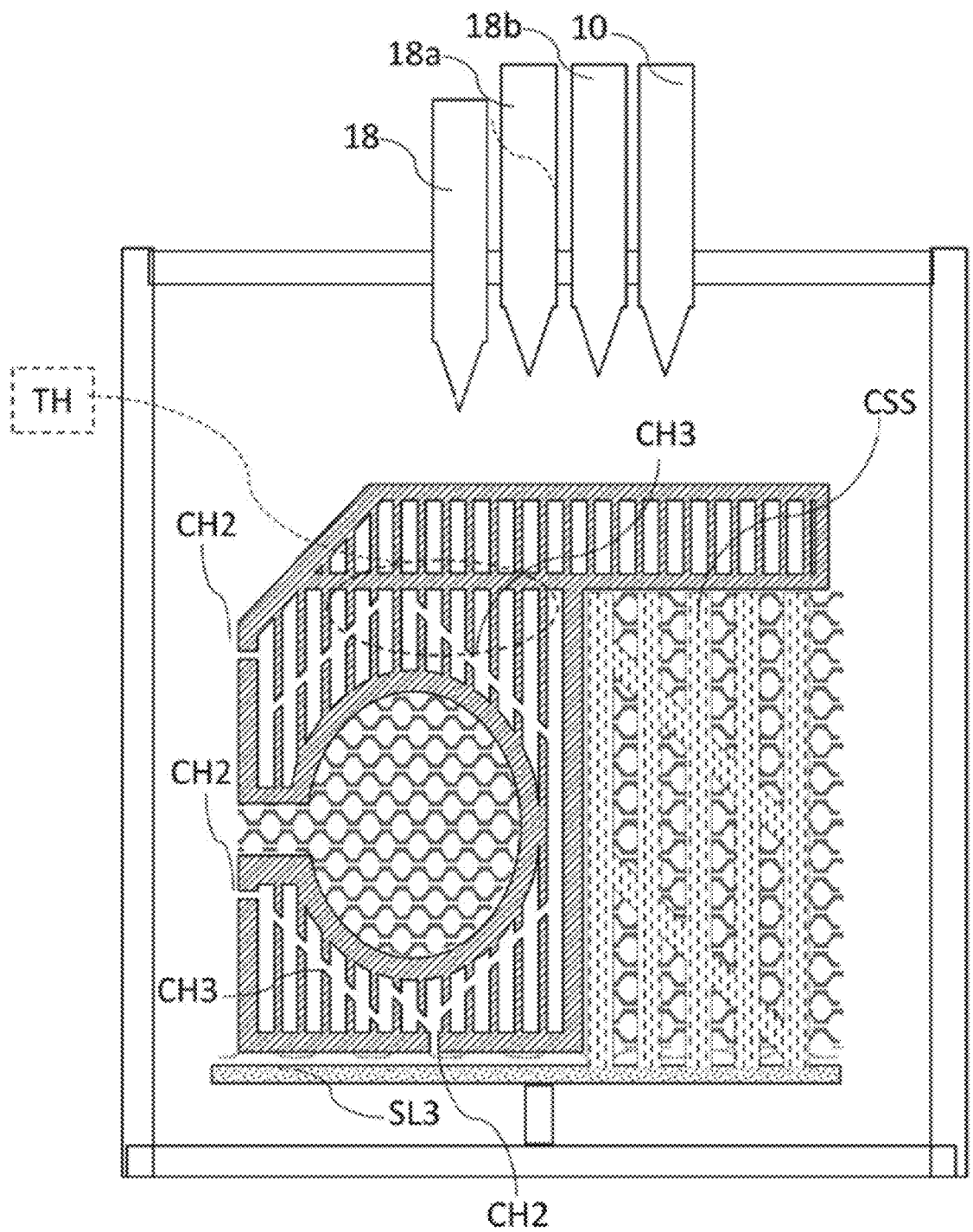
FIG. 21 shows a side sectional view, substantially similar in description to FIGS. 4 and 6, in which access channels are provided.

FIG. 21 shows a side sectional view in which the distribution channels CH3 throughout cavities/infill are formed in an aligned, and/or angled, manner throughout cellular prism shapes, and in which access channels CH2 are provided in two locations in this section. The distribution channels pass near to, adjacent to, or proximate to the portion of the part interior farthest from, deepest within, or thickest TH with reference to a negative or positive contour or wall of the part. The uppermost region of the part shown in FIG. 21 does not include channels, as the part interior is close enough to debinder fluid flow such that it may be expected that the uppermost region of the part may debind in an acceptable time.

Accordingly, the process of forming a "thick" part amenable to rapid fluid-based debinding may include depositing successive layers of the wall of the part to form not just one access channel CH2, but also a second access channel CH2 extending from the exterior of the part to the interior of the part. This may assist in debinding the binder matrix by flowing a debinding fluid in through the first access channel, via the distribution channel, and out through the second access channel. In this case, the first access channel CH2 may be connected to a pressurized supply of debinding fluid to force debinding fluid through and/or throughout the first access channel, distribution channel(s), and second access channel. Additionally, or in the alternative, in this process, successive layers of honeycomb infill may be deposited in the interior of the part to form a plurality of distribution channels CH3 connecting an interior volume of the honeycomb infill to the first access channel CH2, at least some of the plurality of distribution channels CH3 being of different length from other of the distribution channels CH3.

In general, the substantial temperature ramp and environmental conditions (such as gases) for sintering a target metal part model material is presumed to be the temperature ramp to be used, because the part must sinter adequately with or without supports. Exceptions are possible (e.g., minor changes to the part model sintering temperature ramp to allow the supports to function better). Under these conditions (e.g., given a temperature ramp suitable for sintering a metal part model material), a candidate first ceramic material, e.g., α-alumina or other alumina, having a sintering temperature above that of the part model material may have its sintering temperature lowered and/or its shrinkage amount changed by (i) reducing average particle size ("APS") or (ii) mixing in a compatible second or third lower temperature sintering material (e.g., silica, or yttria-silica-zirconia). These mixed materials would also be sintered. In addition, or in the alternative, a non-sintering filler that sinters at a significantly higher temperature may be mixed (which will generally decrease the amount of shrinking or densification). In general, homogeneous materials having a smaller APS will start densifying at lower temperatures and will attain a full density at a lower temperature than the larger APS materials.

In addition, or in the alternative, the sintering temperature, shrinking amount or the degree of densification can be changed by changing the particle size distribution ("PSD", e.g., for the same average particle size, a different proportion or composition of larger and smaller particles). In addition, or in the alternative, when materials that may react are mixed, the sintering temperature, shrinking amount or the degree of densification of the mixture can be changed by using component mixing that may densify at a lower temperature than a chemical reaction, e.g., combining alumina and silica in a manner that densifies (sinters) at a temperature lower than that which forms mullite. For example, alumina-silica powder may be generated as alumina powder particles each forming an alumina core with a shell of silica, where the mixture first densifies/sinters between, e.g., 1150 and 1300 deg C., and converts to mullite only at higher temperatures, e.g., 1300-1600 degrees C.

In addition, or in the alternative, the sintering temperature, shrinking amount or the degree of densification can be changed by changing a degree of homogenization (molecular, nano-scale, core-shell structures) of dissimilar components.

Figure 22A:
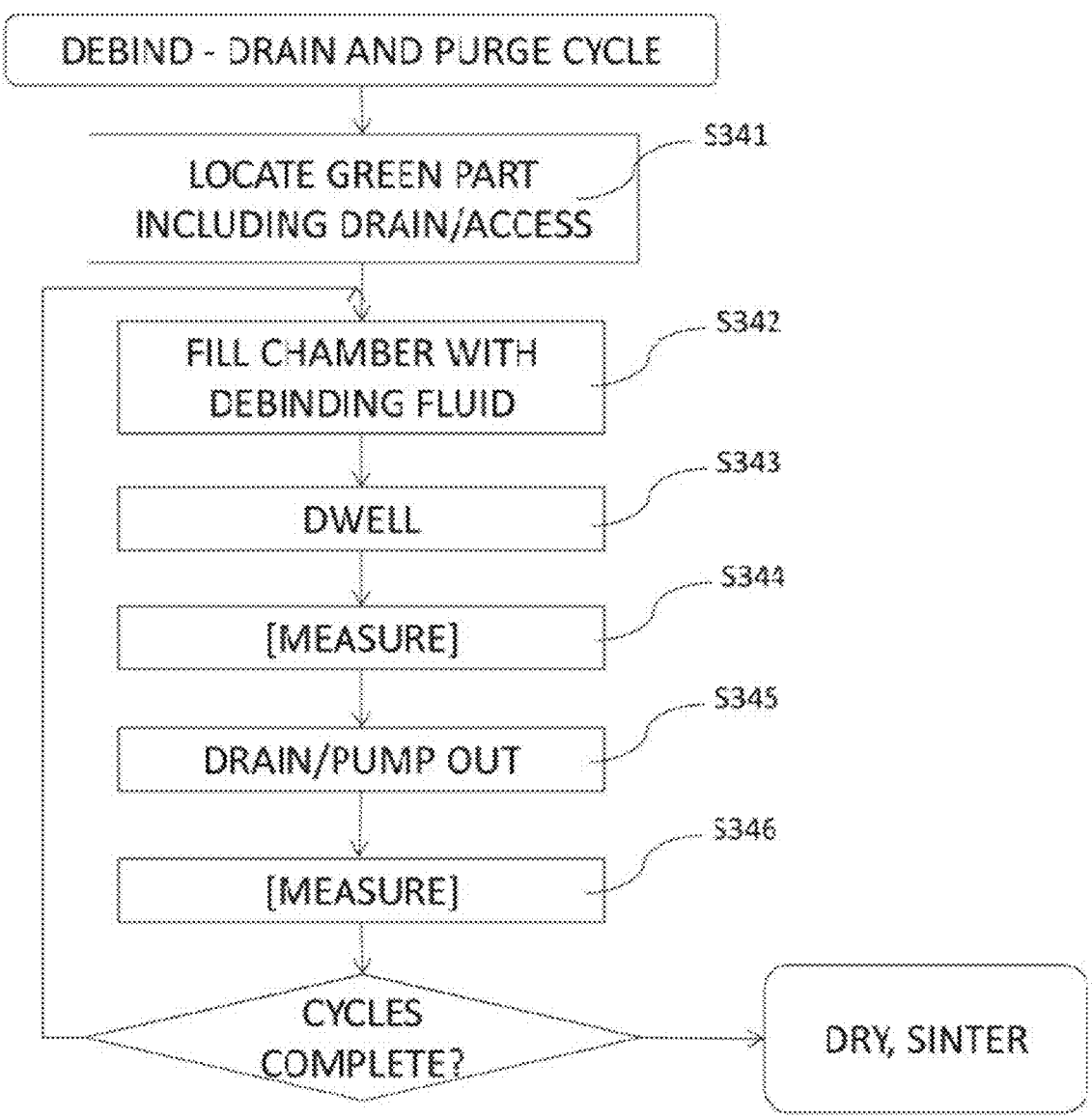
FIGS. 22A and 22B show a flowchart and schematic, respectively, of a gravity-aided debinding process useful with parts as described herein.
Figure 22B:
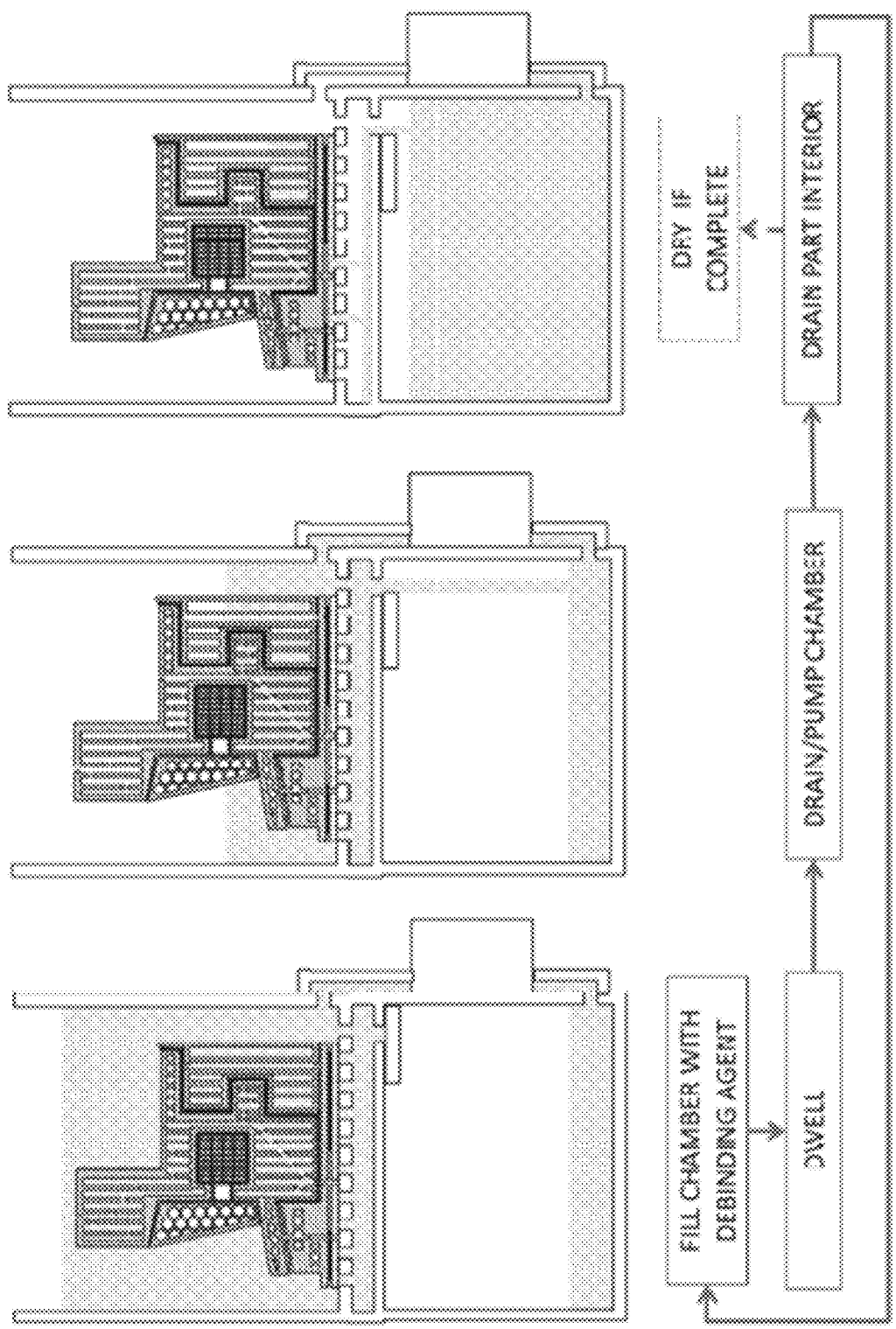

FIGS. 22A and 22B show a flowchart and schematic, respectively, that show a gravity-aided debinding process useful with parts as described herein printed with channels CH1, CH2, and/or CH3 (or even in some cases without). As shown in FIGS. 22A and 22B, access, routing, and distribution channels permit fluid to enter the part interior to more quickly debind the green part to a brown part. Debinding as a solvent based (including with thermal assistance, or thermal debinding with solvent assistance) or catalytic process may take hours, sufficient time to permit fill-purge fluid cycles. In one exemplary process, as shown in FIGS. 22A and 22B, a part with access, distribution, and/or routing channels is placed in a debinding chamber, container or facility in step S341. As shown in FIG. 22B, the part may be suspended or put on a porous rack or otherwise held in a manner that leaves at least top and bottom channel inlets and outlets relatively clear of obstructions to gravity based fluid flow.

In Step S342, the chamber may be filled with solvent or other debinding agent (alternatively, or in addition, the part is lowered or otherwise placed into a pre-filled bath). In Step S343 the part is kept in the debinding agent for a predetermined, modeled, calculated, or measured dwell time. The dwell time may be sufficient for, e.g., the debinding agent to permeate the channels. The dwell time may be additionally or alternatively sufficient for, e.g., the debinding agent to debind the first matrix material by a first effective amount (e.g., 5-30% or higher by volume of matrix material removal). The dwell time or period in Step S343 may be enhanced by, as shown in FIG. 22B, by agitation (e.g., mechanical members, entire chamber, bubbles, etc.), vibration and/or circulation. In optional step S344, a property or characteristic representative of the state of debinding may be detected and/or measured, and optionally used as a trigger to start a draining process to purge or drain debinding agent and removed material in preparation for a next cycle (there may be only one cycle in some cases of measurement). Exemplary measurements would be (i) via an optical or electromagnetic sensor, measuring a property such as opacity, color, capacitance, inductance representative of an amount of material debound (ii) via a mechanical or fluid-responsive sensor (optionally connected to an optical or electromagnetic element), measuring a property such as natural frequency, viscosity, or density or (iii) via a chemical sensor (optionally connected to an optical or electromagnetic element) measuring a chemical change such as pH, oxygen content, or the like.

In step S345, and as shown in FIG. 22B, the debinding chamber may be drained via gravity into a reservoir. Given sufficient time, and optionally aided by agitation, heating, circulation, or other thermomechanical processes, internal debinding agent fluid-filled channels (such as distribution and access channels) within the part also drain. The reservoir may include a filter, baffles, or other cleaner for removing debound material, and/or catalytic, chemical, magnetic, electrical or thermomechanical agent(s) for precipitating or otherwise gathering or removing debound material from the debinding agent. Alternatively, or in addition, the reservoir may include a valve for effecting the drain from the debinding chamber, and/or a pump for recirculating debinding agent back into the debinding chamber. Alternatively, or in addition, the reservoir may be integrated in the debinding chamber (e.g., recirculated in the debinding chamber after material removal).

In step S346, and as shown in FIG. 22B, post draining or partial draining, a measurement may be taken to gauge to progress of debinding and set a subsequent stage trigger or instruction for the next cycle. The sensor applicable may be similar or the same as that described with reference to step S344. In addition, or in the alternative, the part weight may be measured (before and after a debinding cycle) via a load cell, etc. In a case where the number of cycles of filling and draining the chamber is relatively low (e.g., 2-10 cycles), the changing part weight may be recorded (e.g., as a profile) and used to determine the time, temperature, and/or agitation of a subsequent cycle. In a case where the cycle count is 2-10 or higher (e.g., including continuous recycling and/or fill/drain), the profile of weight change may also be employed to model an exponential decay constant relating to the maximum removable binder per part weight and set a termination cycle count or time based on the exponential decay constant (e.g., terminating at a time or cycle count for 90-95% removed material by weight based on the exponential decay rate).

Figure 23:
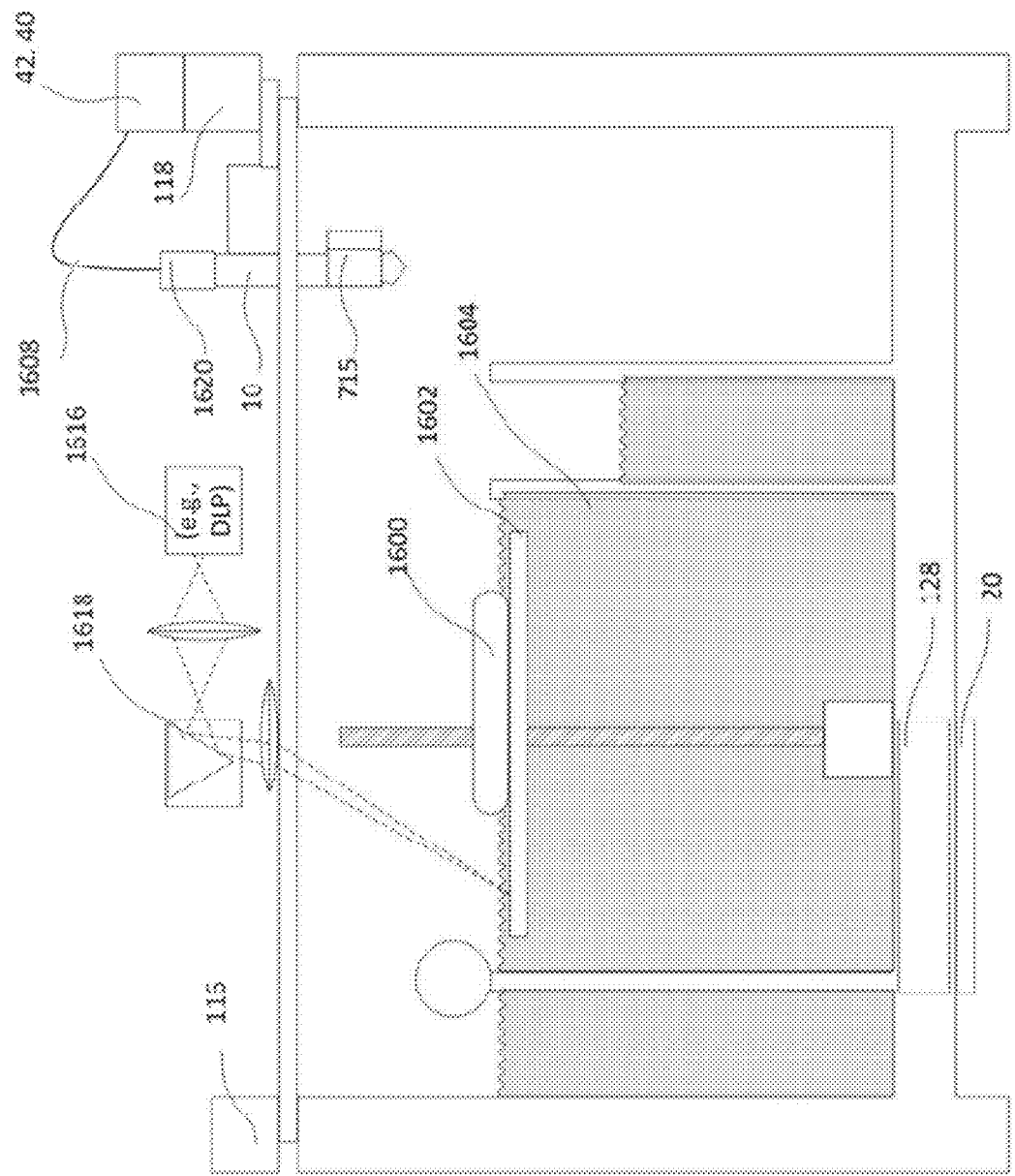
FIG. 23 shows a 3D printer for forming green parts from a curable or debindable photopolymer.

In step S347, and as shown in FIG. 22B, cycles may repeat until complete ("N CYCLES" being determined by predetermined count or time, by direct or indirect measured feedback as described above, or other modeling). When the cycles of debinding via gravity-based fill/drain cycles are complete, the green part has become a brown part, and may be actively or passively dried or otherwise post-processed in preparation for sintering. As shown in FIG. 23, and noted herein, the green parts may be formed from a curable and/or debindable photopolymer including a sinterable powder, as well as optionally a second stage binder (either a debindable, e.g., pyrolysing photopolymer or thermoplastic). As noted in the CFF patent applications and other prior patent applications incorporated herein, different additive manufacturing processes can include a matrix in liquid (e.g., SLA) or powder (e.g., SLS) form to manufacture a composite material including a matrix (e.g., debindable plastic) solidified around the core materials (e.g., metal powder). Many methods described herein can also be applied to Selective Laser Sintering which is analogous to stereolithography but uses a powdered resin for the construction medium as the matrix as compared to a liquid resin. The reinforcement might be used for structural, electrical conductivity, optical conductivity, and/or fluidic conductivity properties. As described in the CFF patent applications and other prior patent applications incorporated herein, and as shown in FIG. 23, a stereolithography process is used to form a three dimensional part, the layer to be printed being covered with resin, cured with UV light or a laser of a specified wavelength, the light used to cure the resin sweeping over the surface of the part to selectively harden the resin (matrix) and bond it to the previous underlying layer.

FIG. 23 depicts an embodiment of the stereolithography process described above. Description of FIGS. 1A and 1B herein would be recognized by one of skill in the art as consistent with FIG. 23 (despite differences in reference numbers). As depicted in the figure, a part 1600 is being built on a platen 1602 using stereolithography. The part 1600 is immersed in a liquid resin material 1604 contained in a tray 1606. The liquid resin material may be any appropriate photopolymer (e.g., debindable composite including a primary debindable component and optionally a secondary debindable component and a sinterable powder). In addition to the resin bath, during formation of the part 1600, the platen 1602 is moved to sequentially lower positions corresponding to the thickness of a layer after the formation of each layer to keep the part 1600 submerged in the liquid resin material 1604. In the depicted embodiment, a laser 1612, or other appropriate type of electromagnetic radiation, is directed to cure the resin. The laser may be generated by a source 1616 and is directed by a controllable mirror 1618.

In one implementation, for example for a MIM material which begins to melt or liquefy at around 130-150 C, the material may be heated in the print head to 180-230 C to promote adhesion. Separation layer material in small powder sizes (e.g., less than 1 um diameter) of alumina ceramic may tend to sinter at steel sintering temperatures. As the size of powder increases slightly to 2 um, the separation layer may become chalk-like. Accordingly, 15-35% powder by volume with a powder diameter of 5 um or higher for alumina or similar ceramic powder loaded in a MIM binder (e.g., wax-polyethylene, as discussed herein) may perform well as a separation layer. Alternatively, 10-20% powder by volume with a powder diameter of 2 um or lower (or 1 um or lower) for alumina or similar ceramic powder loaded in a MIM binder may perform well as a separation layer. Further, these may be combined (e.g., some particles smaller than 1 um and some particles larger than 5 um).

With respect to the binder jetting example shown in FIG. 1B, in all of the preceding examples in which an extruder using filament is not required, the binder jetting example printer 1000J and associated processes may be used. In a 3D printer for making desired 3D green parts, a binder may be jetted as a succession of adjacent 2D layer shapes onto a sinterable metal or ceramic powder bed in successive layers of powder feedstock, the powder bed being refilled with new or recycled feedstock and releveled/wiped for each successive layer. The 3D shape of the desired 3D green part and associated sintering supports or underlying shrinking platform (for holding unsupported spans of the 3D green part in place vs. gravity during sintering and maintaining an overall shape of the 3D green part) are built up as a bound composite including the sinterable powder and the binder, embedded in a volume of loose powder. The 3D green part and its sintering supports will later be debound and then sintered, and the sintering supports removed.

In some layers, differing amounts of binder may be jetted depending on whether a 2D layer shape segment being formed is an external wall, internal wall, or honeycomb wall, or internal bulk material (or depending on the printing location relative to such perimeters or areas). This results in differing (optionally a continuous or stepwise gradient) of volume fraction proportions of binder to powder, e.g., from 90% binder to 100% powder through 50:50 up to 10% binder to 90% powder. For example, a higher volume fraction of binder may be located on an outer shell (and/or inner shell), progressively reducing inward toward, e.g., area centroids.

In some layers, a release material (including another powder that does not sinter at the sintering temperature of the feedstock powder) may also be applied in a complementary 2D shape (e.g., jetted in a binder, extruded in a binder) for example, intervening between a support shape in a lower layer and a part shape in a layer two above.

In some layers, placeholder material (without either the green part powder or the release material powder) may also be applied in a complementary 2D shape of desired free space within the green part and/or sintering supports (e.g., jetted or extruded). In some layers, the placeholder material may also or alternatively be applied in a wall or "mold" shape, e.g., occupying external free space to the part shape, capturing unbound sinterable powder inside the mold shape. In other words, an external shell (e.g., wax) may be formed of the placeholder material. The external shell 2D shapes are deposited in each candidate layer on top of the preceding powder (e.g., bound powder, unbound powder, and/or release material) layer, then a subsequent layer of unbound powder feedstock is wiped on. As shown in FIG. 1B, a doctor blade 138 may be used to slice the top of the 2D shell shape off (leveling) or a silicon roller/blade 138 may be used to slice the top of the 2D shell shape off—the silicon roller/blade may accept some deformation, e.g., deform to accommodate the bump of the plastic tolerance above the printing plane.

The binder may be jetted into roofs, floors, lattice, honeycomb, or skeletal reinforcement shapes within the mold shape (e.g., starting spaced away from the mold shape) to help hold the unbound sinterable powder versus gravity, or mechanical disturbance during downstream processes such as leveling or moving the part from station to station. For example, in some 2D layers, an internal holding pattern such as hexagon, triangle, or as previously describe lower density or high volume fraction of binder may be used as a holder, in combination with either an outer shell formed from bound composite, an outer shell formed from high volume fraction binder bound composite (e.g., 70% binder), and/or a mold shape formed from the placeholder material. As noted, this may help prevent motion of parts during printing/or during layer re-application.

Further, in some layers, the placeholder material may also or alternatively be applied in a complementary 2D shape of adhesive between, e.g., the shrinking platform formed from bound powder and the underlying build platform, or between a plurality of adjacent or stacked 3D green parts and associated sintering supports to allow multiple parts to be built up per run. The adhesive function may, again, help hold the any of the shapes versus mechanical disturbance during downstream processes such as leveling or moving the part from station to station. It should be noted that the binder jetting into sinterable powder may also be used to form adhering tacks as described herein between the shrinking platform and build platform, as well as or alternatively between a plurality of adjacent or stacked 3D green parts and associated sintering supports. In other words, the part may be anchored part with (e.g., solvent removed) binder to a ground plane (e.g., build plate) and/or parts to each other (e.g., in the Z axis, when printing one on top of another).

After each layer, the powder bed is refilled and releveled/wiped (with a doctor blade 138, roller, wheel or other powder leveling mechanism) flush with the green part shape, the release material shape, and/or the free space placeholder material shape. Optionally, a surface finishing mechanism flattens or shapes (rolling, shaving, ironing, abrading, milling) a recent or a most recent layer of green part shape, release material shape, and/or placeholder material shape before the powder bed is refilled about them.

The 3D shapes of each of the green part, sintering supports, intervening release material, and placeholder free space material are built up in successive layers, and in 3D space may take essentially any interlocking 3D forms. In many cases, the green part is formed as a recognizable 3D object, with separation material forming planes, arches, hemispheres, organic shapes or the like separating the 3D object from columns of sintering supports below, leading down to a shrinking platform as described herein, which is adhered to a build platform via placeholder material and/or bound composite tacks. Optionally, as described, within the recognizable 3D object, desired free space may be filled with placeholder material and/or unbound sinterable powder. Among the placeholder material and/or unbound sinterable powder may be deposited bound composite honeycomb or lattice or the like containing or entraining either or both of the placeholder material or unbound sinterable powder. Optionally, as described, about the recognizable 3D object, a mold shape defining the outer skin of the 3D object may be formed of the placeholder material. Additionally, or in the alternative, a skin shape forming the outer skin of the 3D object may be formed of the bound composite.

Subsequently, the 3D green part(s) together with sintering supports, release shapes, and placeholder or adhesive shapes is removed from the powder, and cleaned of remaining unbound powder. Unbound powder may be removed from the surroundings of the 3D green part(s) and sintering supports via outlets formed in the bound composite, or left entrained within the desired green part. Subsequently, the green part and its sintering supports may be handled as otherwise described in this disclosure. Bound composite outer and inner walls and internal honeycomb walls will be debound as described to form the brown part assembly. Release material will be debound as described, become separation powder for removing the sintering supports, and is retained for sintering and removed following sintering. Placeholder material may be debound (including in a solvent, catalytic, or thermal process) or even, if a different material from the binder, removed before or after debinding. In some cases, high temperature placeholder material that retains its shape at high heat but may be disassembled by further vibration, mechanical, radiation, or electrical processing (e.g., carbon or ceramic composite) may be retained through sintering.

Alternatively, the debinding step may not be necessary, for the green part shape and/or sintering supports if a single stage binder can be pyrolysed in a sintering furnace. In such a case, the green part assembly is taken directly to the furnace. Bound composite outer and inner walls and internal honeycomb walls are debound and sintered in an integrated process. Release material may be debound prior to the integrated debinding and sintering in the furnace, or at may be debound in the furnace as well. Placeholder material may be debound (including in a solvent, catalytic, or thermal process) prior to the integrated debinding and sintering in the furnace, or at may be debound in the furnace as well.

A material may be supplied (pellet extruded, filament extruded, jetted or cured) containing a removable binder as discussed herein (two or one stage) and greater than 50% volume fraction of a powdered metal having a melting point greater than 1200 degrees C. (including various steels, such as stainless steels or tool steels). The powdered metal may have which more than 50 percent of powder particles of a diameter less than 10 microns, and advantageously more than 90 percent of powder particles of a diameter less than 8 microns. The average particle size may be 3-6 microns diameter, and the substantial maximum (e.g., more than the span of +/−3 standard deviations or 99.7 percent) of 6-10 microns diameter.

Smaller, e.g., 90 percent of less than 8 microns, particle sizes may lower the sintering temperature as a result of various effects including increased surface area and surface contact among particles. In some cases, especially for stainless and tool steel, this may result in the sintering temperature being within the operating range of a fused tube furnace using a tube of amorphous silica, e.g., below 1200 degrees C. Smaller diameter powder material may be additively deposited in successive layers to form a green body as discussed herein, and the binder removed to form a brown body (in any example of deposition and/or debinding discussed herein).

DEFINITIONS

A "sintering temperature" of a material is a temperature range at which the material is sintered in industry, and is typically a lowest temperature range at which the material reaches the expected bulk density by sintering, e.g., 90 percent or higher of the peak bulk density it is expected to reach in a sintering furnace.

"Honeycomb" includes any regular or repeatable tessellation for sparse fill of an area (and thereby of a volume as layers are stacked), including three-sided, six-sided, four-sided, complementary shape (e.g., hexagons combined with triangles) interlocking shape, or cellular. "Cells" may be vertical or otherwise columns in a geometric prism shape akin to a true honeycomb (a central cavity and the surrounding walls extending as a column), or may be Archimedean or other space-filling honeycomb, interlocking polyhedra or varied shape "bubbles" with a central cavity and the surrounding walls being arranged stacked in all directions in three dimensions. Cells may be of the same size, of differing but repeated sizes, or of variable size.

"Extrusion" may mean a process in which a stock material is pressed through a die to take on a specific shape of a lower cross-sectional area than the stock material. Fused Filament Fabrication ("FFF"), sometimes called Fused Deposition Manufacturing ("FDM"), is an extrusion process. Similarly, "extrusion nozzle" shall mean a device designed to control the direction or characteristics of an extrusion fluid flow, especially to increase velocity and/or restrict cross-sectional area, as the fluid flow exits (or enters) an enclosed chamber.

"Shell" and "layer" are used in many cases interchangeably, a "layer" being one or both of a subset of a "shell" (e.g., a layer is an 2.5D limited version of a shell, a lamina extending in any direction in 3D space) or superset of a "shell" (e.g., a shell is a layer wrapped around a 3D surface). Shells or layers are deposited as 2.5D successive surfaces with 3 degrees of freedom (which may be Cartesian, polar, or expressed "delta"); and as 3D successive surfaces with 4-6 or more degrees of freedom.

In the present disclosure," In the present disclosure, "3D printer" is inclusive of both discrete printers and/or toolhead accessories to manufacturing machinery which carry out an additive manufacturing sub-process within a larger process. A 3D printer is controlled by a motion controller 20 which interprets dedicated G-code and drives various actuators of the 3D printer in accordance with the G-code. "Fill material" includes composite material formed of a debindable material and a sinterable powder, e.g., before debinding.

"Fill material" includes material that may be deposited in substantially homogenous form as extrudate, fluid, or powder material, and is solidified, e.g., by hardening, crystallizing, or curing. "Substantially homogenous" includes powders, fluids, blends, dispersions, colloids, suspensions and mixtures.

"3D printer" meaning includes discrete printers and/or toolhead accessories to manufacturing machinery which carry out an additive manufacturing sub-process within a larger process. A 3D printer is controlled by a motion controller 20 which interprets dedicated G-code (toolpath instructions) and drives various actuators of the 3D printer in accordance with the G-code.

"Deposition head" may include jet nozzles, spray nozzles, extrusion nozzles, conduit nozzles, and/or hybrid nozzles.

"Filament" generally may refer to the entire cross-sectional area of a (e.g., spooled) build material.

What is claimed is:

1. A furnace for debinding and sintering additively manufactured parts, comprising:
    a tubular retort having at least one open side;
    a heater, outside of the tubular retort, for heating a sintering volume within the tubular retort to a debinding temperature and to a sintering temperature;
    an end cap sealing the at least one open side;
    a forming gas line penetrating the end cap for supplying forming gas at a flowrate; and
    a heat exchanger within the tubular retort, outside the sintering volume, and adjacent a wall of the tubular retort that is constructed and arranged to be heated by the heater, the heat exchanger having an inlet connected to the forming gas line and an outlet to the sintering volume, wherein the heat exchanger includes a tube length sufficient to heat the forming gas to within 20 degrees Celsius of the sintering temperature before the forming gas exits the outlet,
    wherein at least a portion of the heat exchanger is disposed between the heater and a sidewall of the retort.

2. The furnace according to claim 1, further comprising:
    a pressure control mechanism, including a vacuum pump, coupled to the retort and configured to control pressure in the retort.

3. The furnace according to claim 2, further comprising a control system configured to:
    control the flowrate of the forming gas;
    operate the pressure control mechanism to control the pressure in the retort; and
    control a level of heat provided by the heater to the sintering volume.

4. The furnace according to claim 3, further comprising:
    a moisture sensor configured to sense an amount of moisture in the sintering volume and to be in communication with the control system; and
    a Liquid Petroleum Gas (LPG) sensor configured to sense an amount of hydrocarbon gas in the sintering volume and to be in communication with the control system.

5. The furnace according to claim 1, further comprising:
    a series of baffle shields adjacent the end cap and configured to reduce a temperature between the sintering volume and the end cap.

6. The furnace according to claim 5, further comprising:
    a dip tube penetrating the series of baffle shields to the sintering volume and configured to remove debinding decomposition gas from the sintering volume.

7. The furnace according to claim 6, further comprising:
    an inert purge gas supply penetrating the end cap and having an outlet at the end cap, the inert purge gas supply configured to introduce a purge gas between the series of baffle shields and the end cap that keeps the debinding decomposition gas away from walls of the retort adjacent the end cap.

8. The furnace according to claim 1, wherein the heat exchanger is formed as a stainless-steel tube having an exchange tube length greater than the length of the sintering volume.

\* \* \* \* \*